June 16, 1931.	G. V. ANDERSON	1,810,869
MACHINE FOR MAKING INLAID FLOOR COVERINGS
Filed Sept. 6, 1927    59 Sheets-Sheet 14

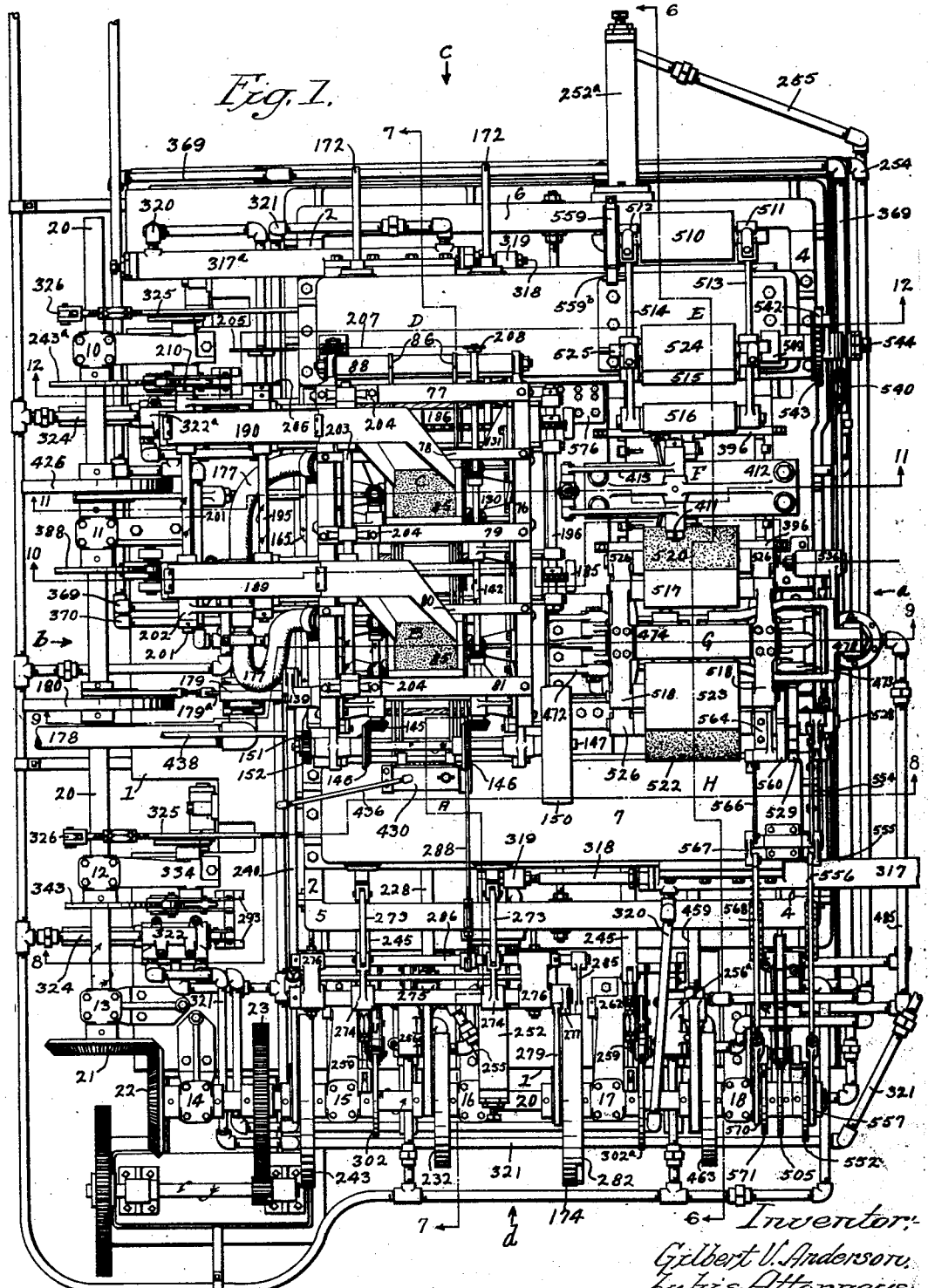

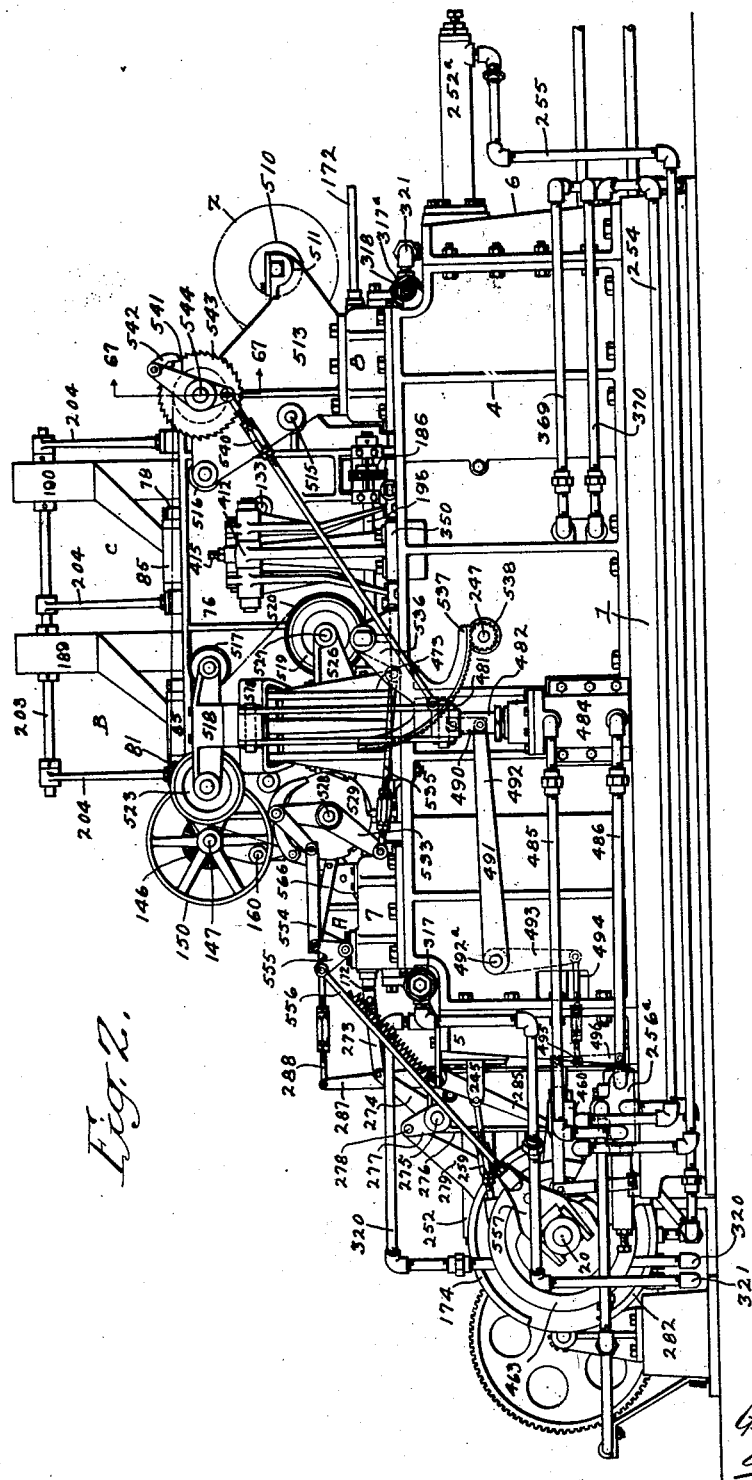

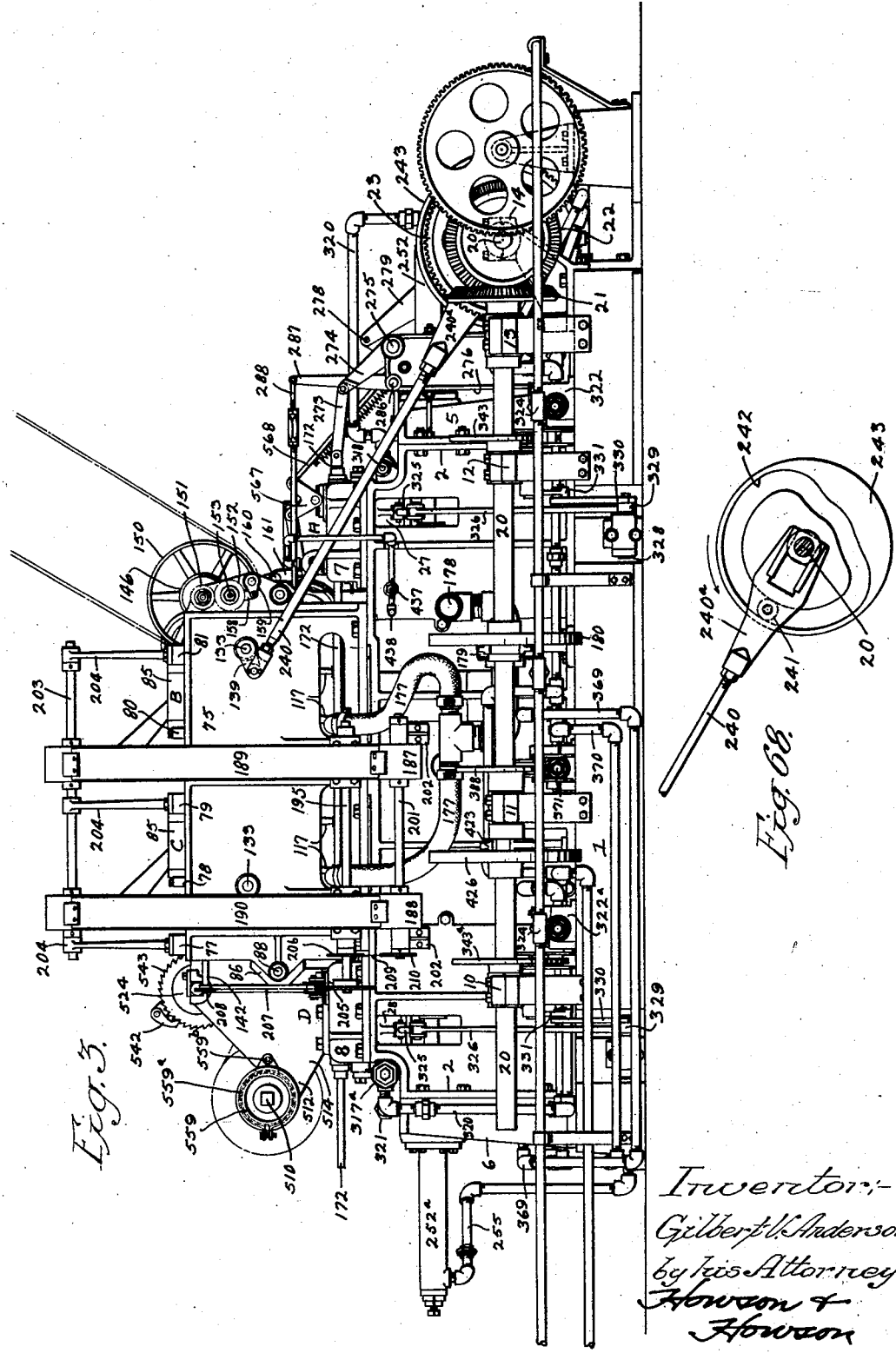

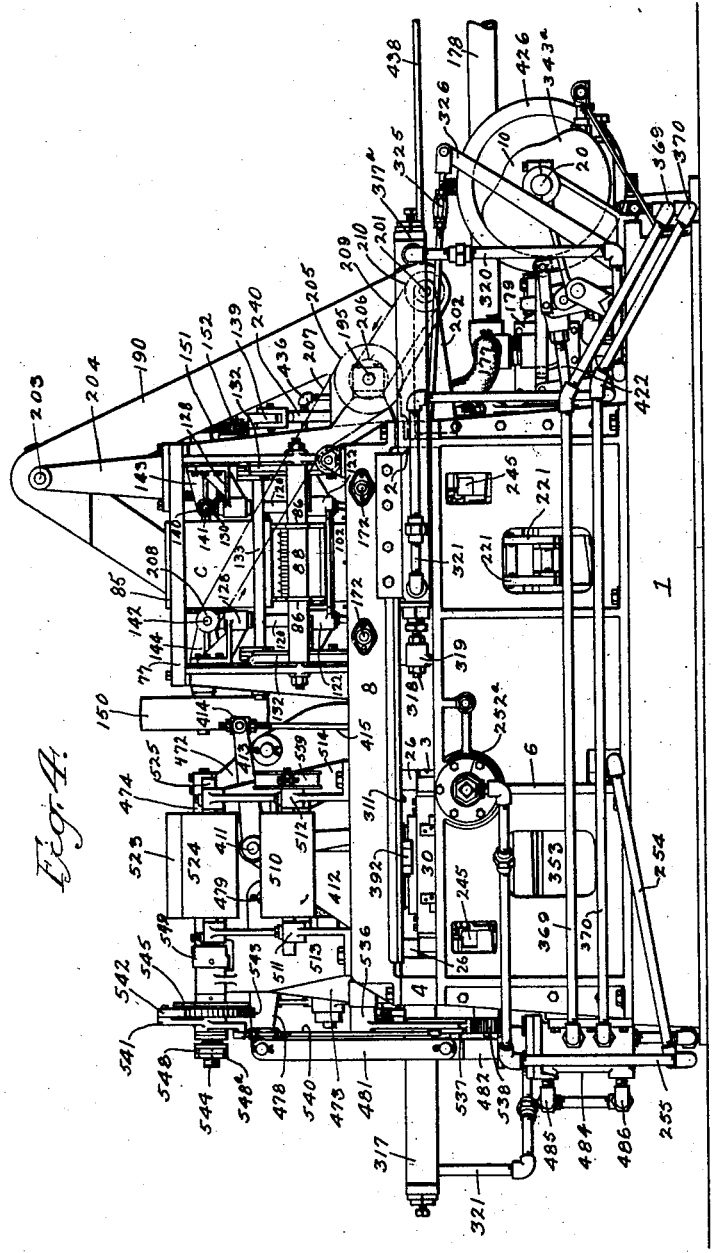

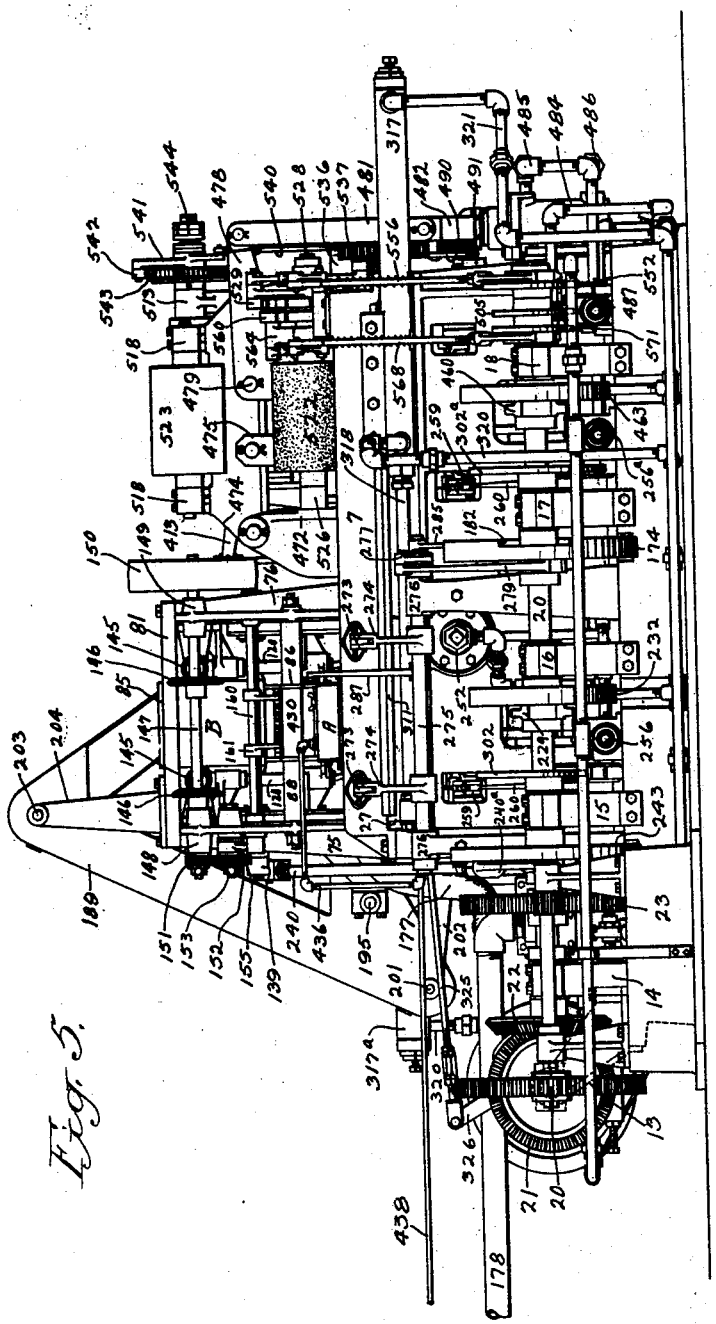

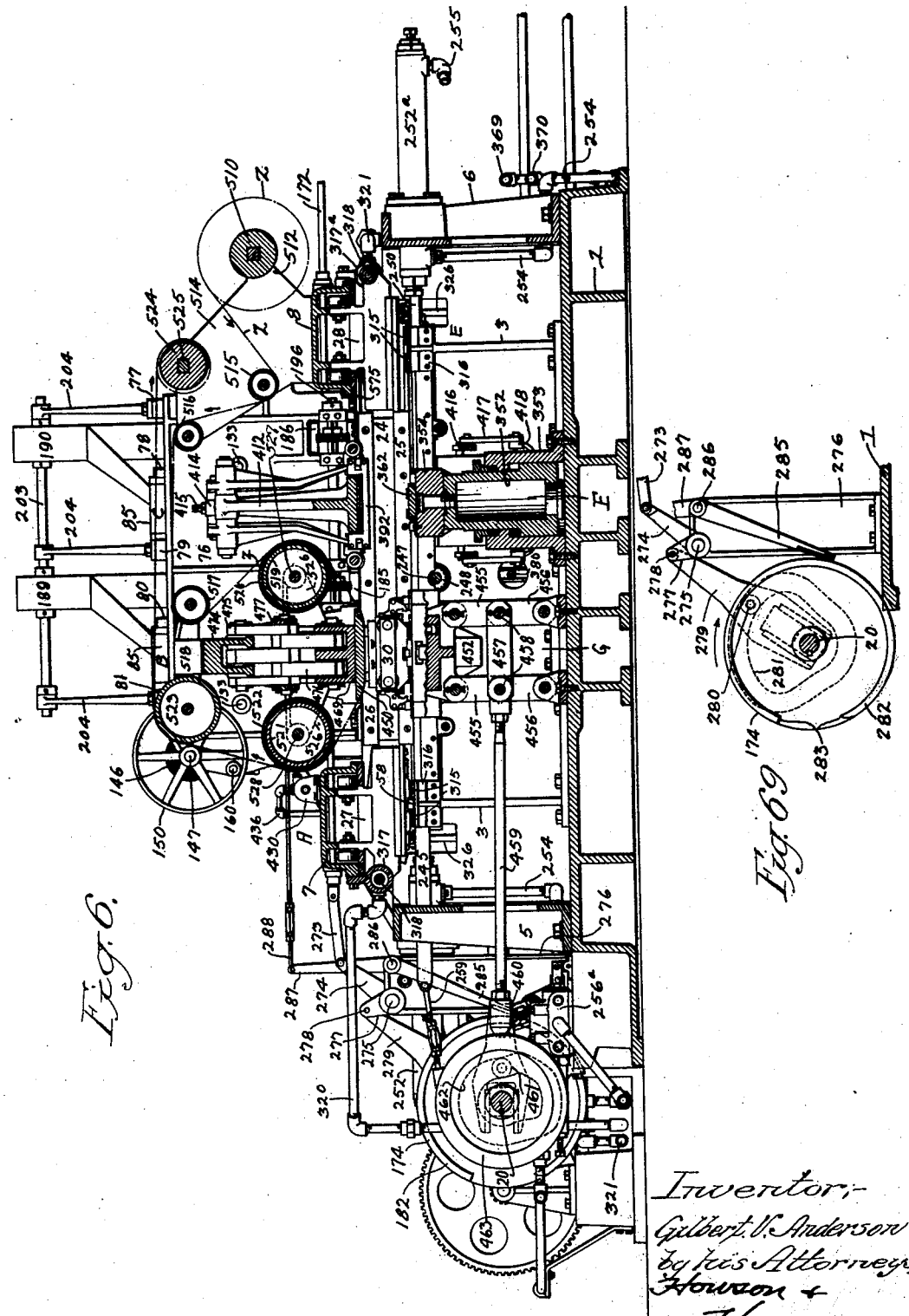

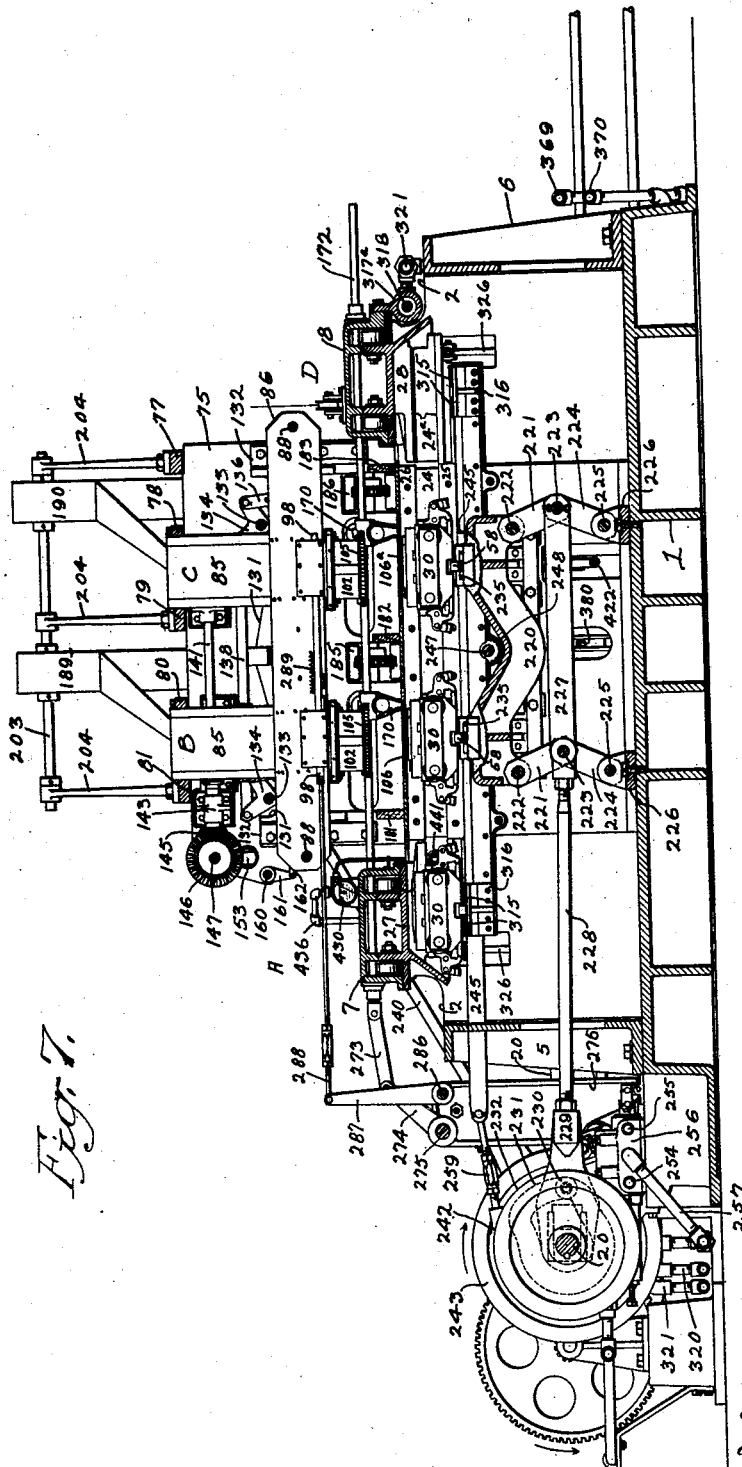

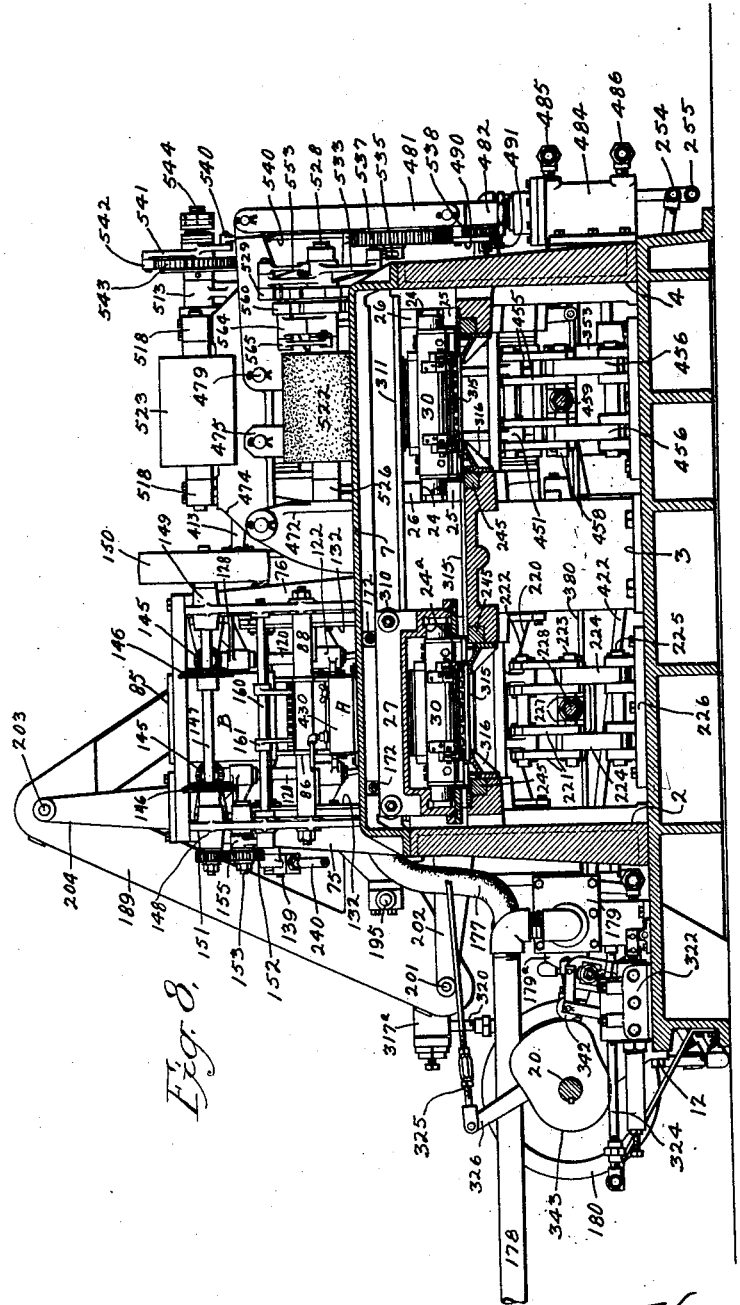

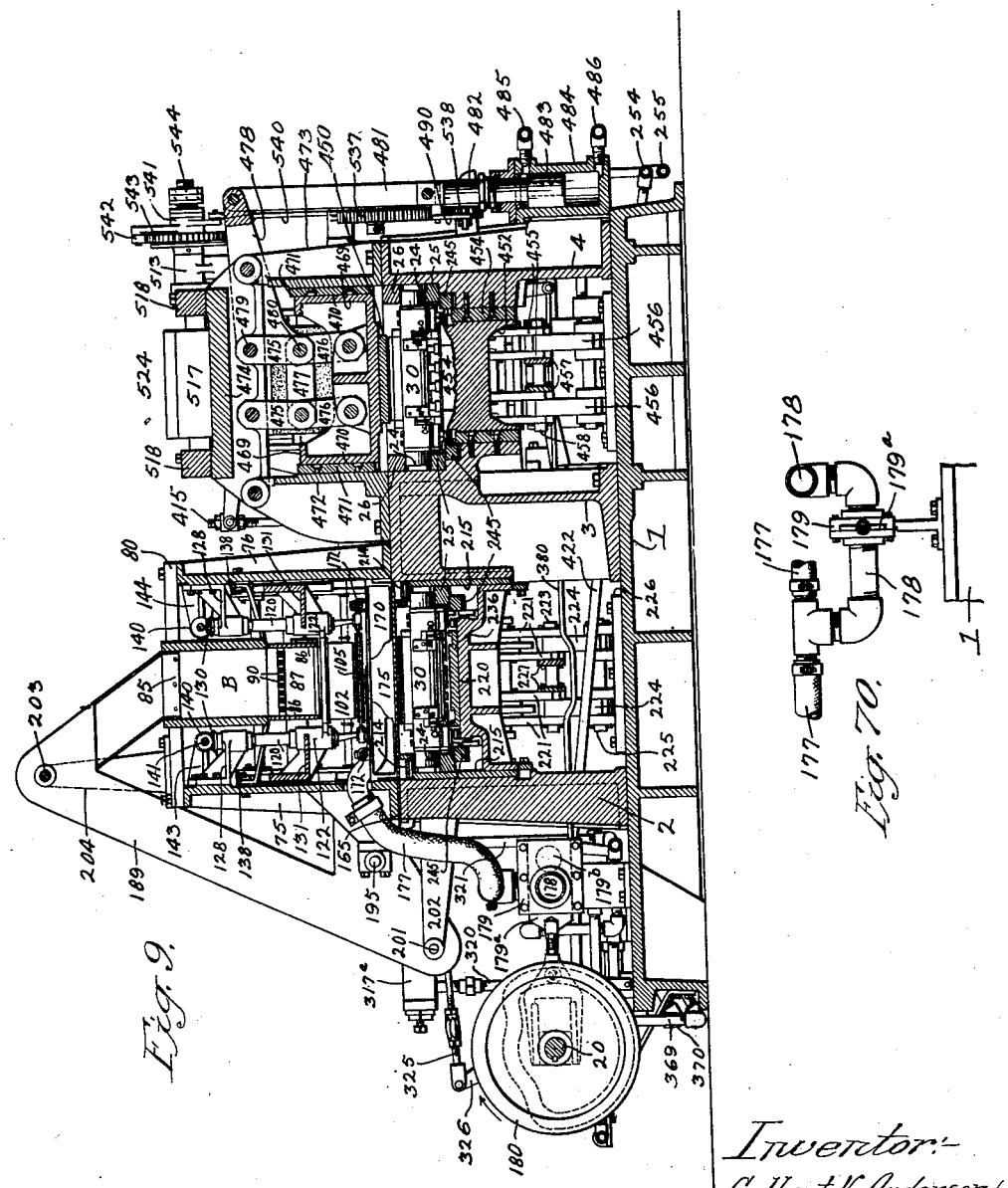

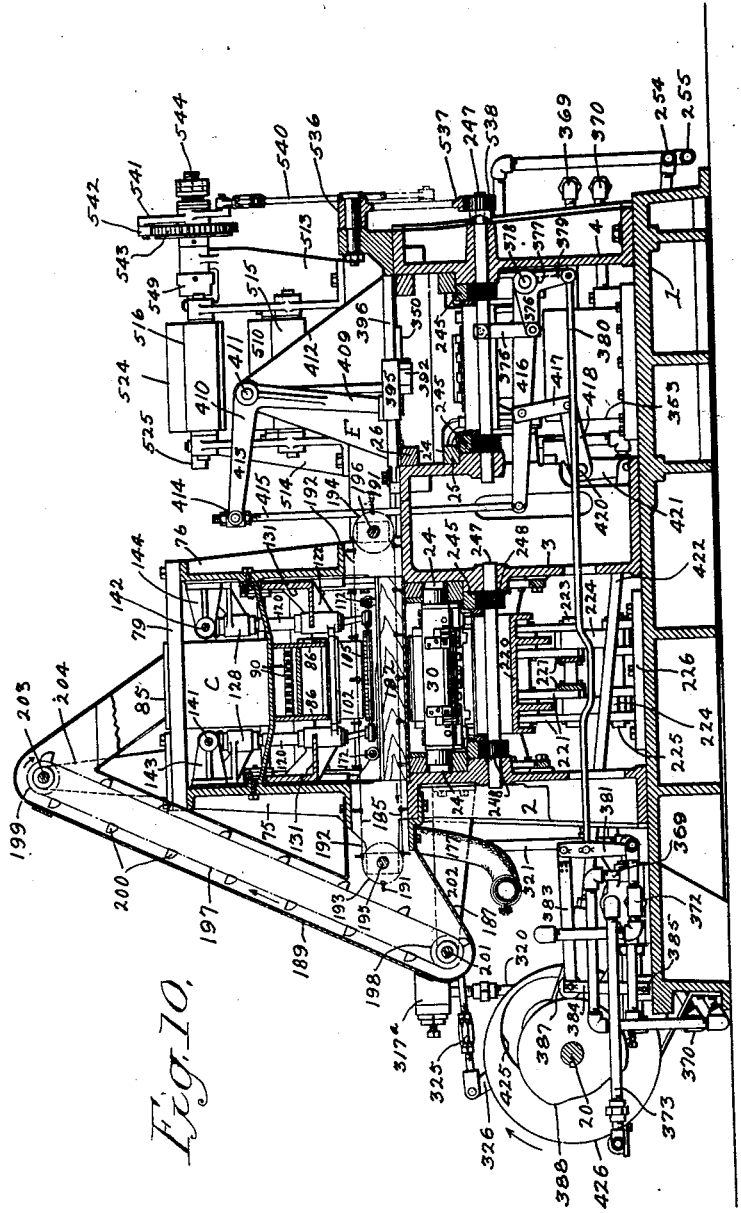

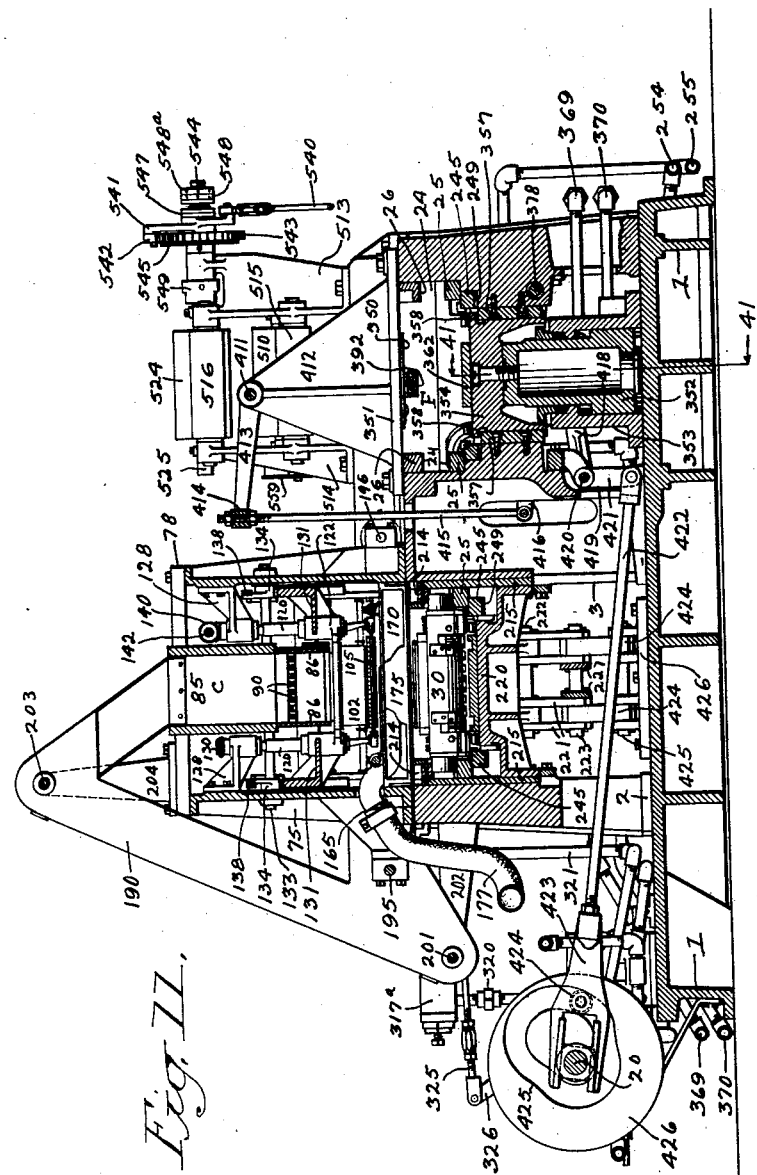

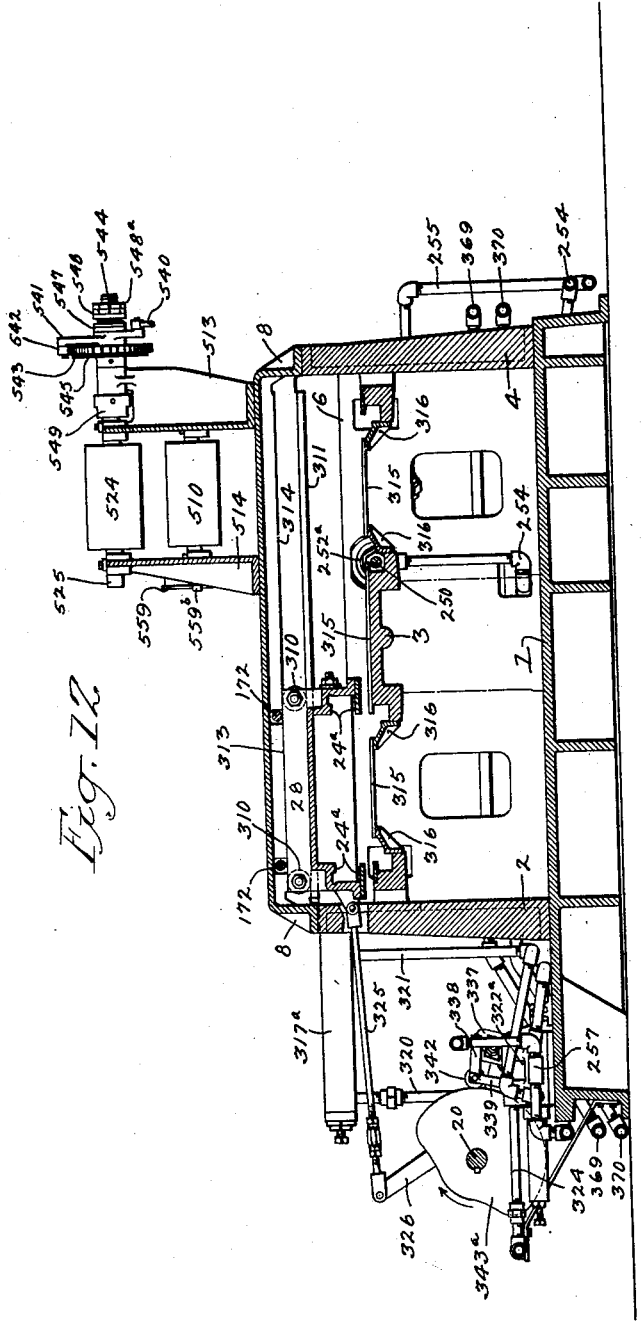

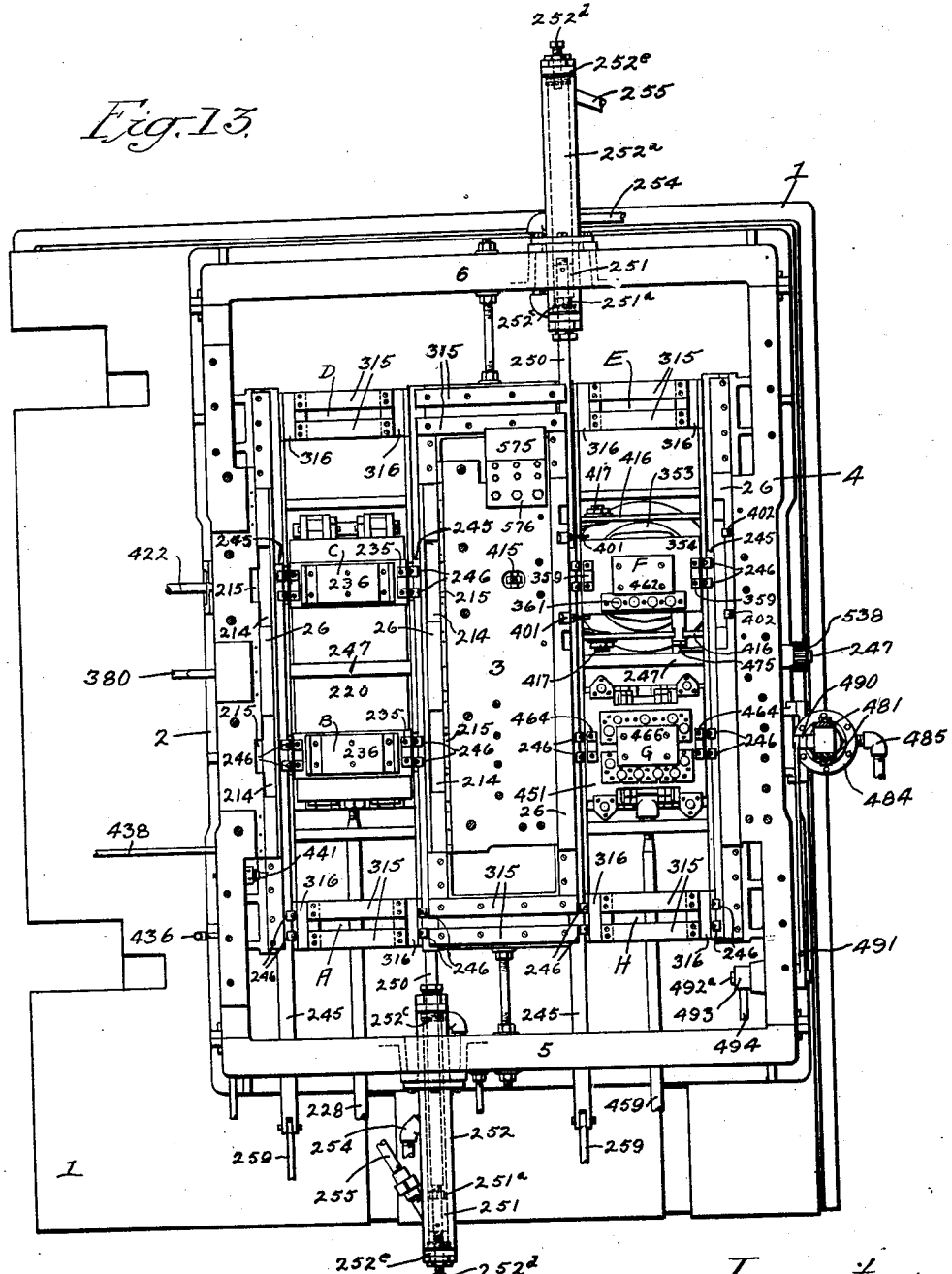

Inventor:-
Gilbert V. Anderson
by his Attorneys,
Howson + Howson

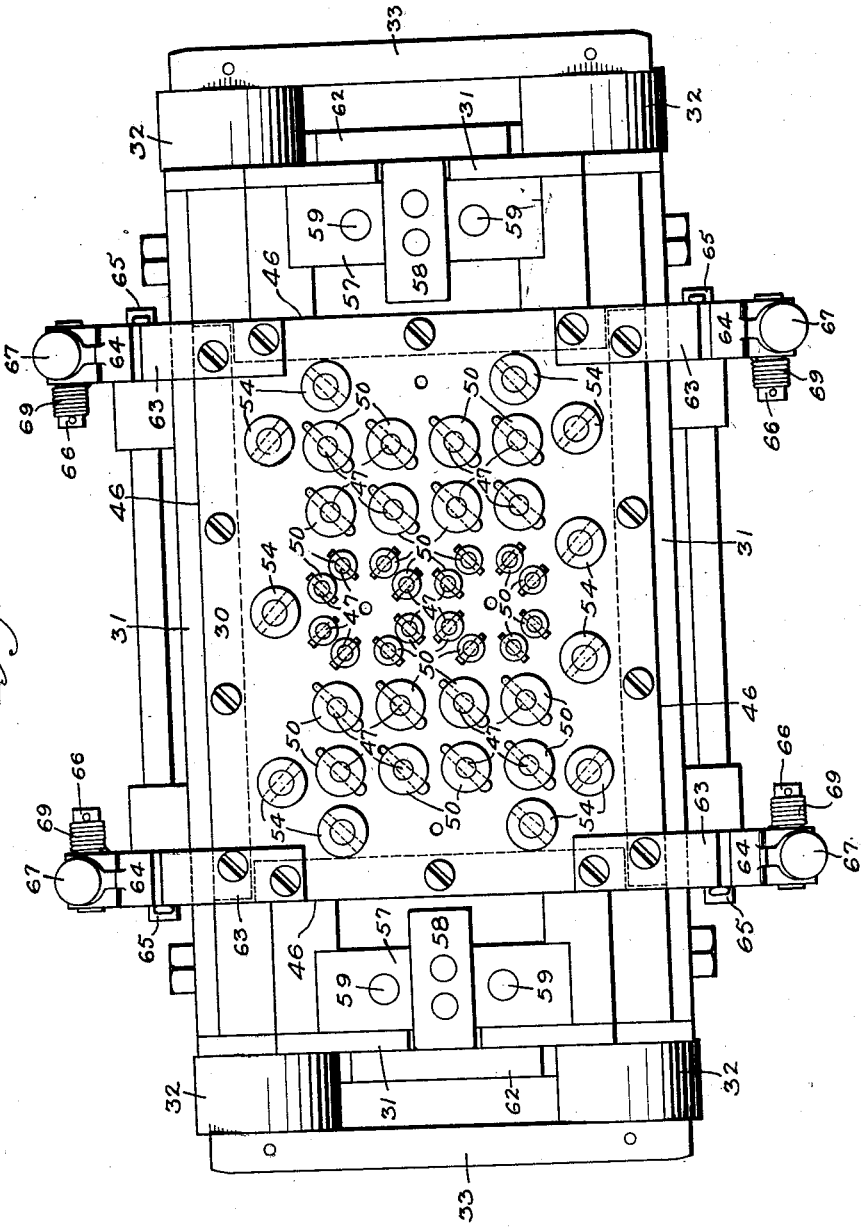

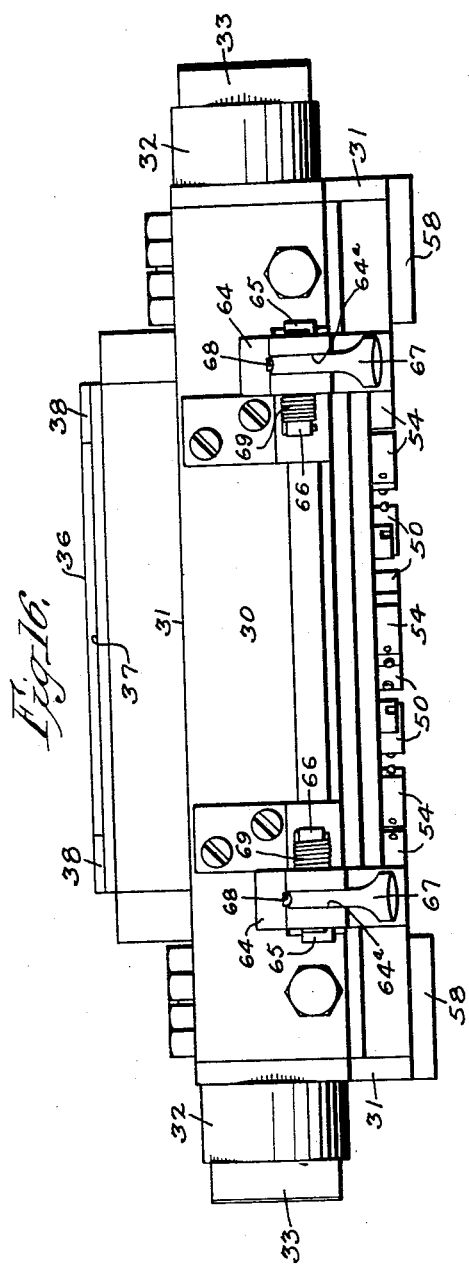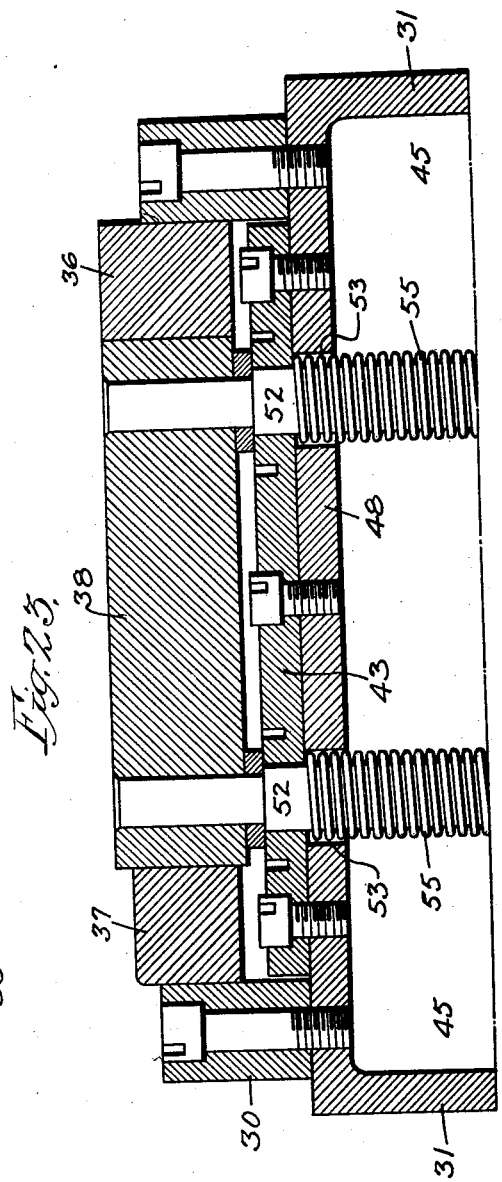

June 16, 1931.  G. V. ANDERSON  1,810,869
MACHINE FOR MAKING INLAID FLOOR COVERINGS
Filed Sept. 6, 1927  59 Sheets-Sheet 17

Inventor:-
Gilbert V. Anderson
by his Attorneys,
Howson + Howson

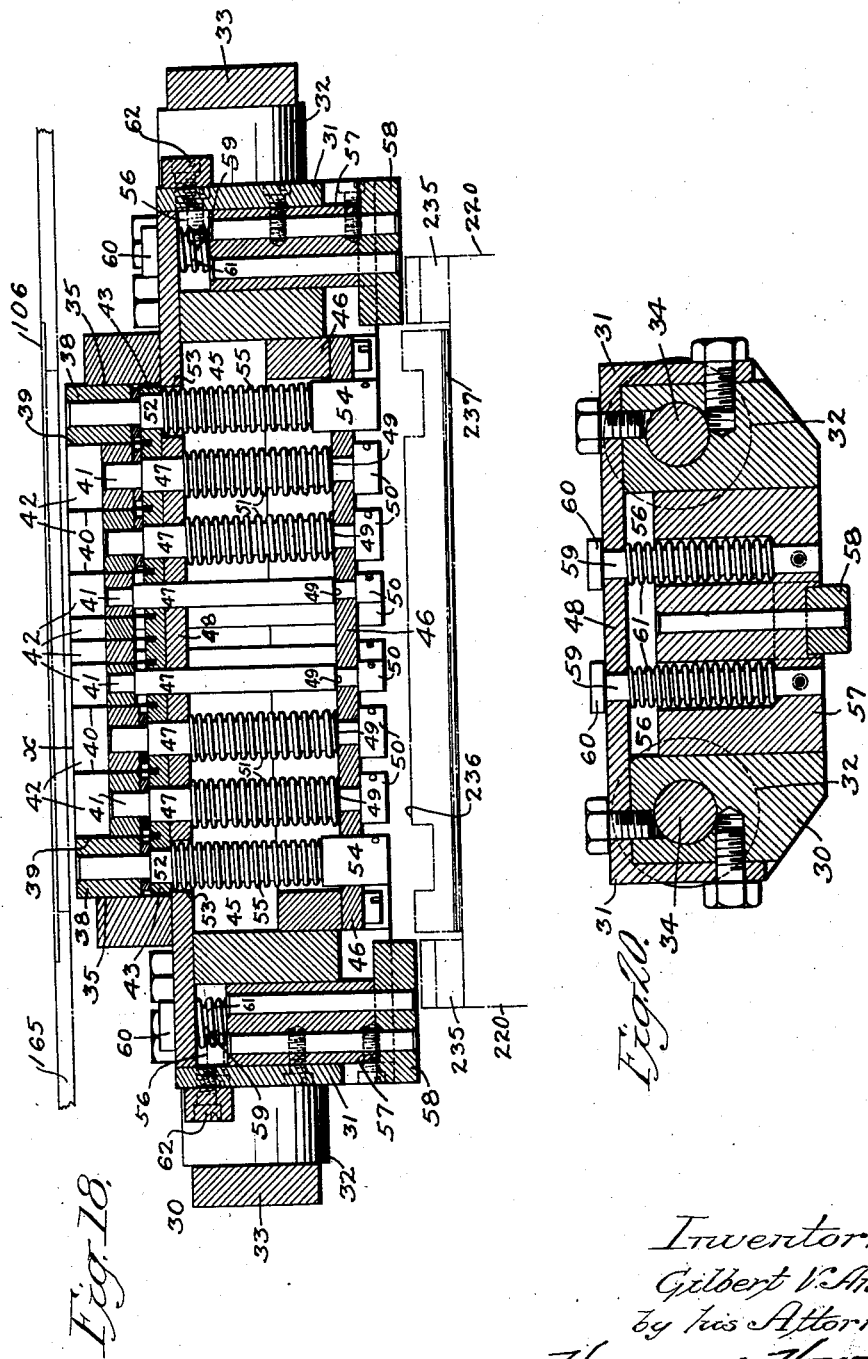

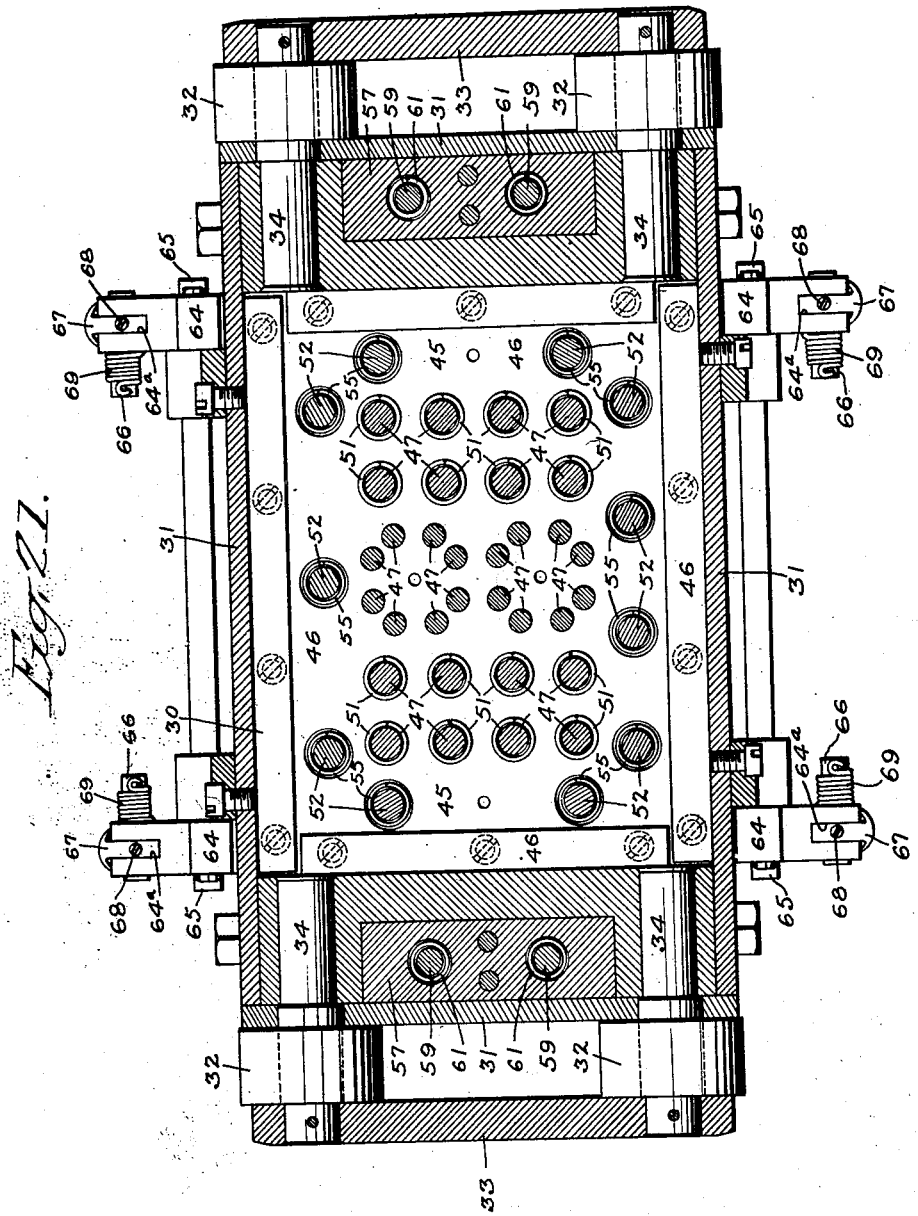

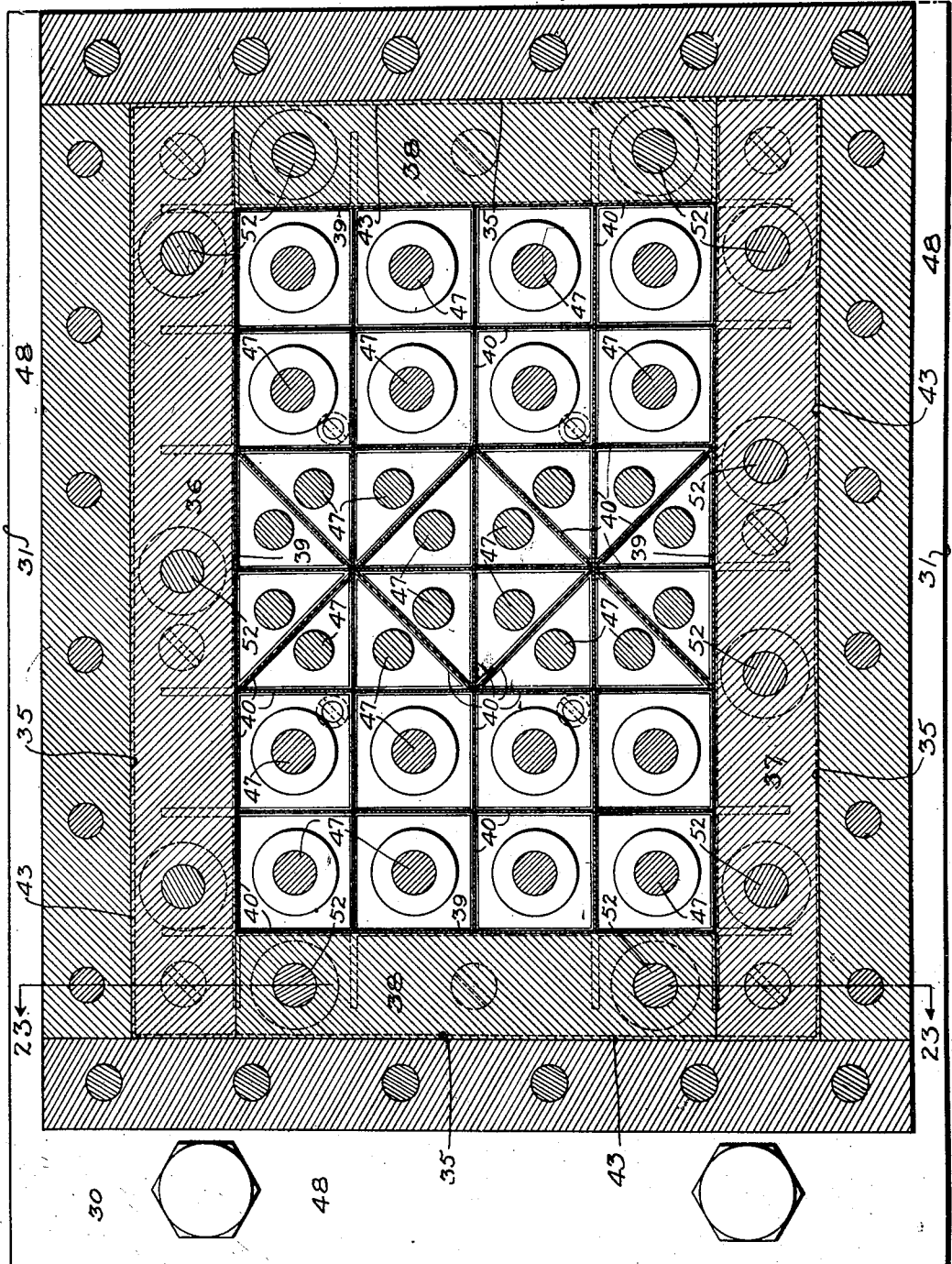

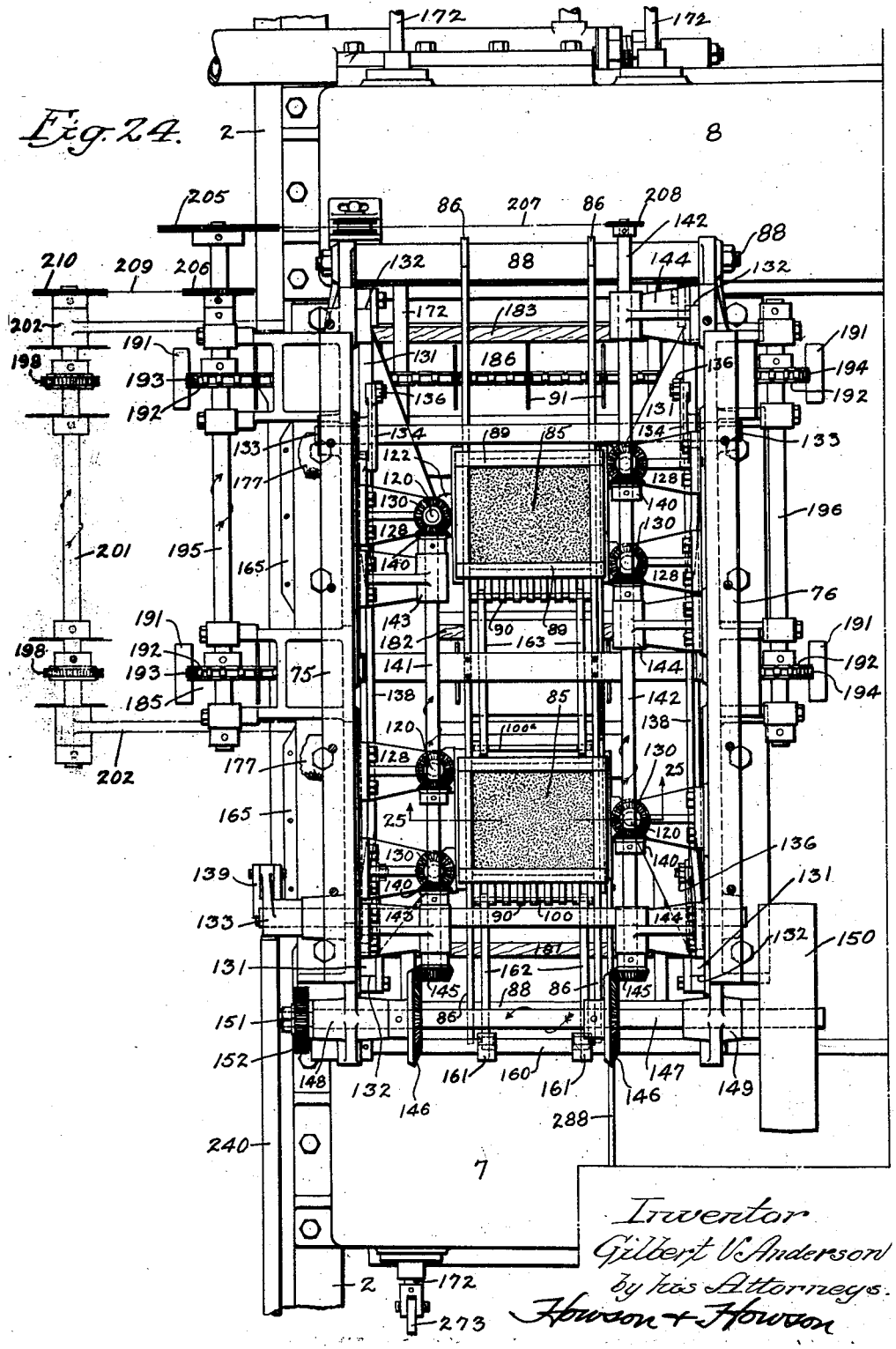

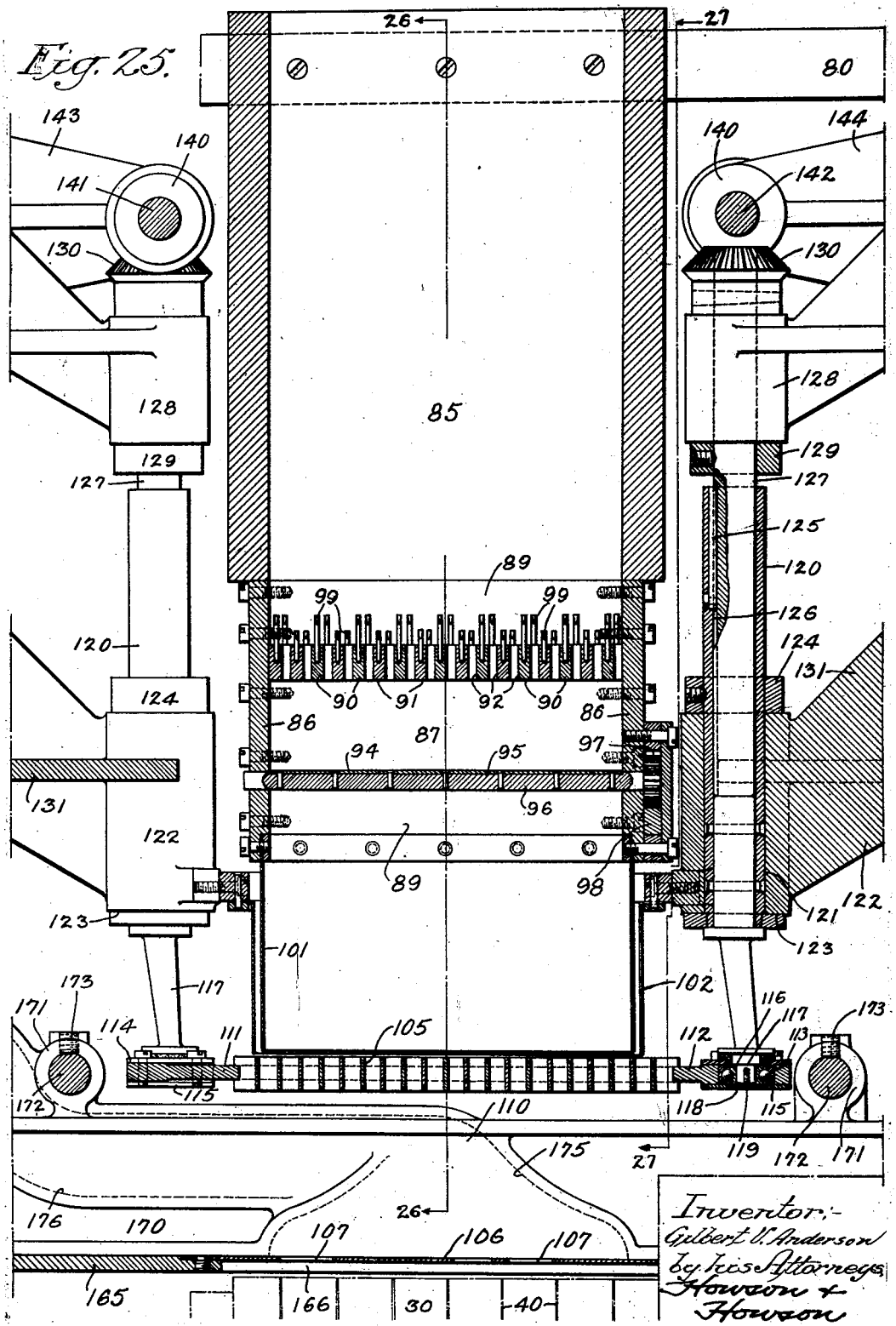

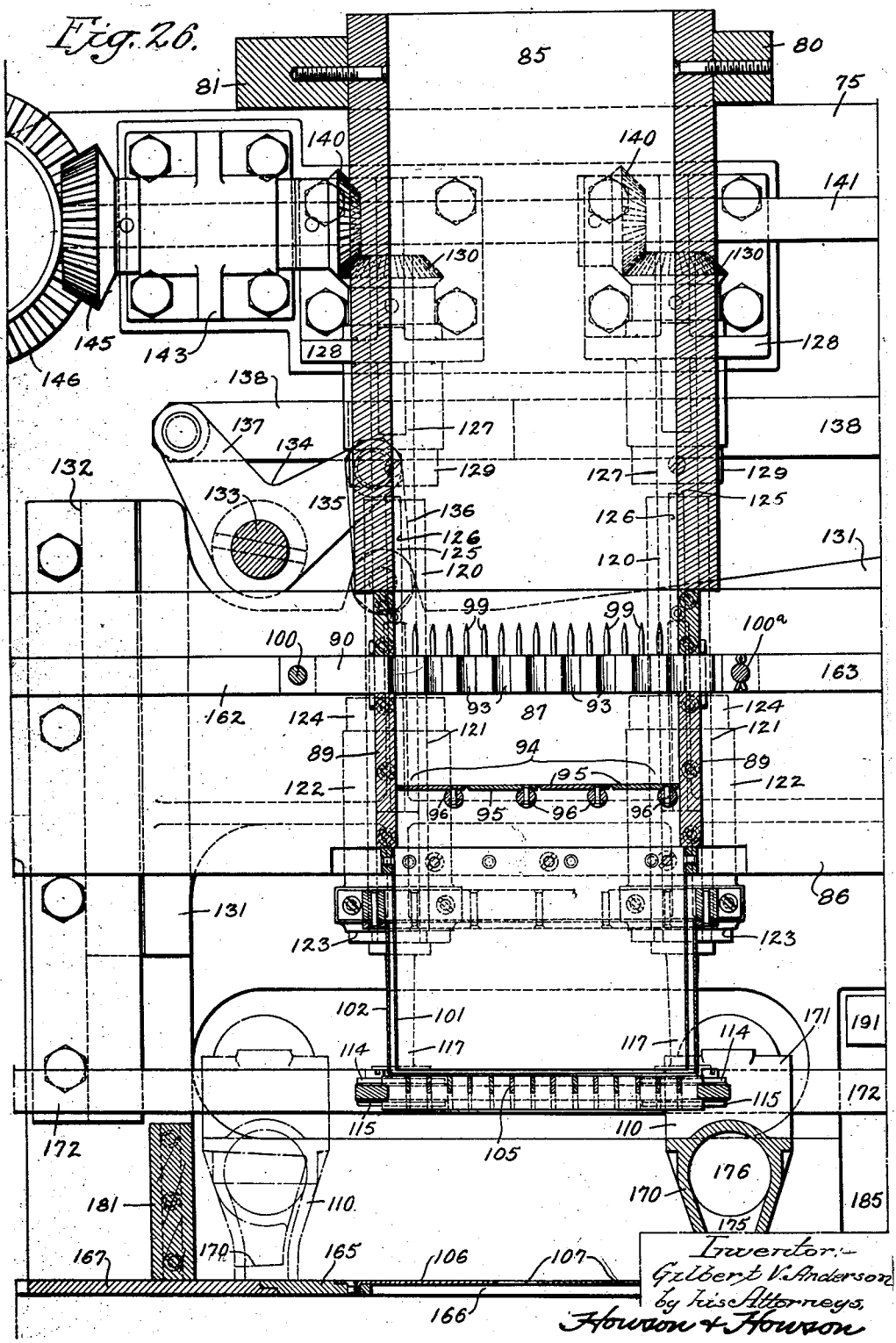

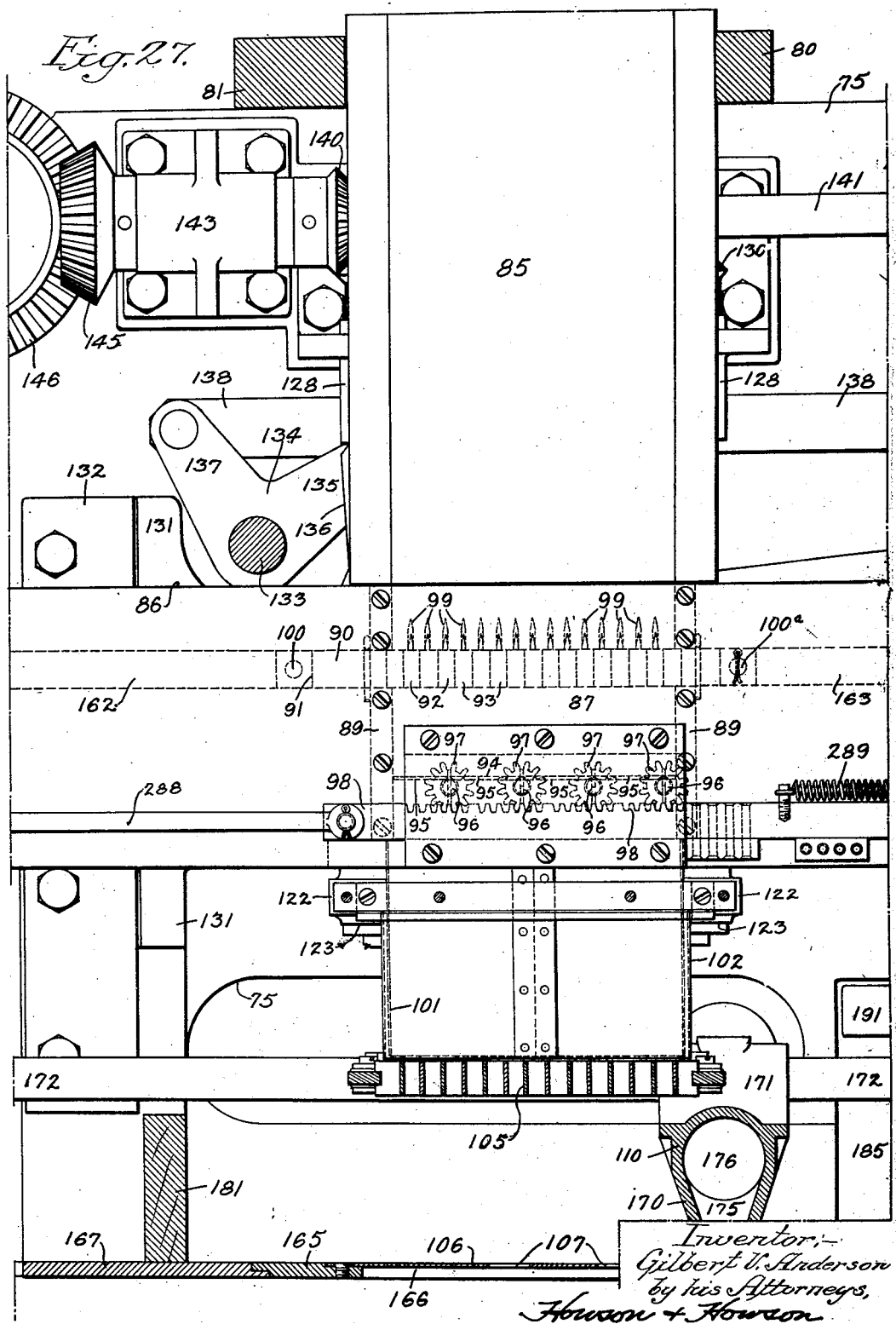

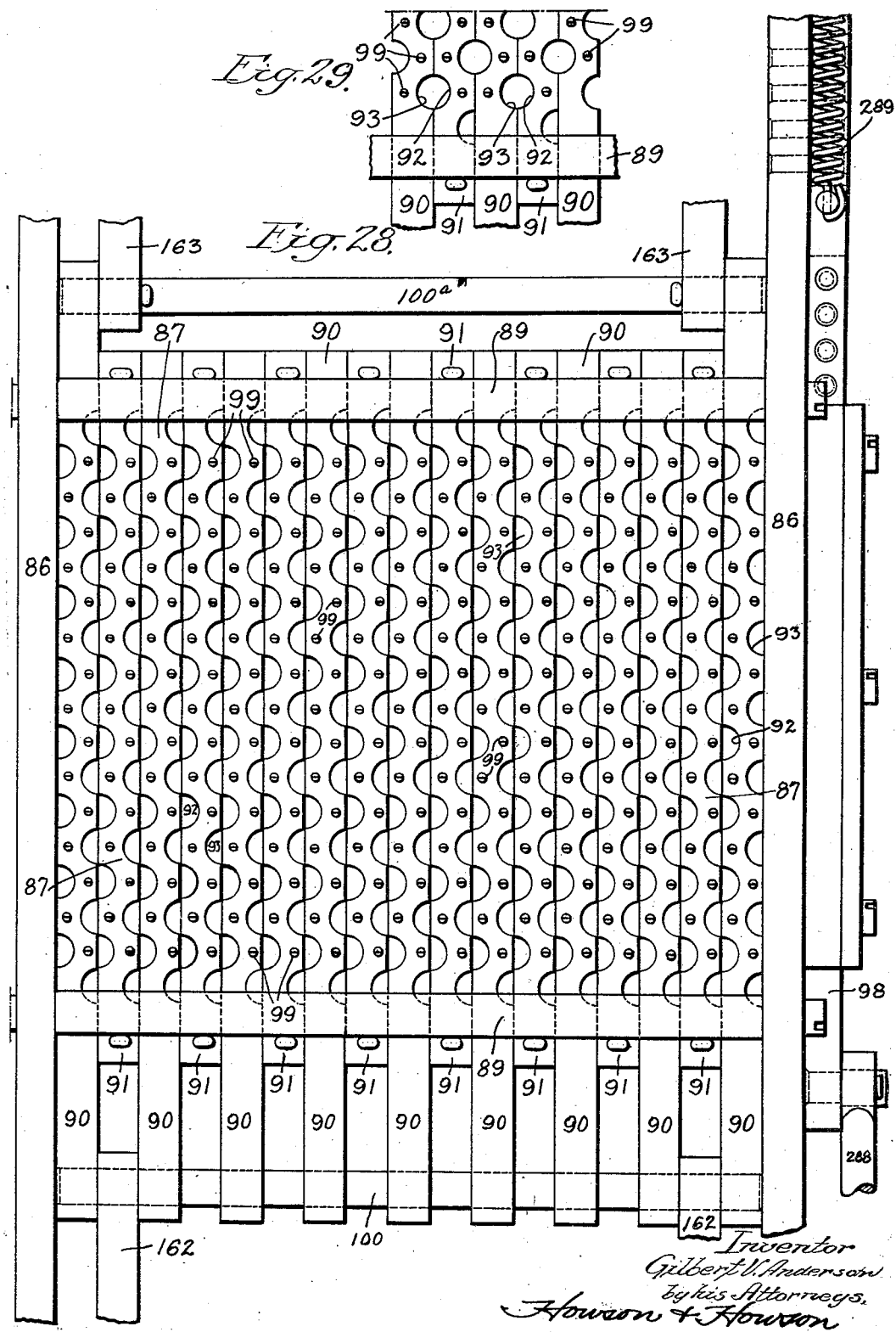

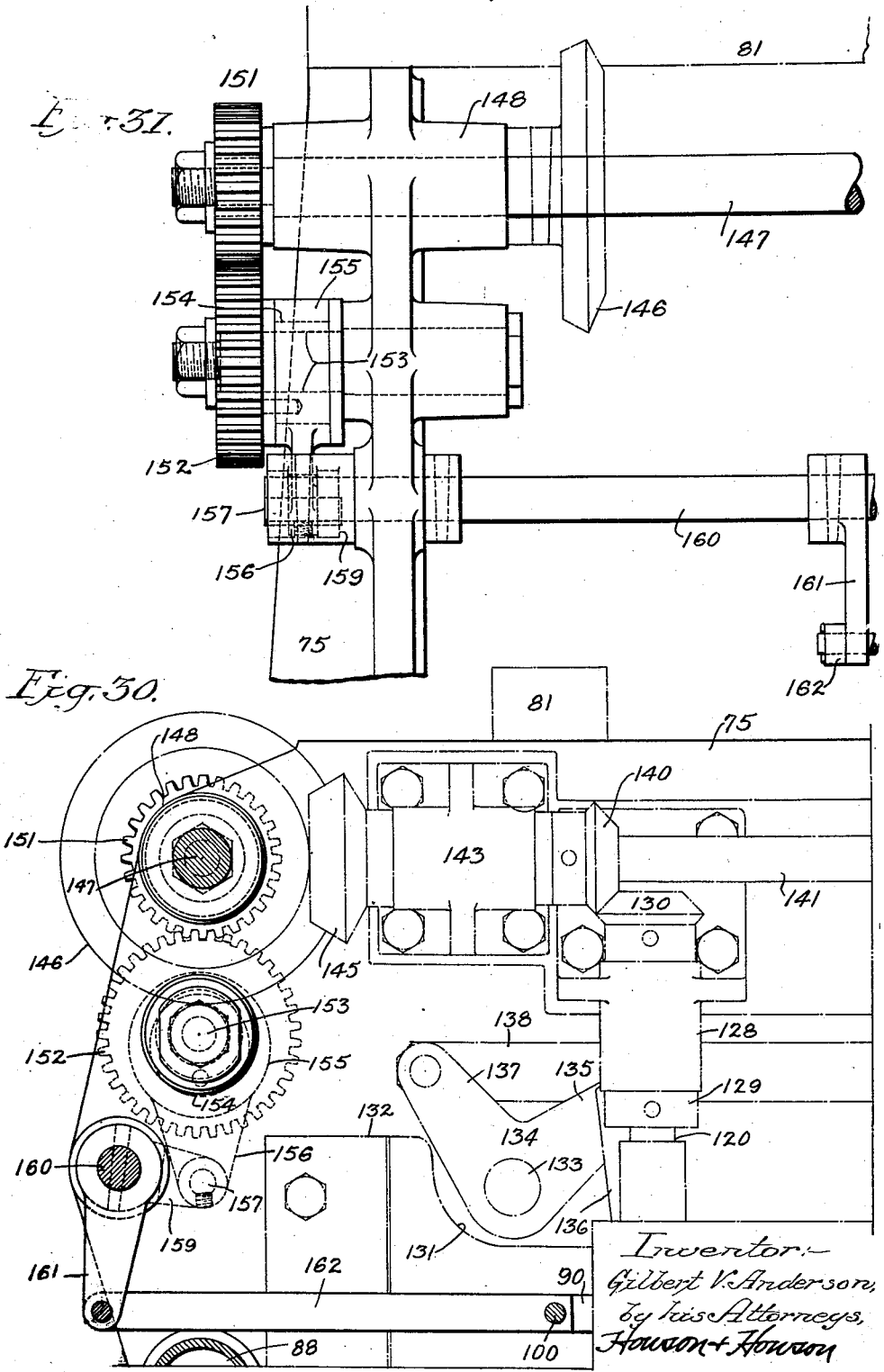

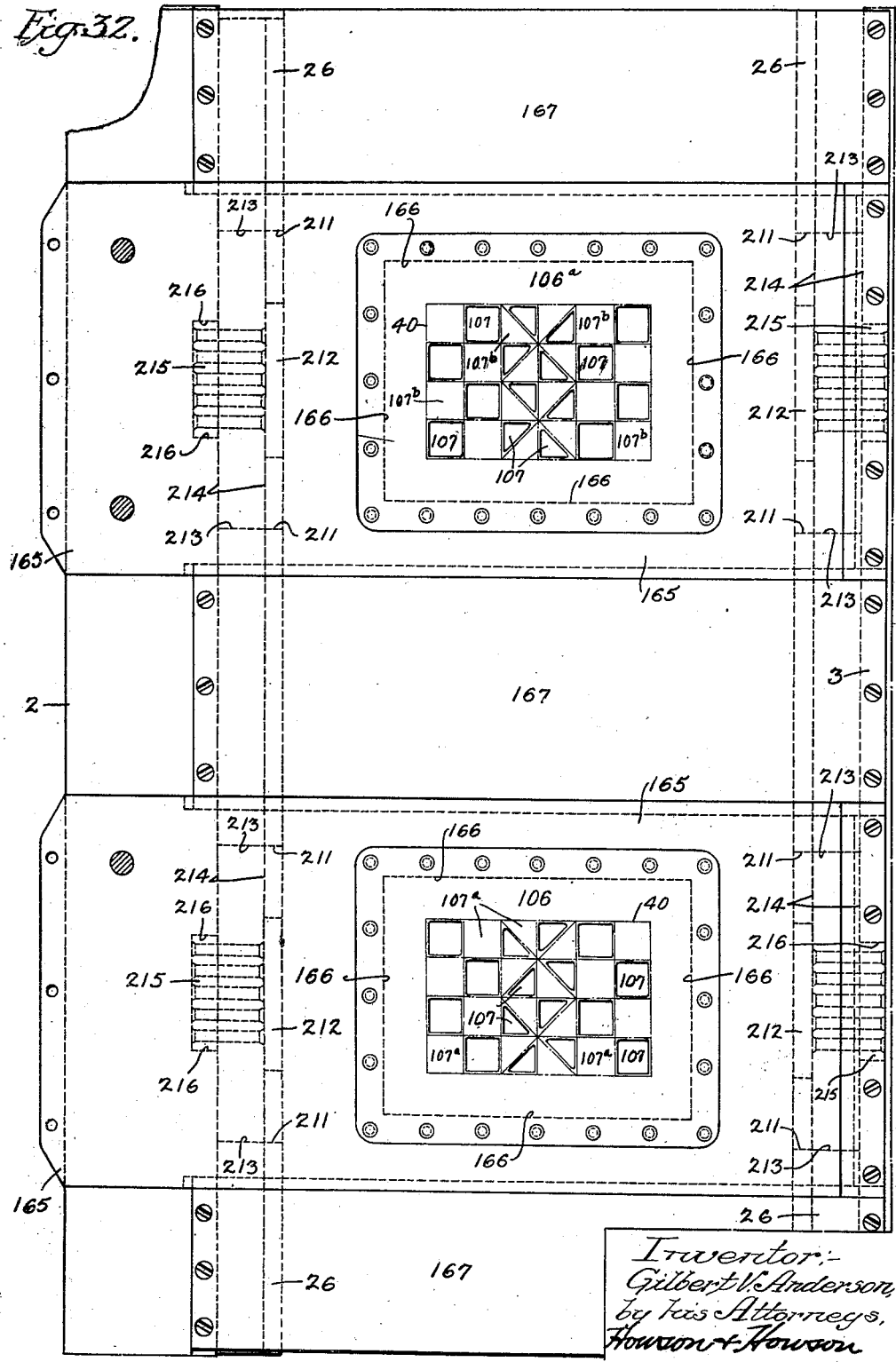

June 16, 1931. G. V. ANDERSON 1,810,869
MACHINE FOR MAKING INLAID FLOOR COVERINGS
Filed Sept. 6, 1927 59 Sheets-Sheet 28

Inventor:—
Gilbert V. Anderson
by his Attorneys,
Howson + Howson

June 16, 1931.   G. V. ANDERSON   1,810,869
MACHINE FOR MAKING INLAID FLOOR COVERINGS
Filed Sept. 6, 1927   59 Sheets-Sheet 29
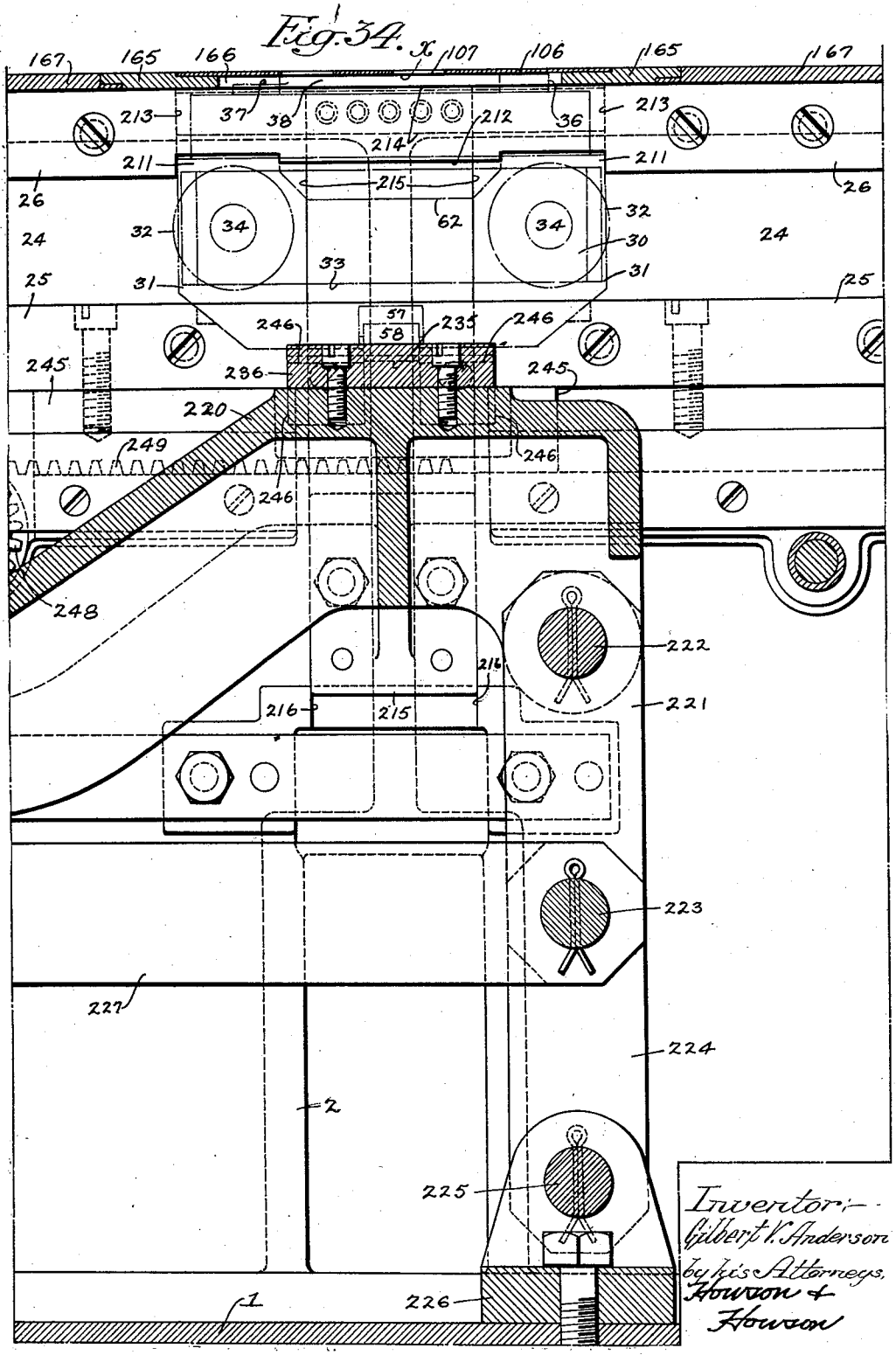

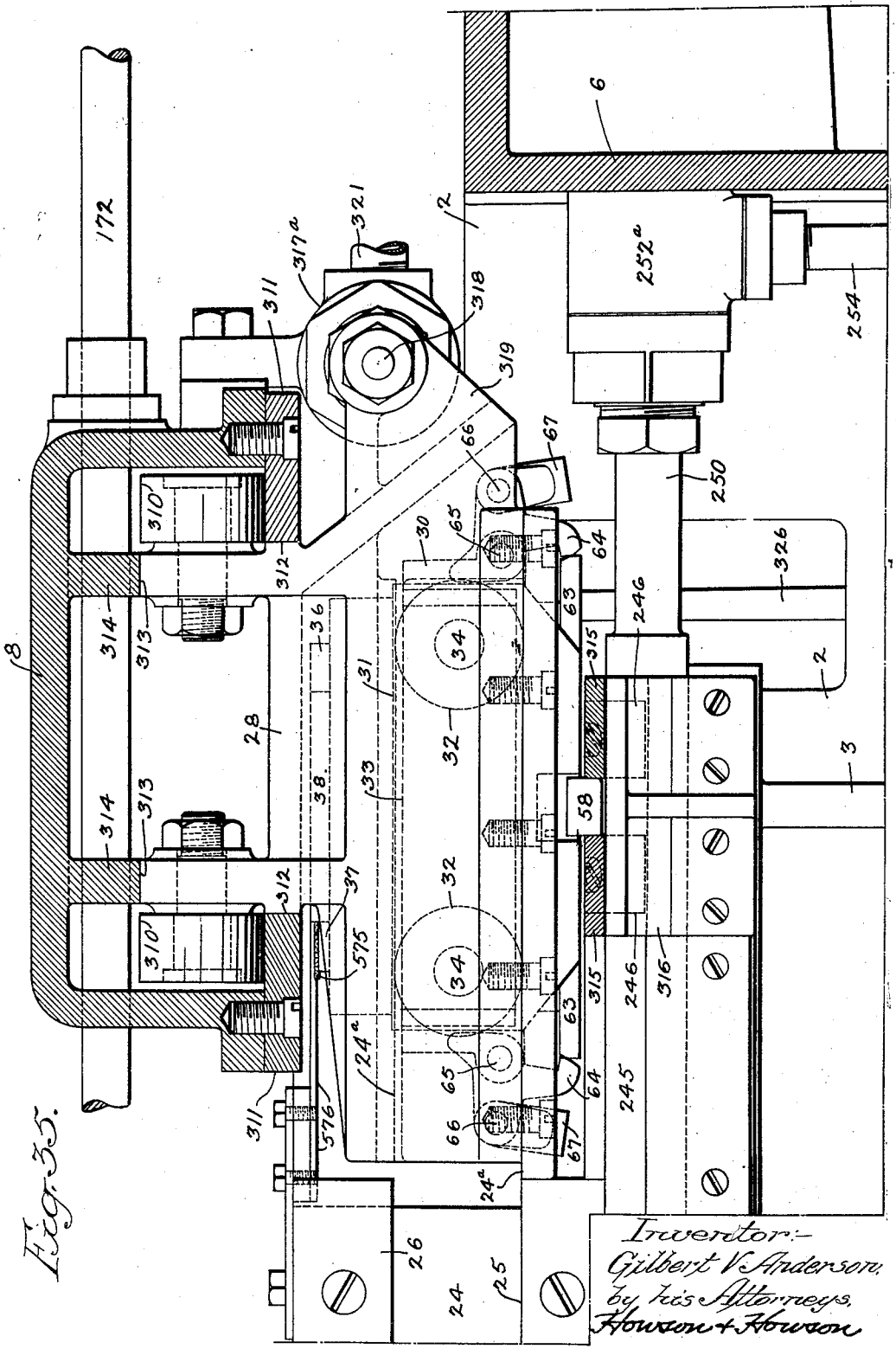

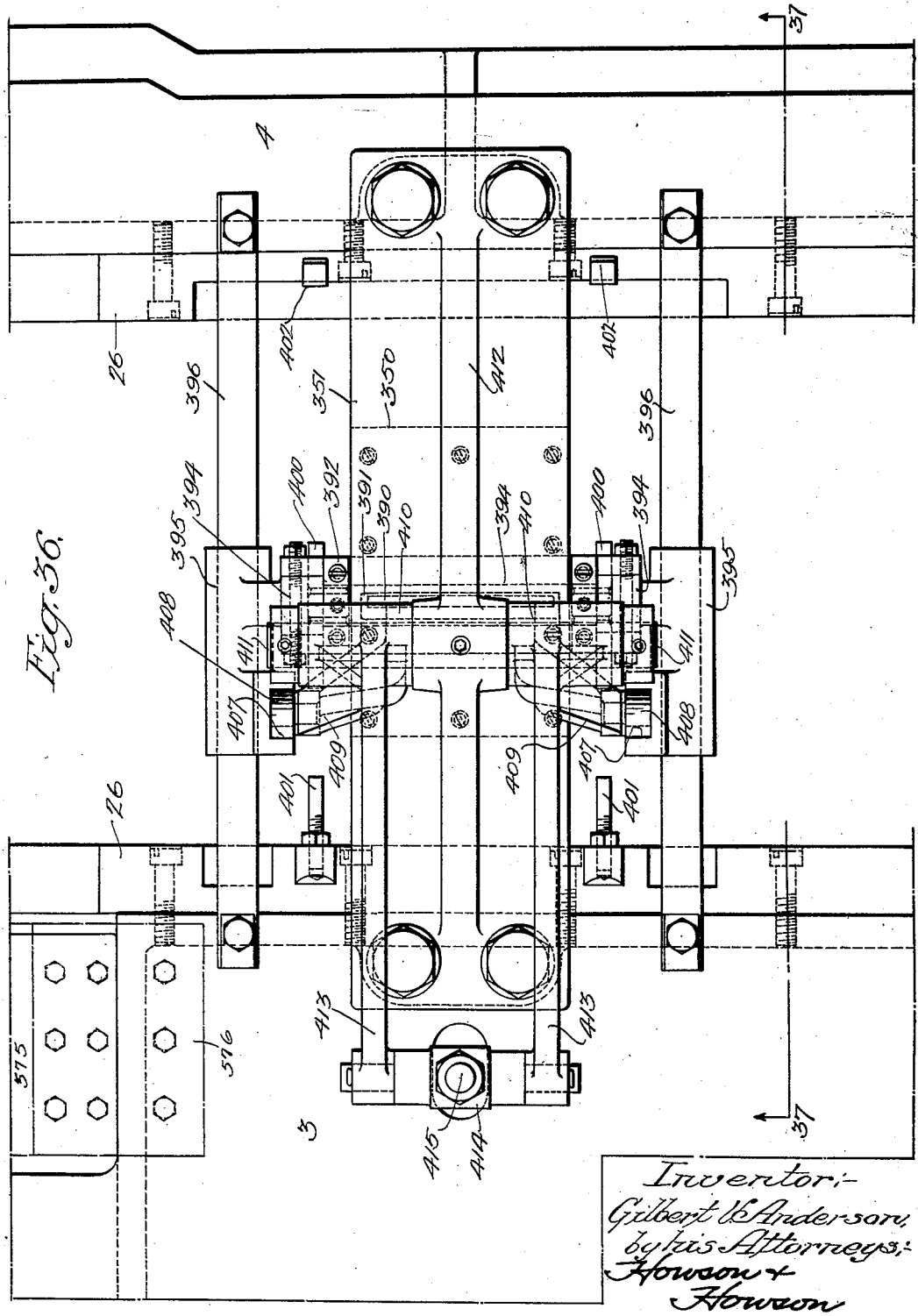

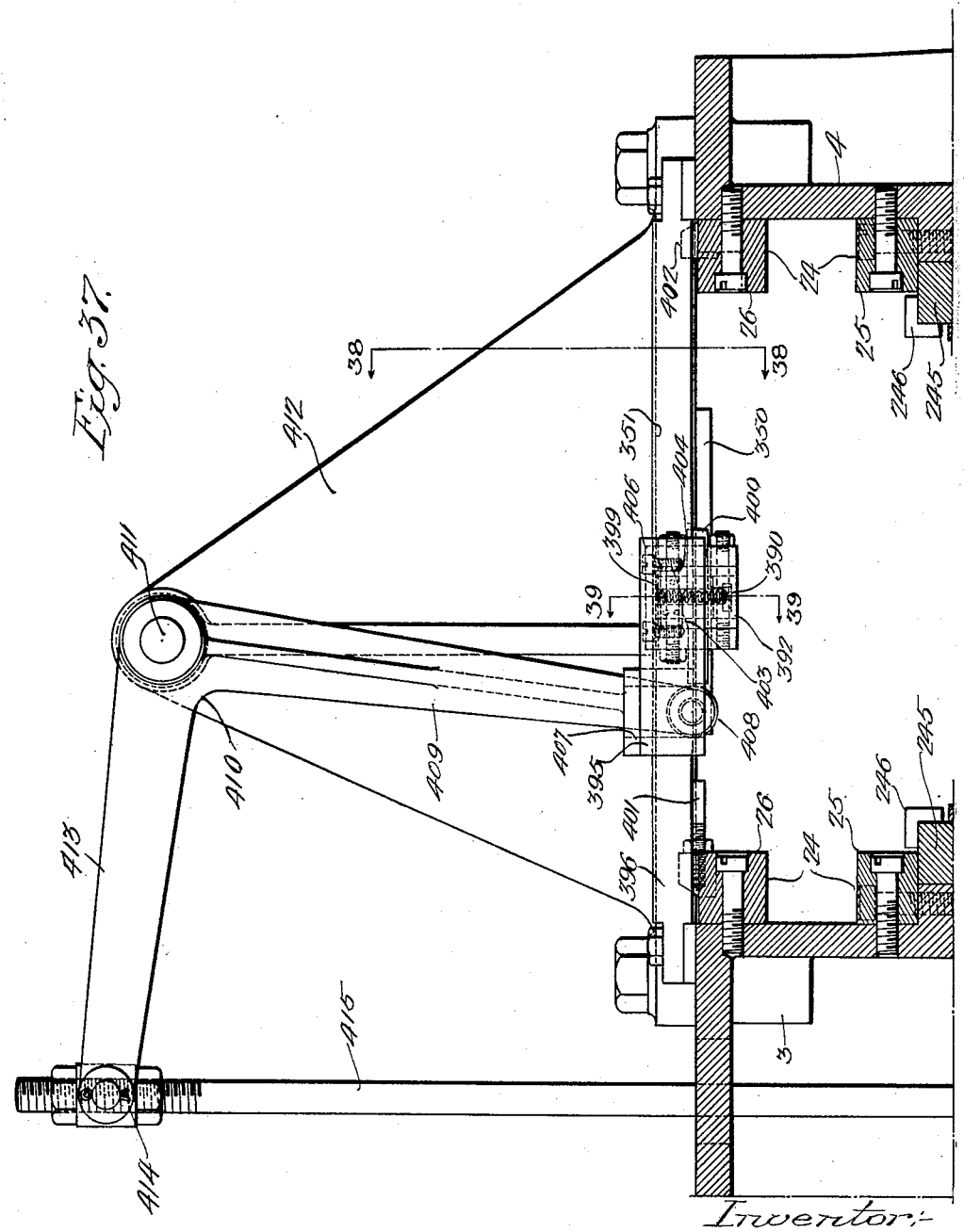

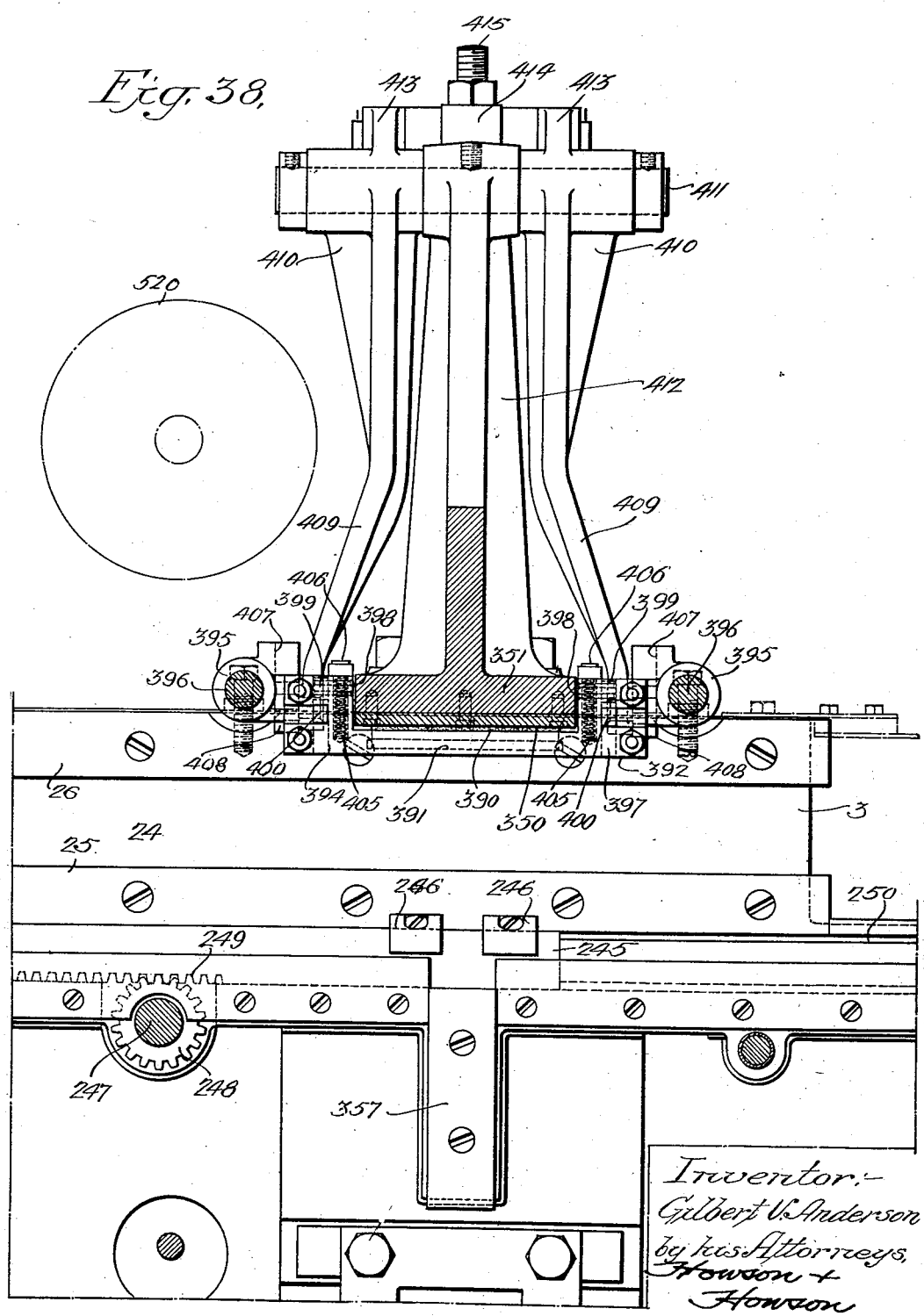

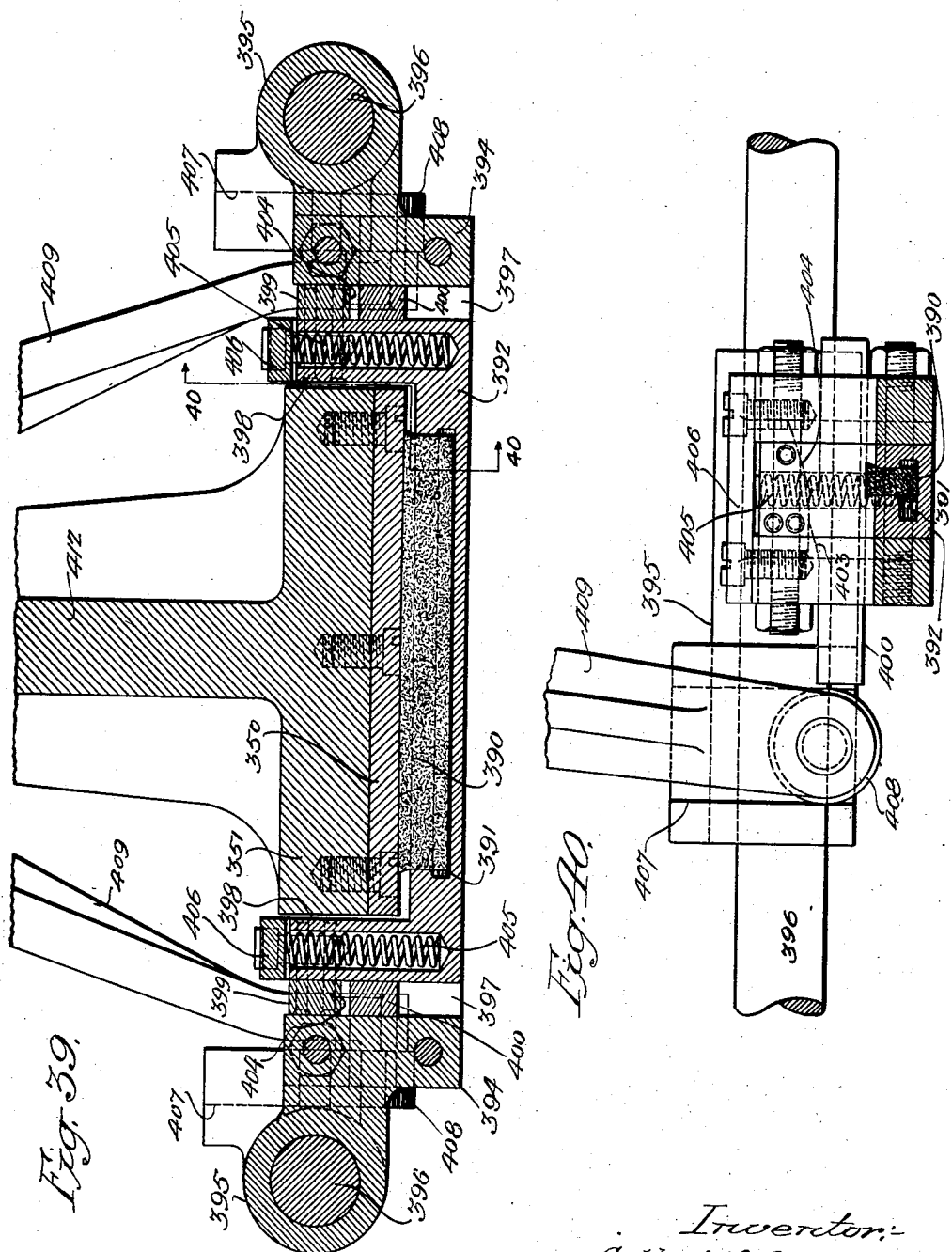

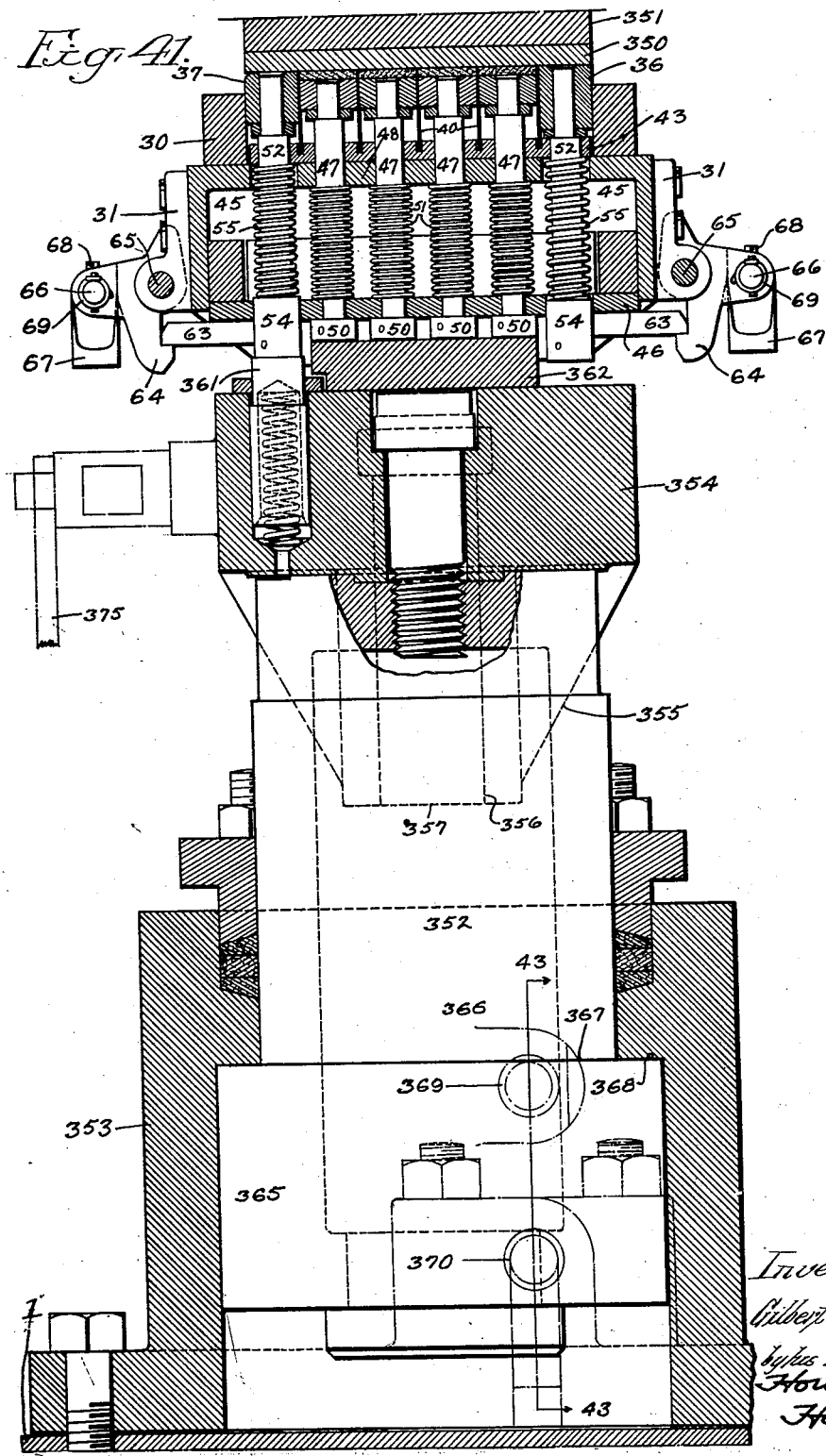

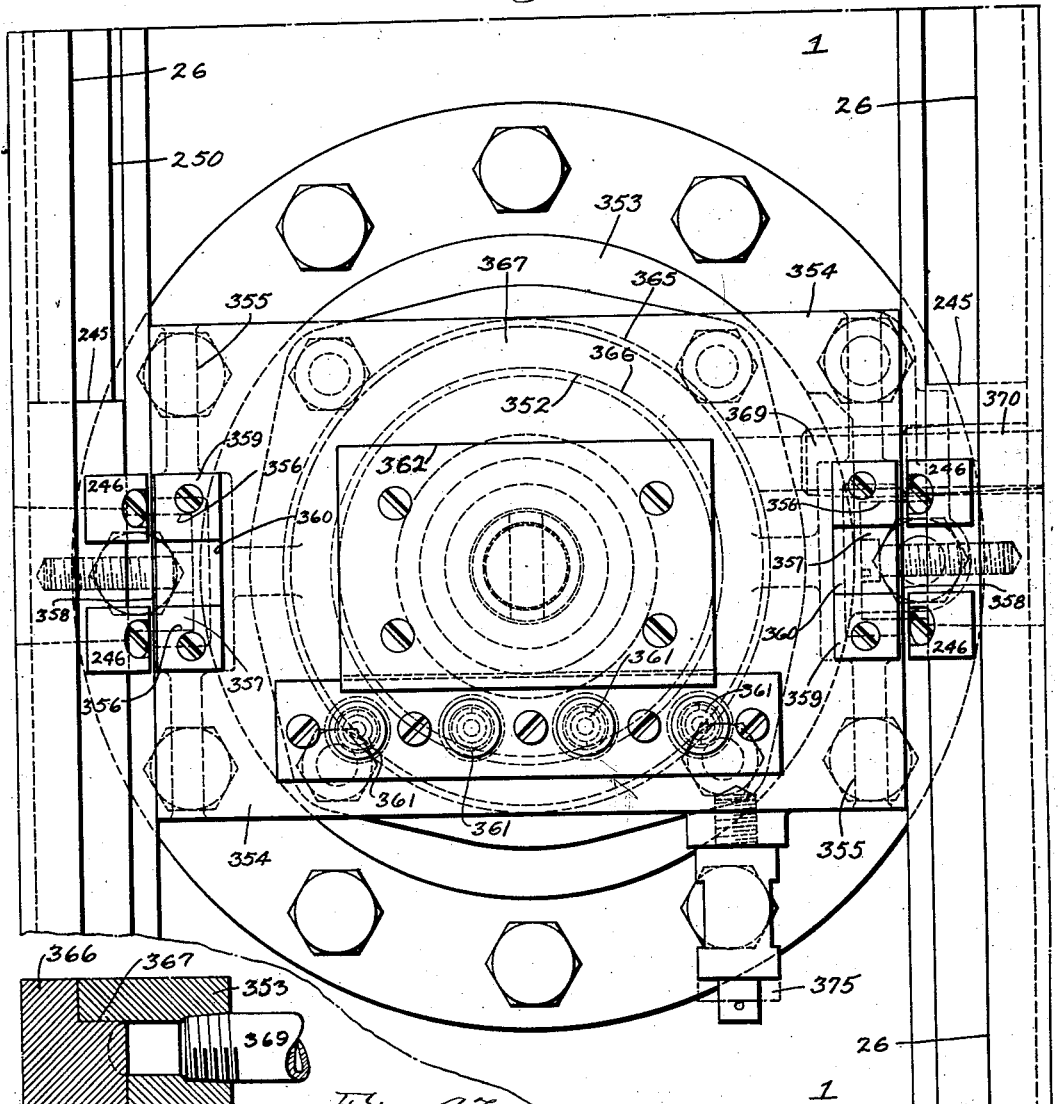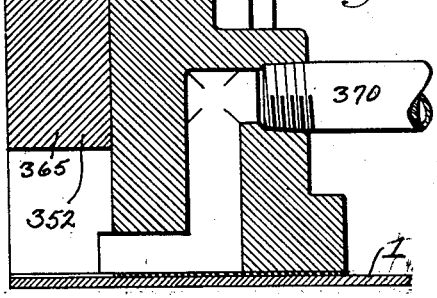

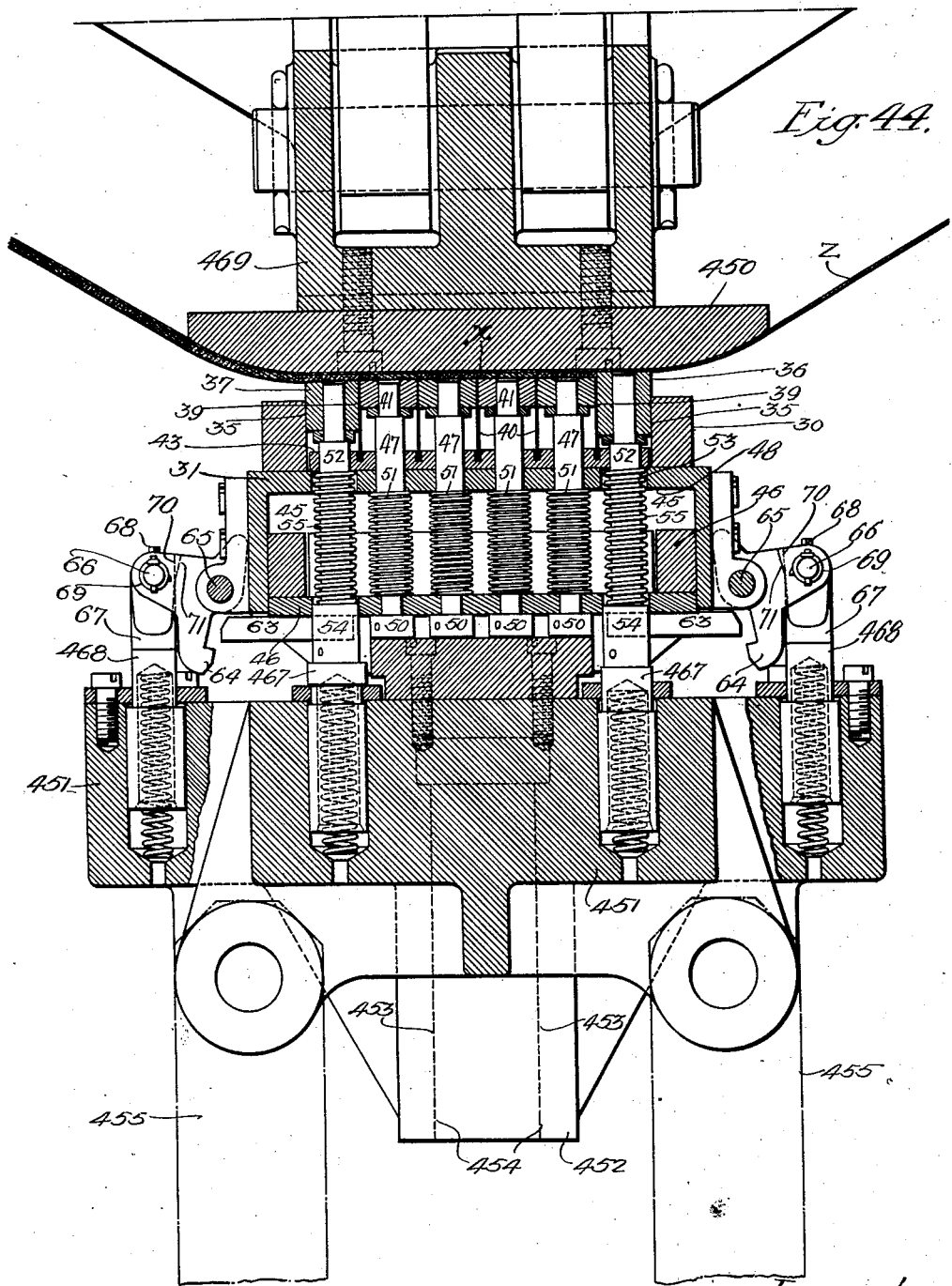

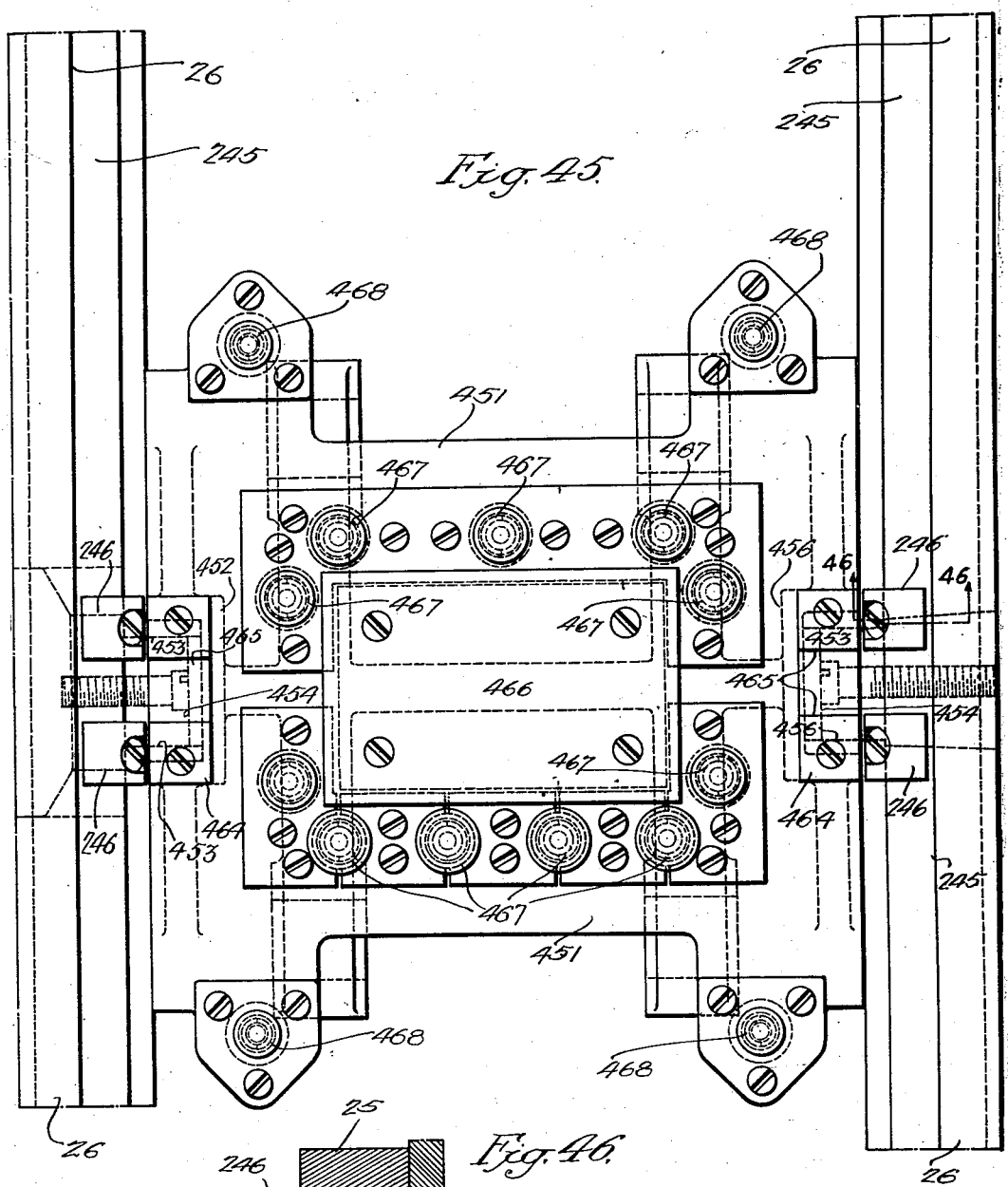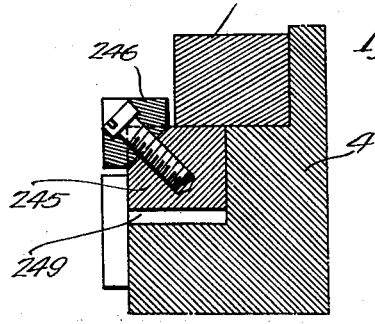

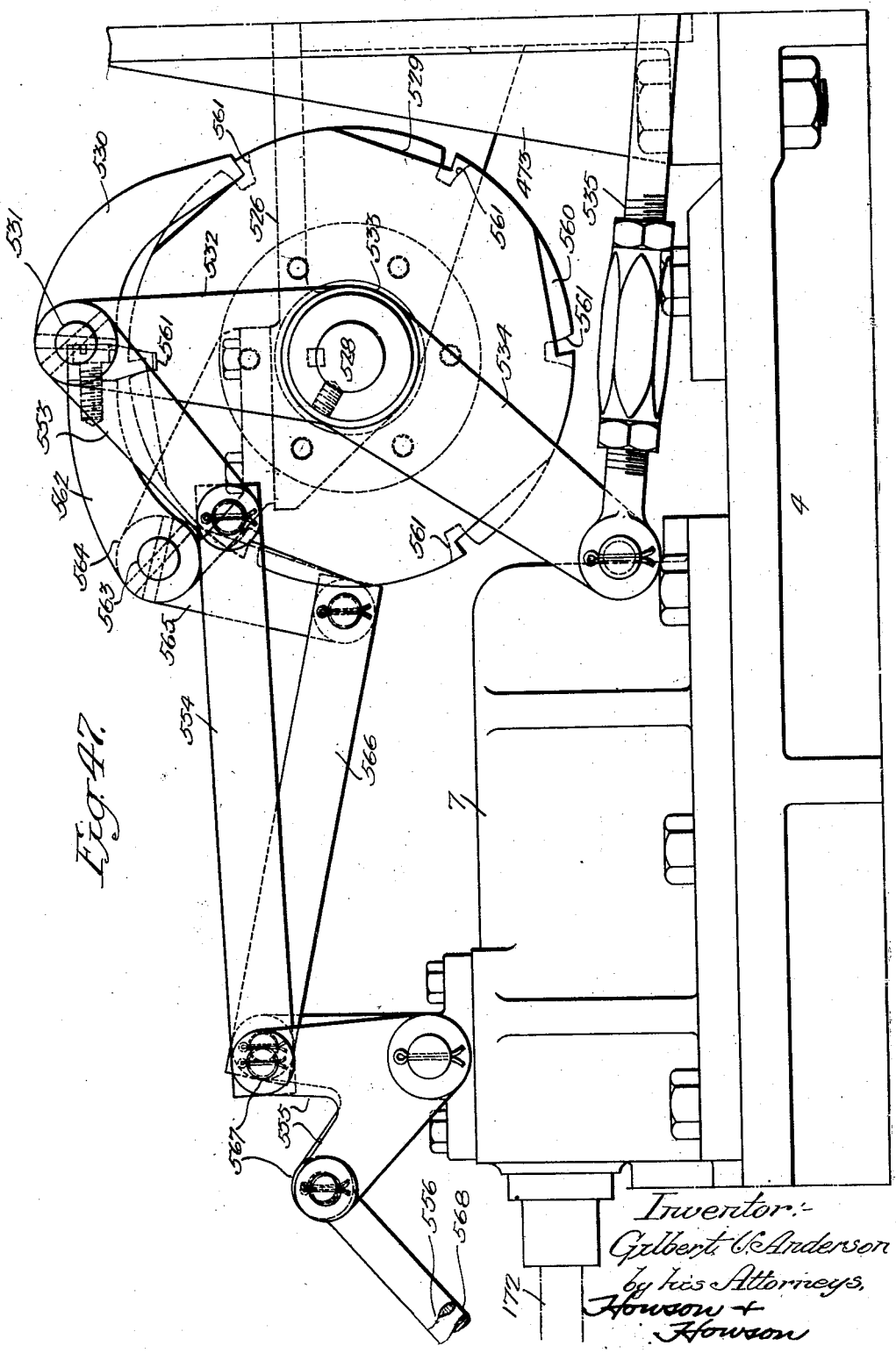

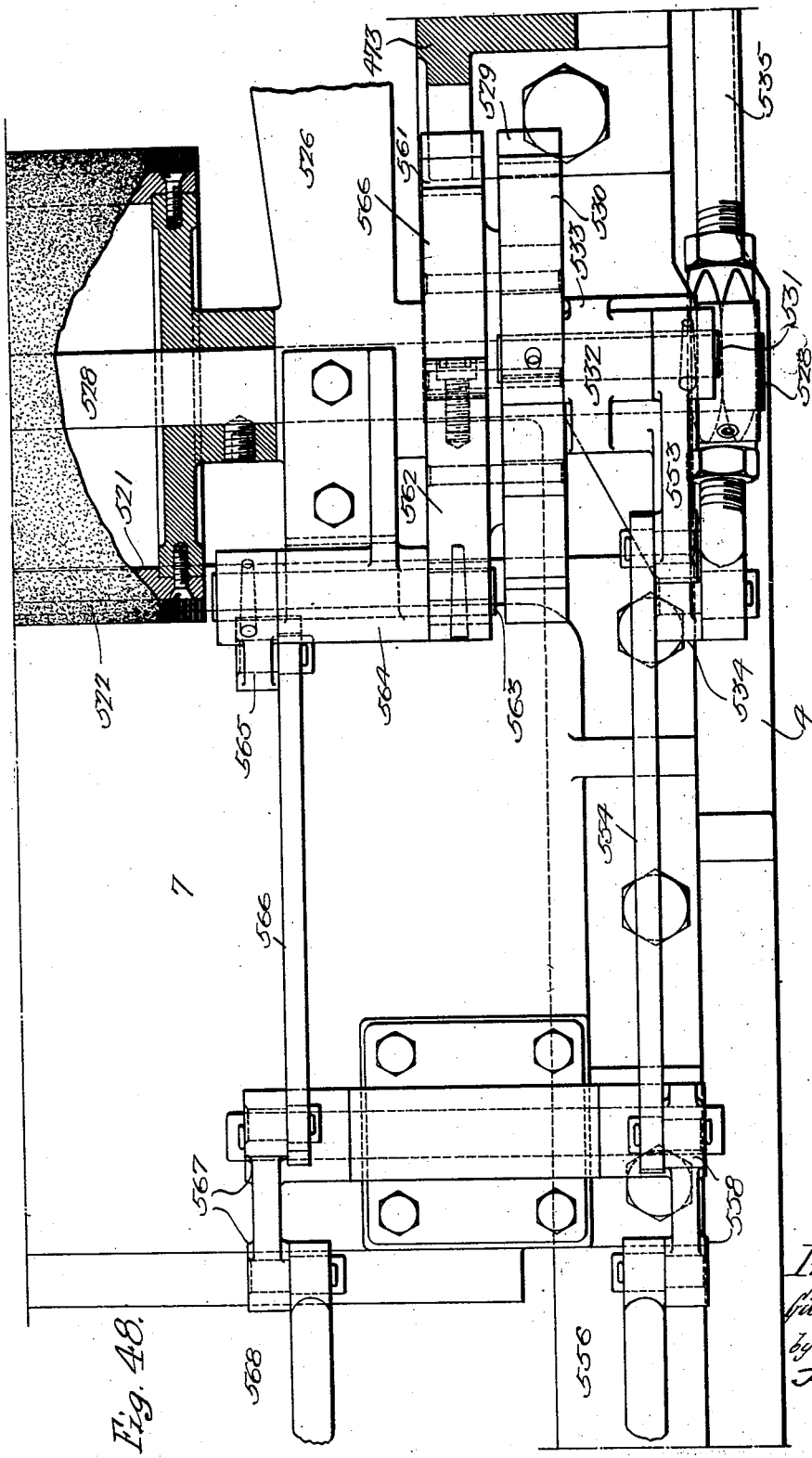

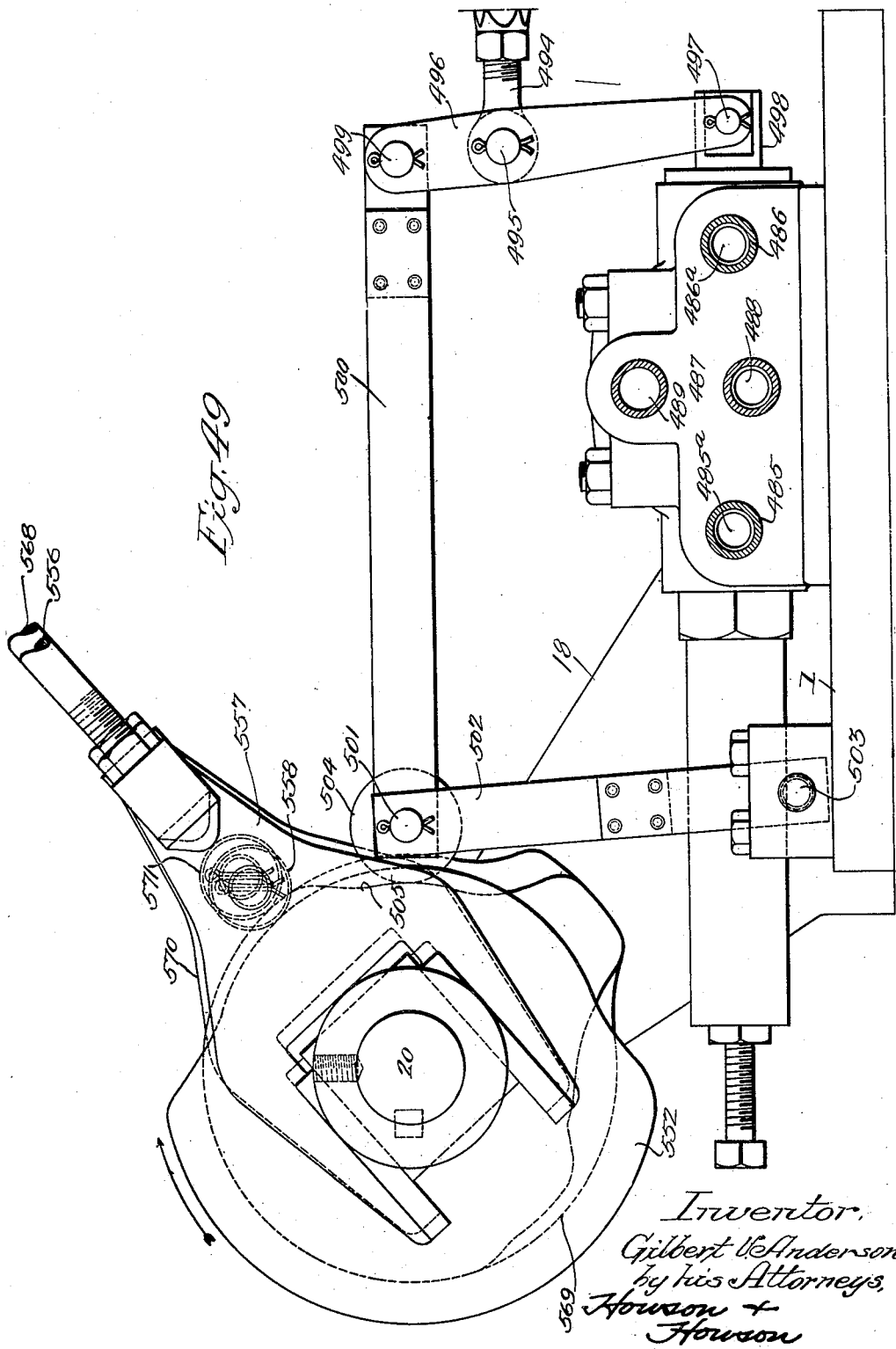

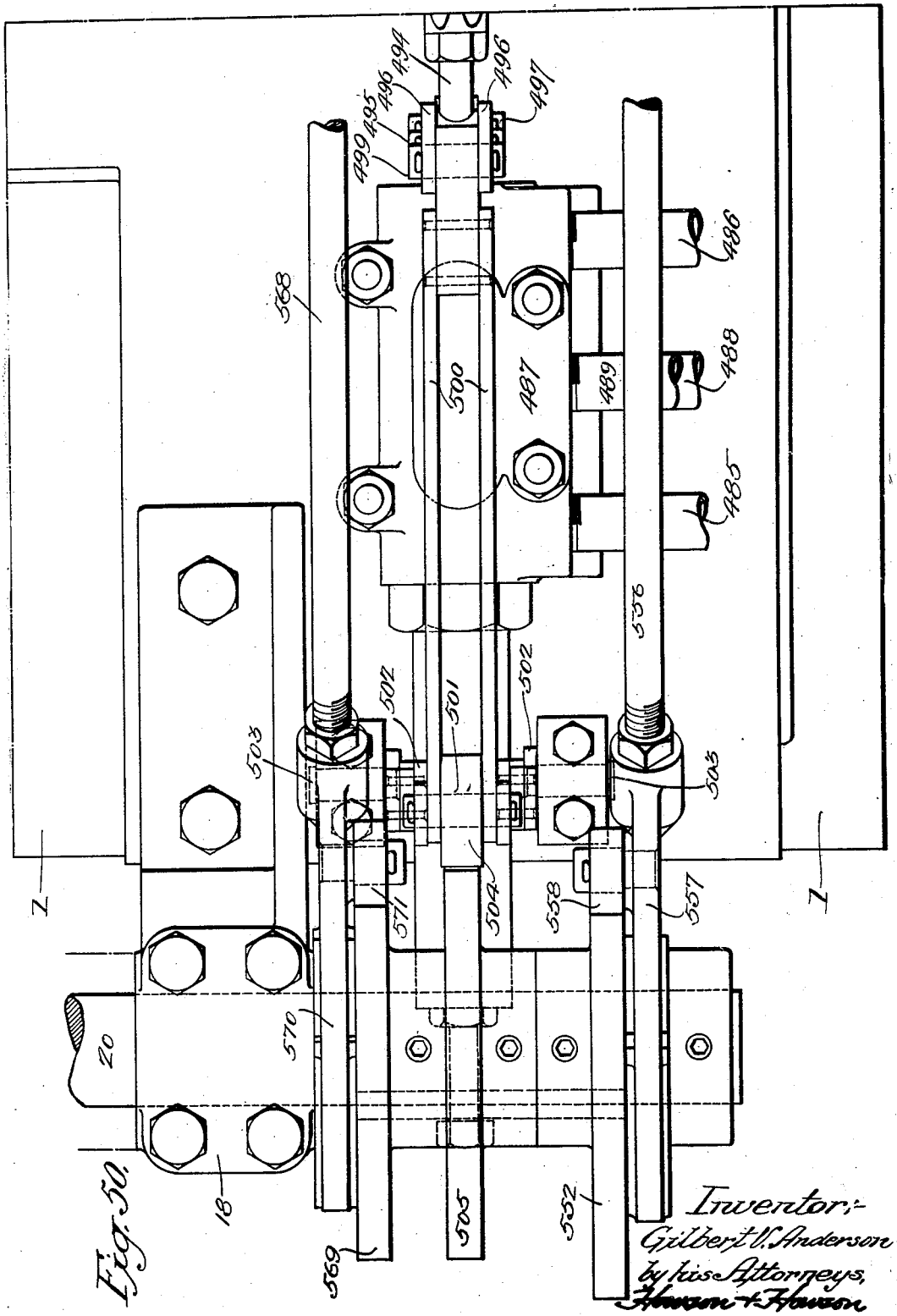

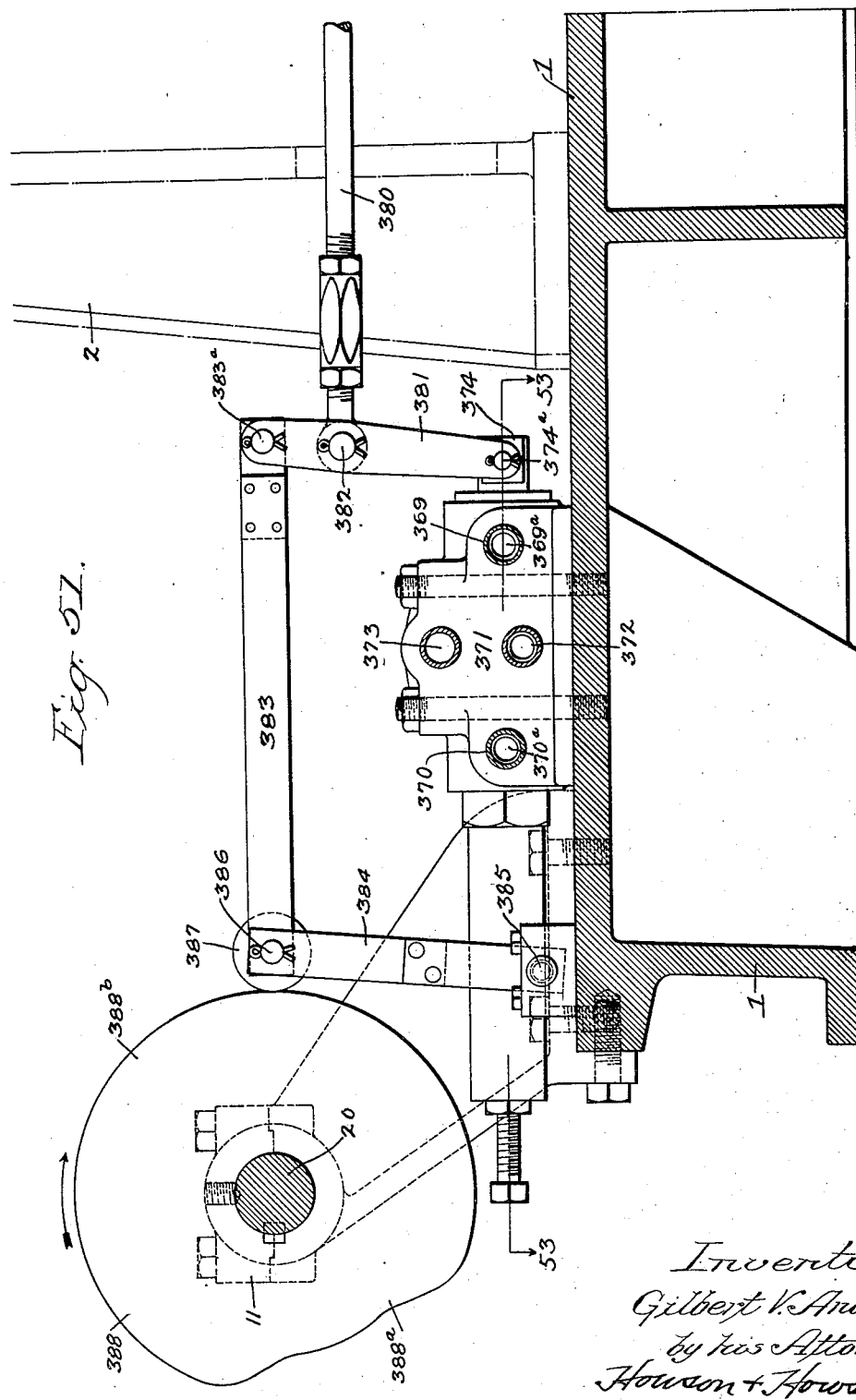

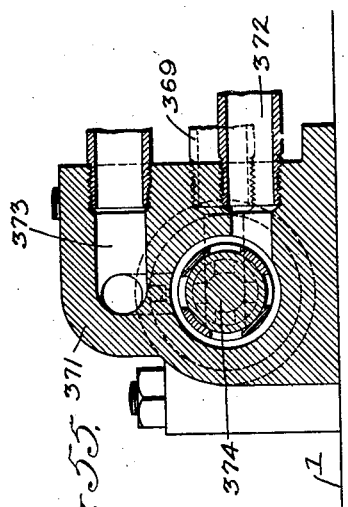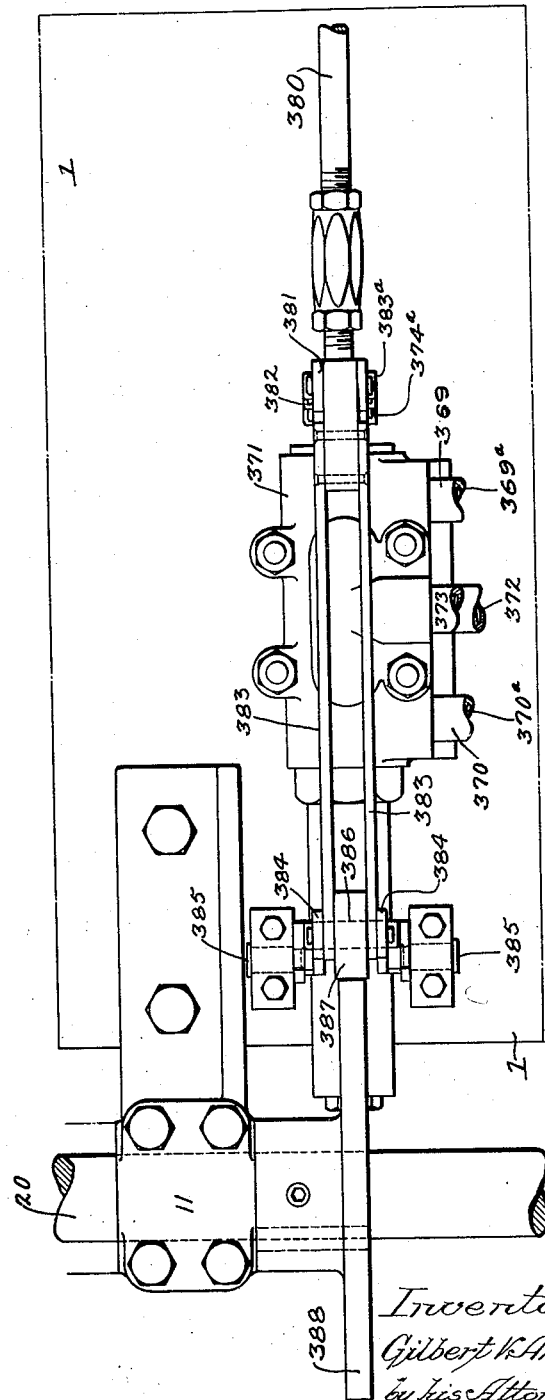

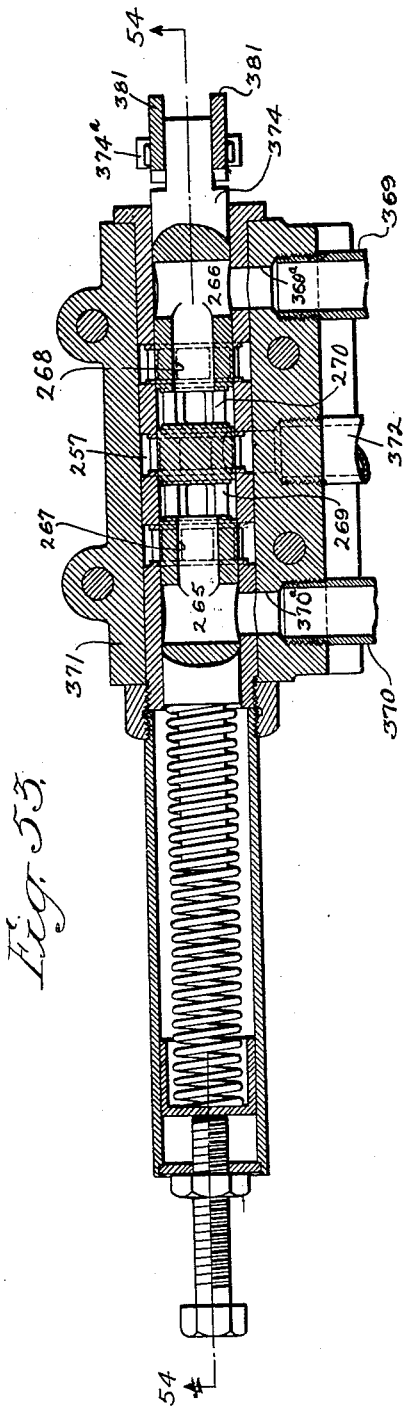
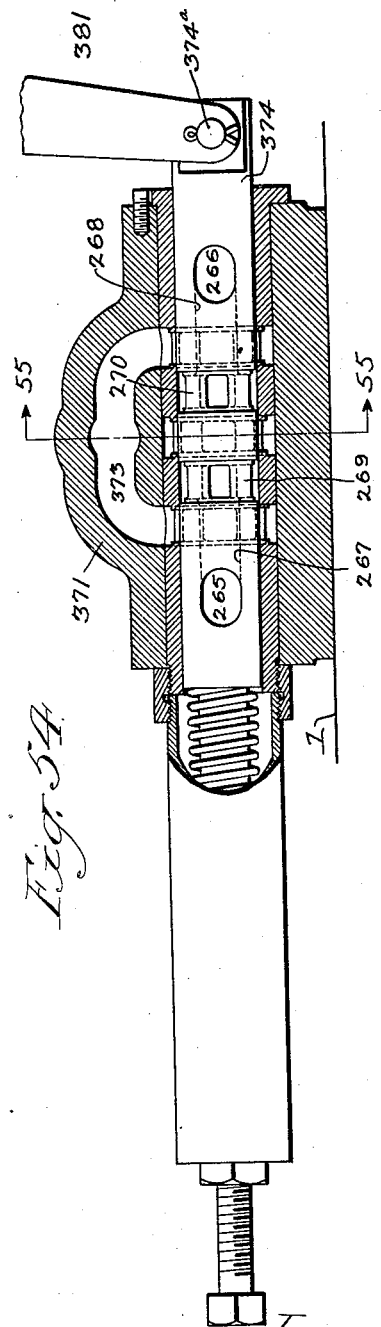

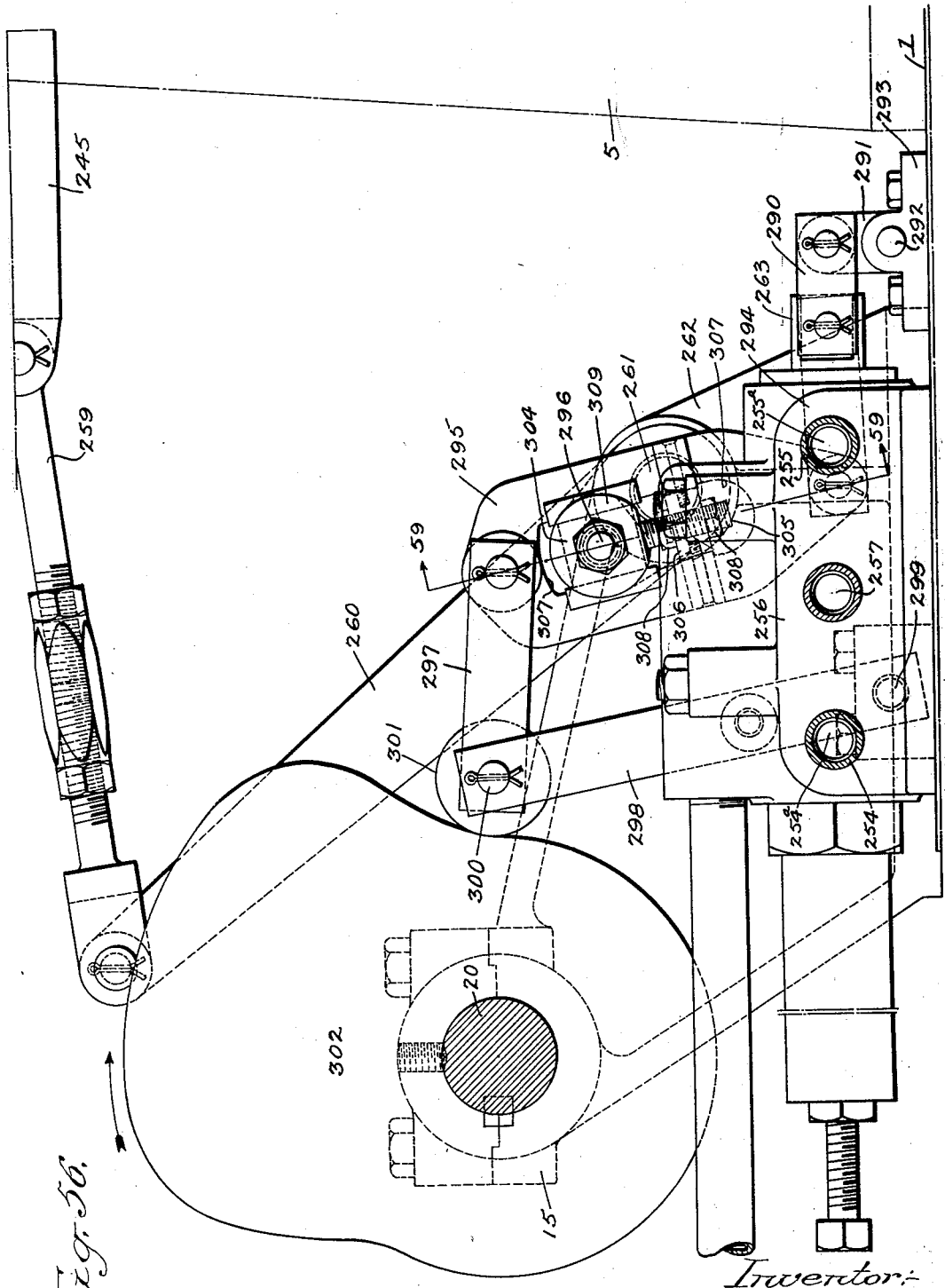

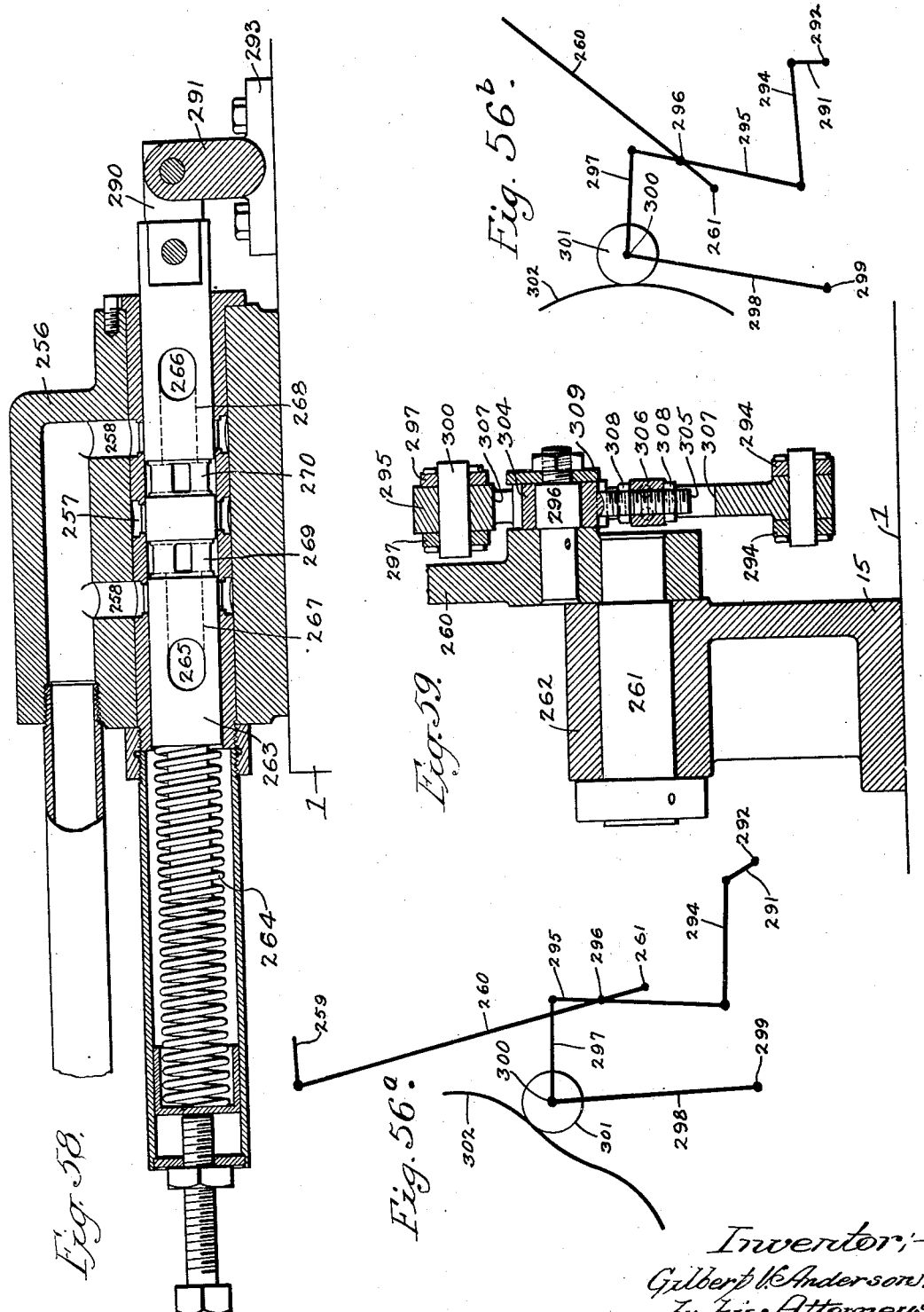

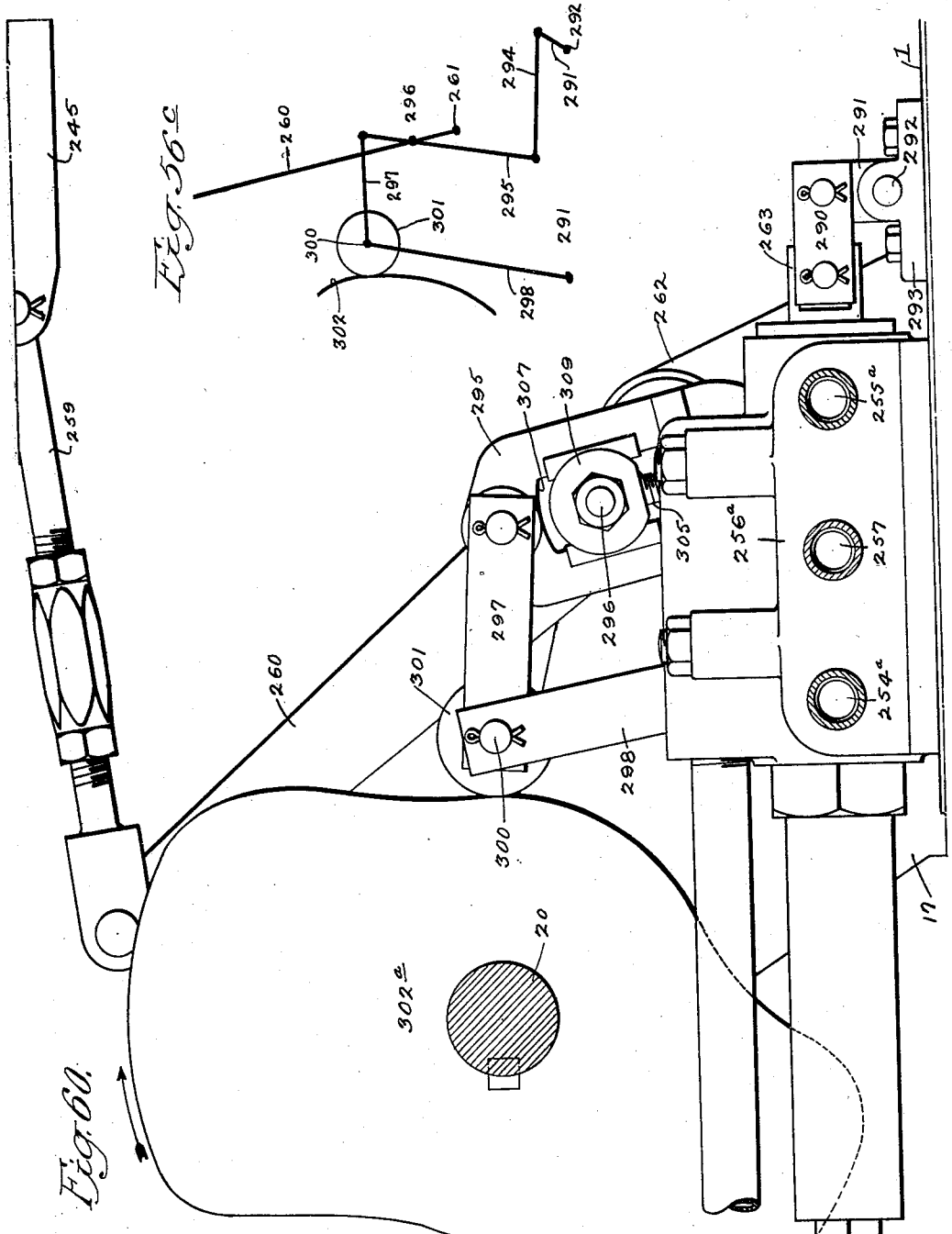

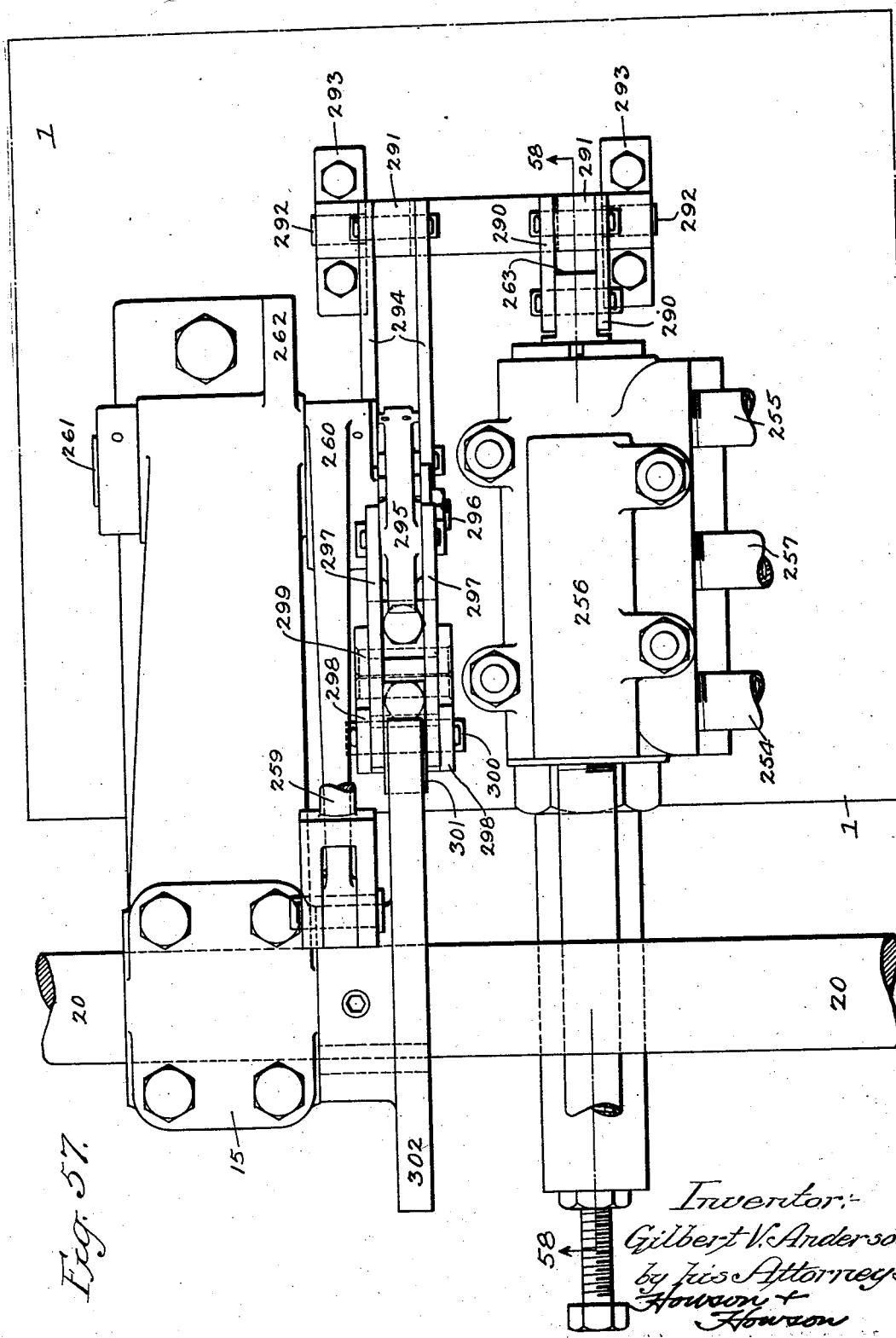

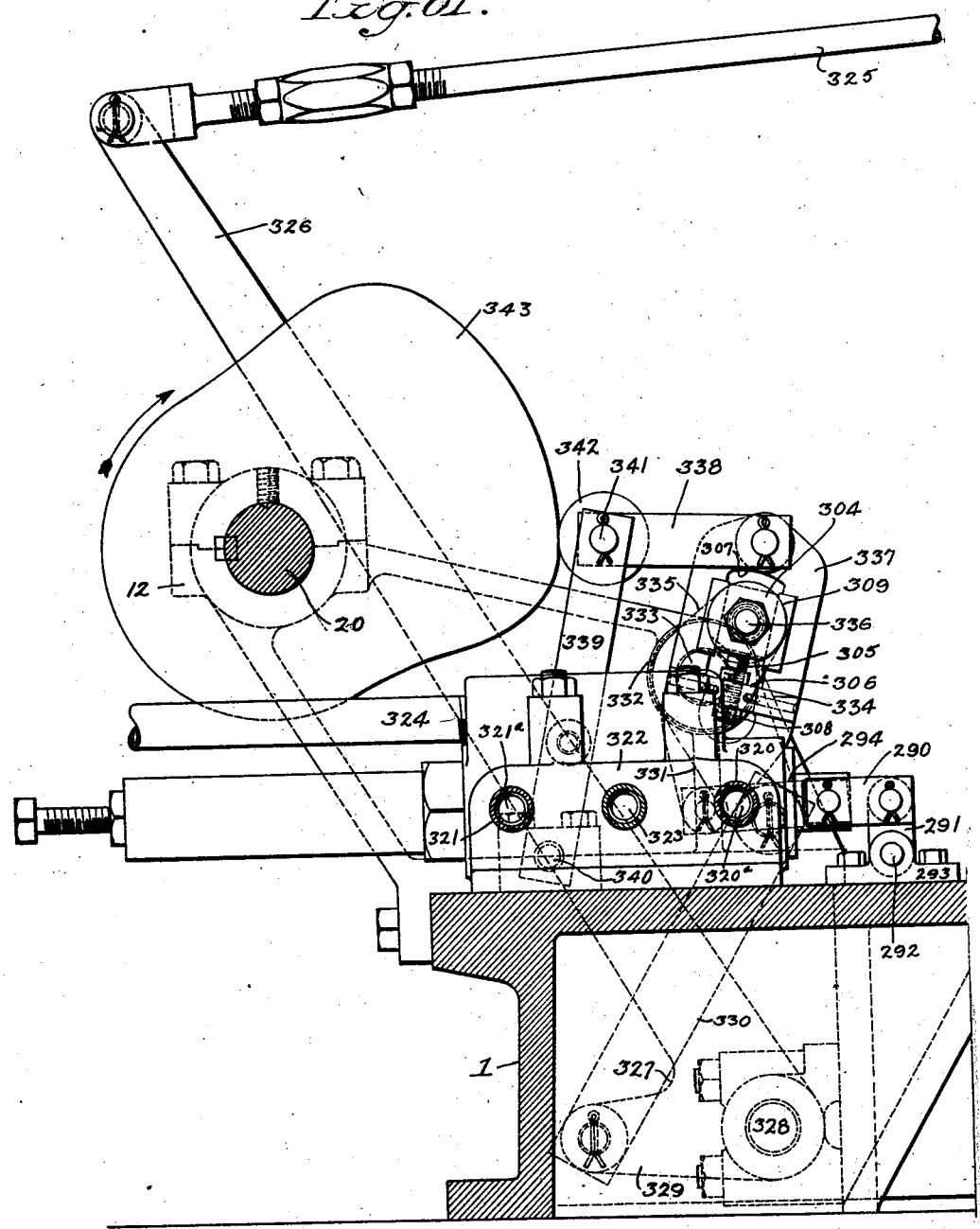

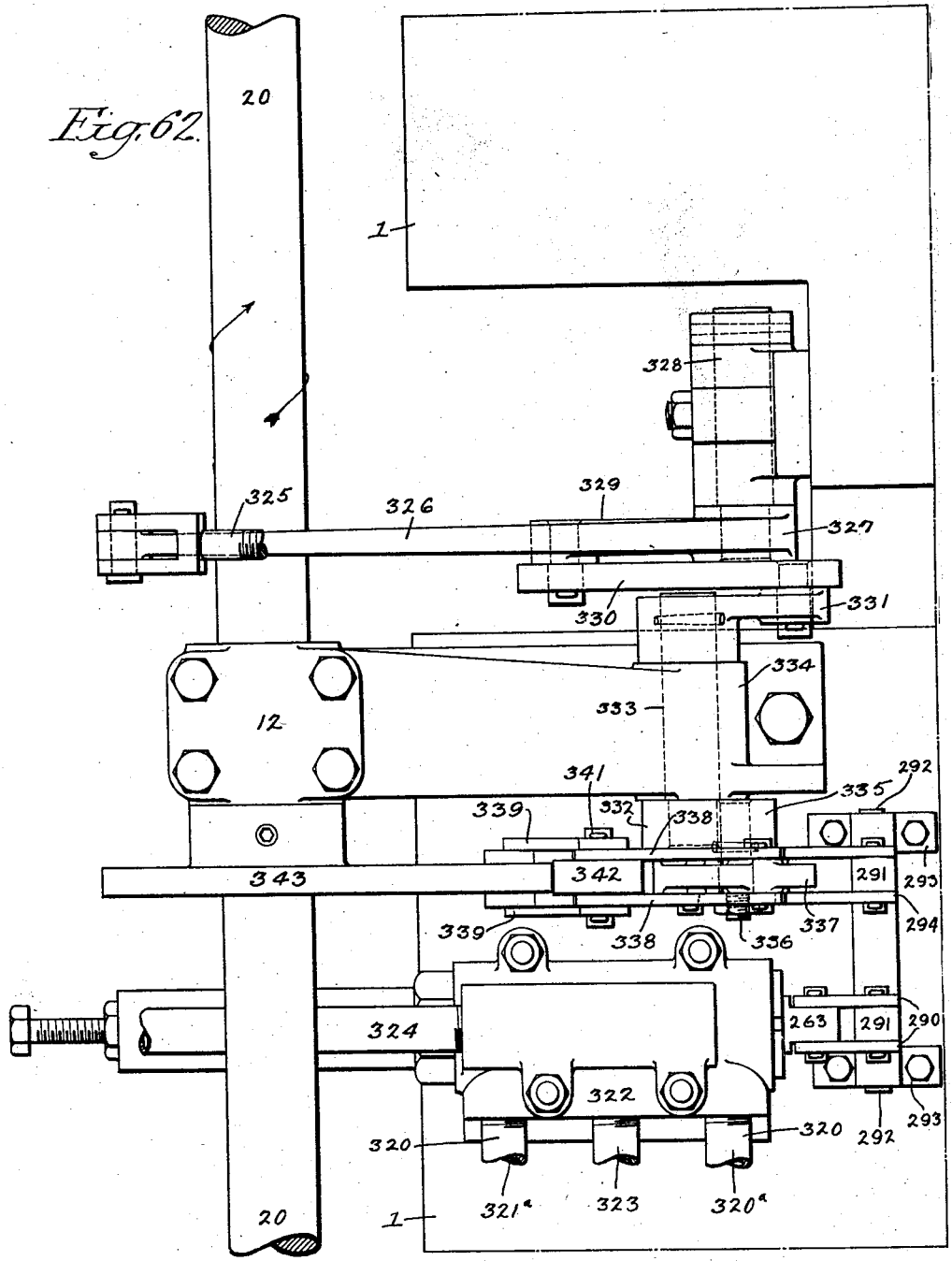

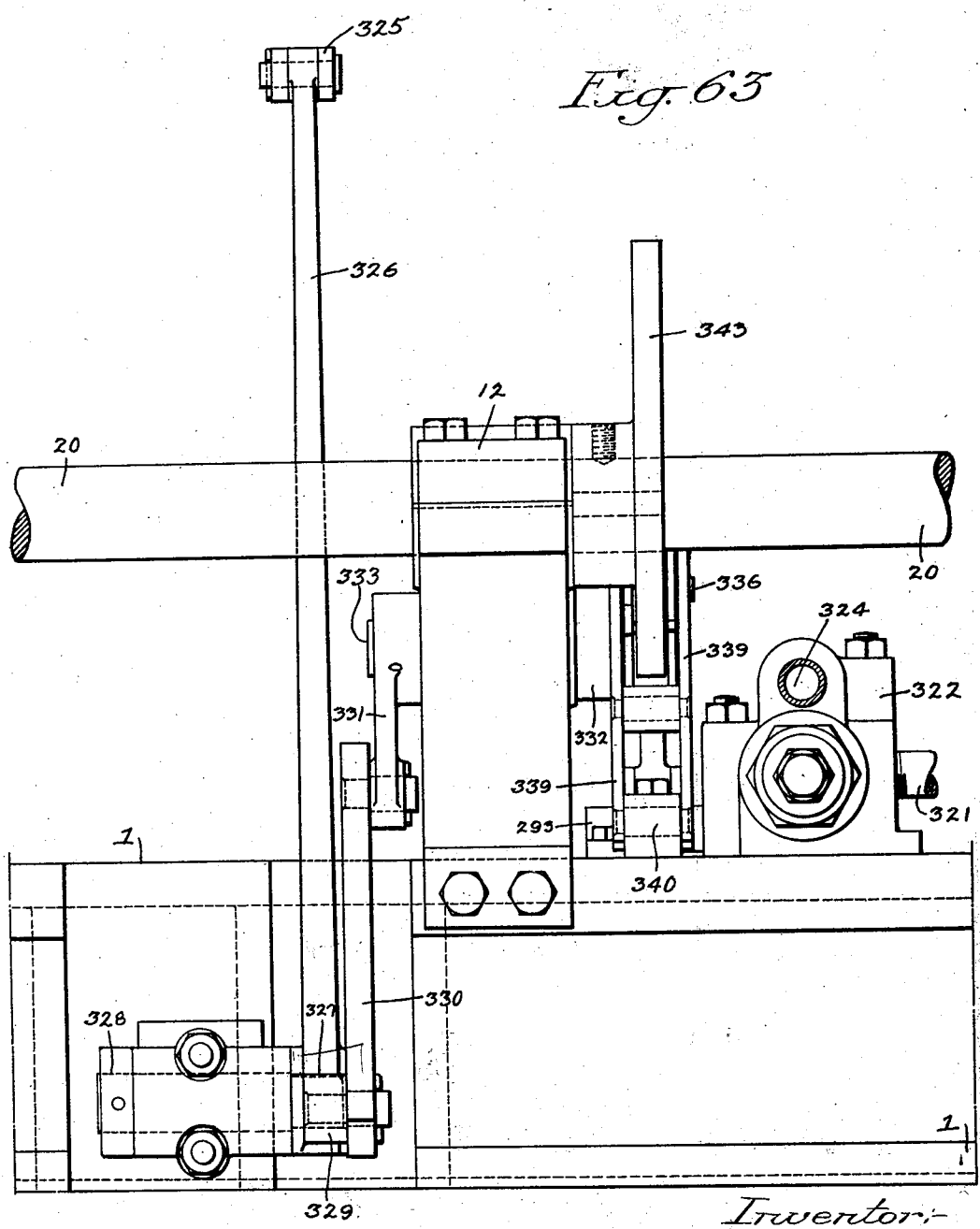

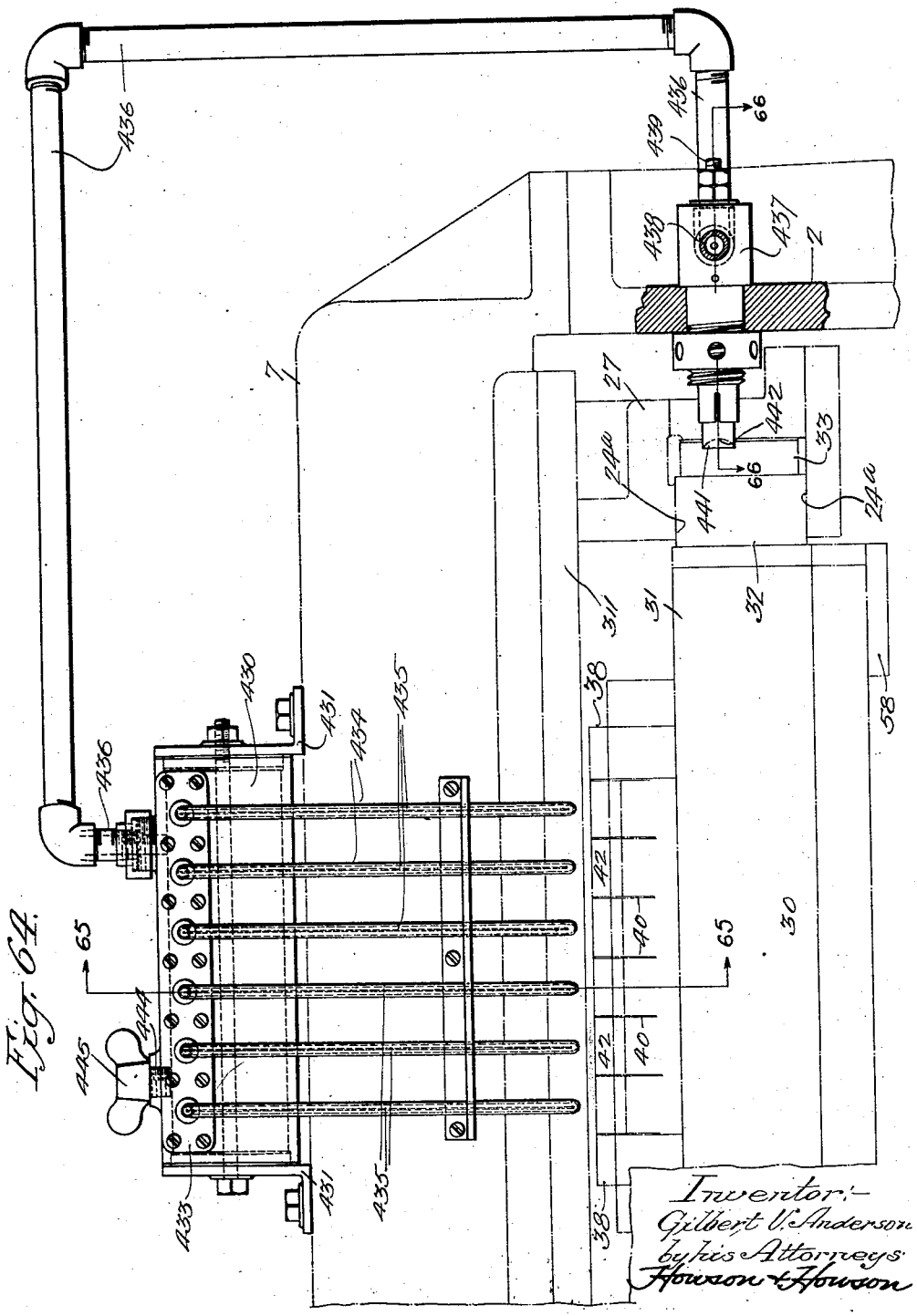

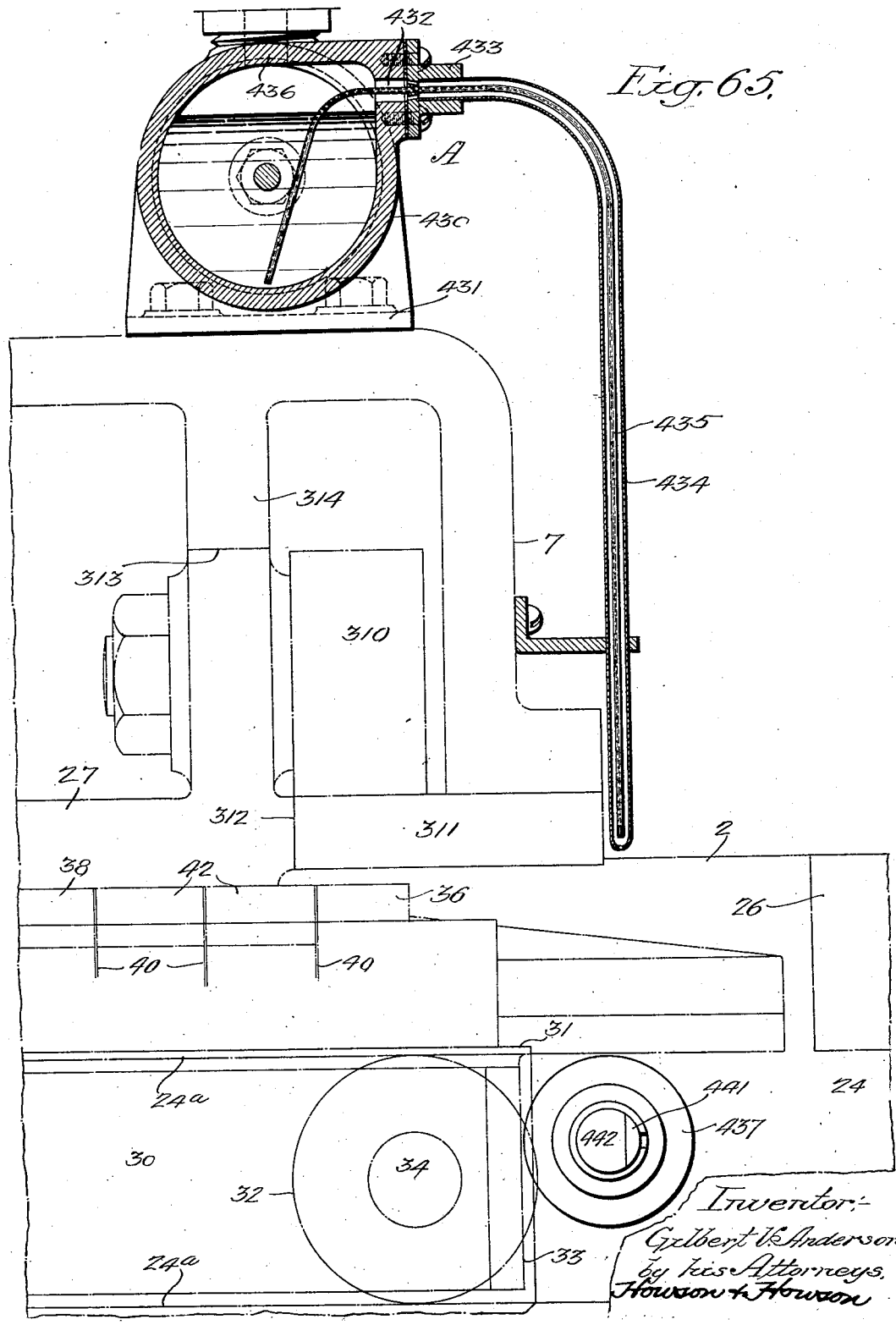

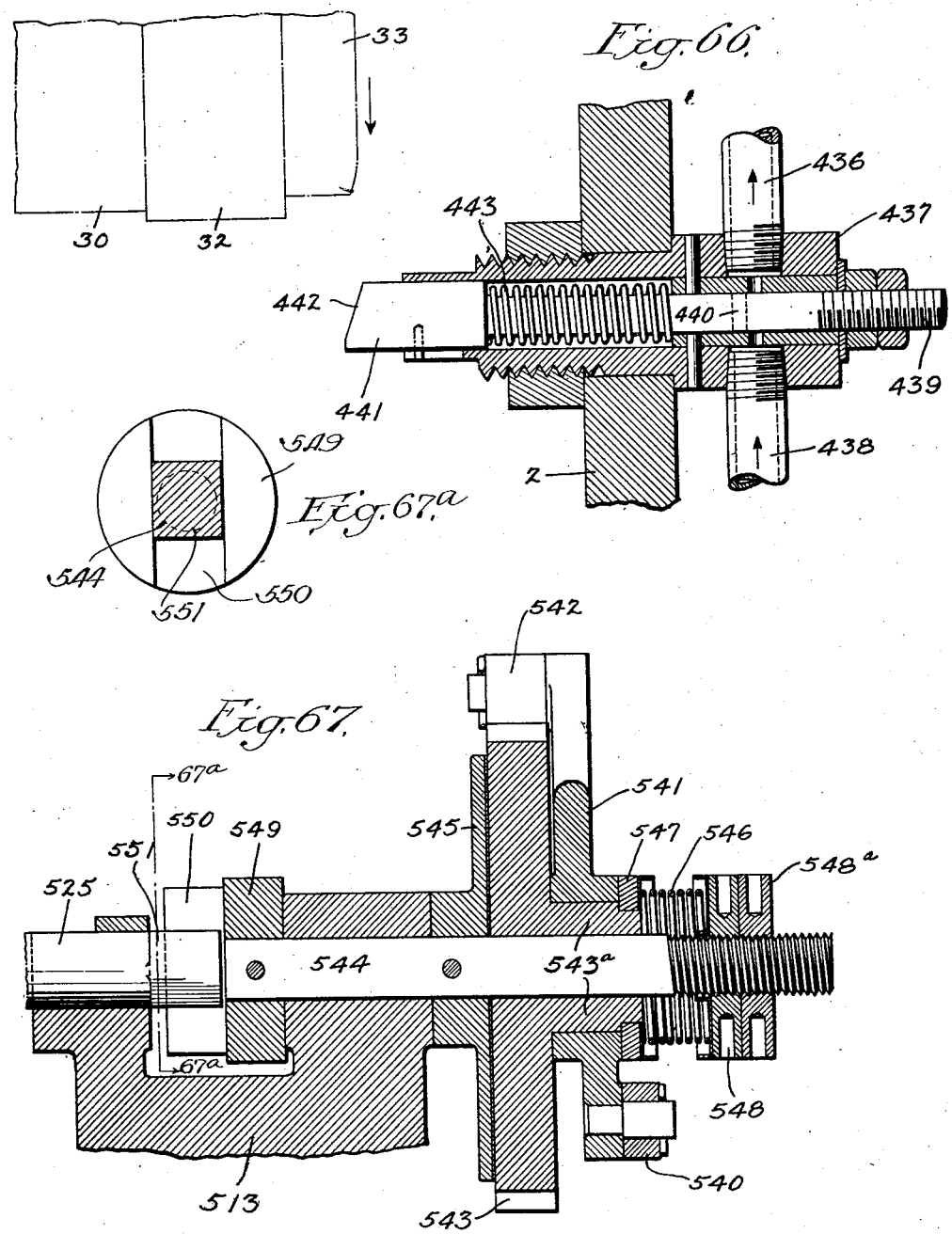

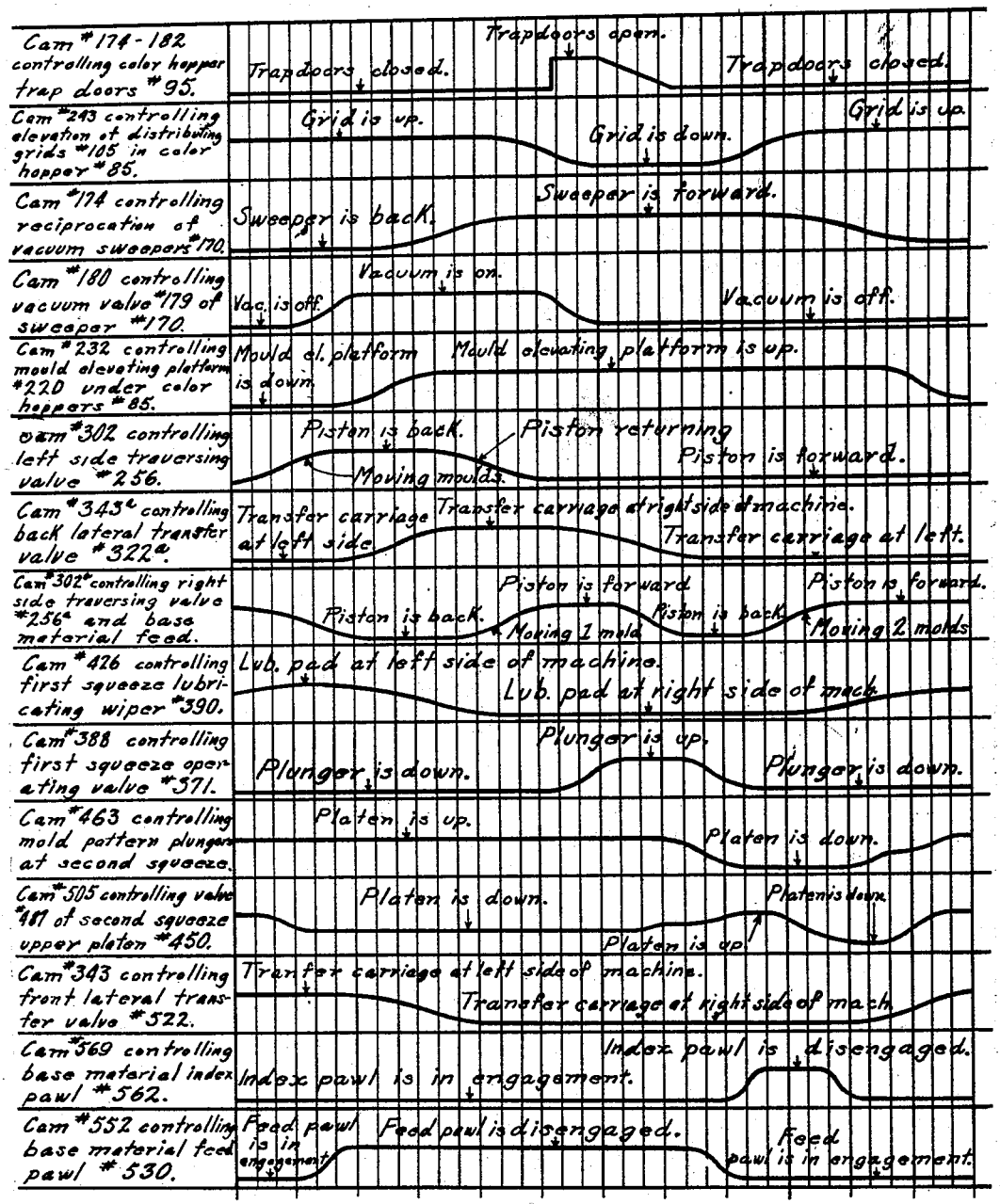

June 16, 1931.　　　G. V. ANDERSON　　　1,810,869
MACHINE FOR MAKING INLAID FLOOR COVERINGS
Filed Sept. 6, 1927　　59 Sheets-Sheet 57
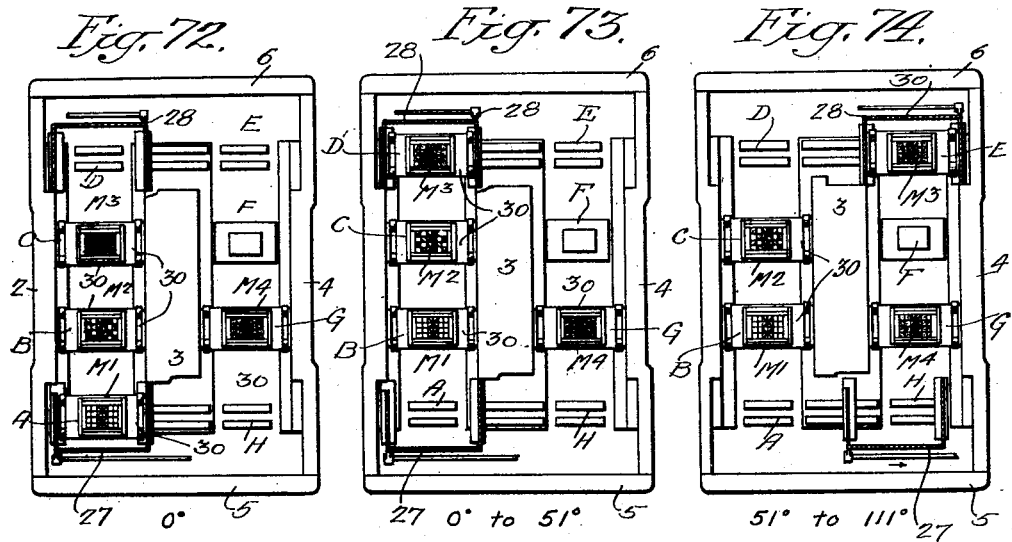
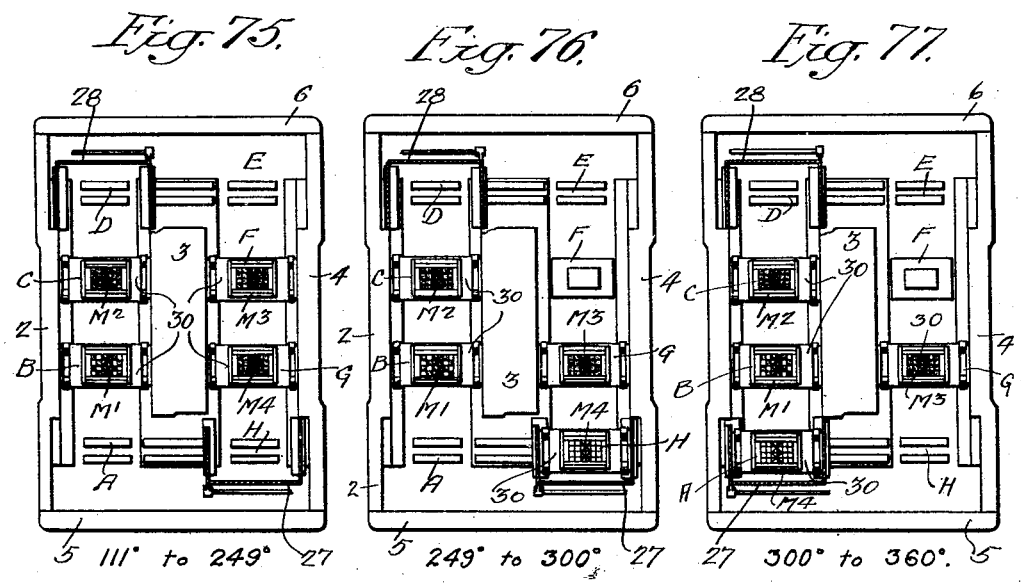
Inventor:-
Gilbert V. Anderson
by his Attorneys,
Howson + Howson

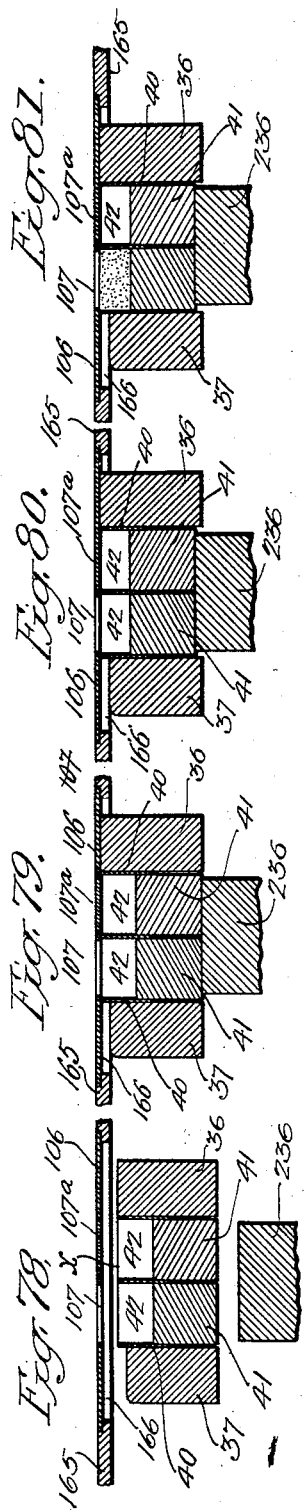
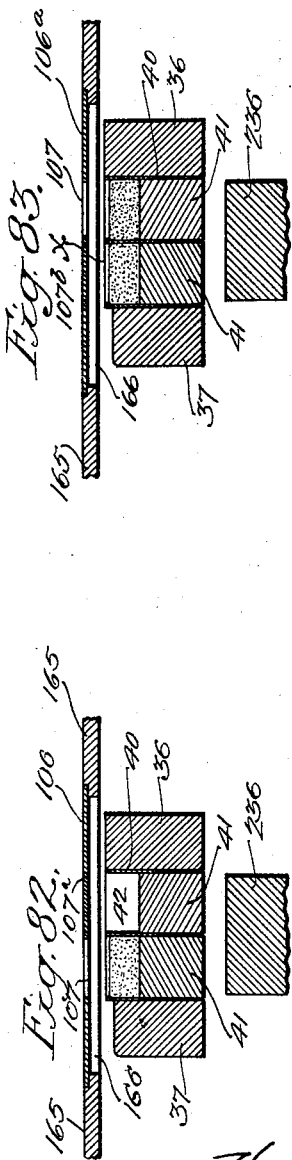
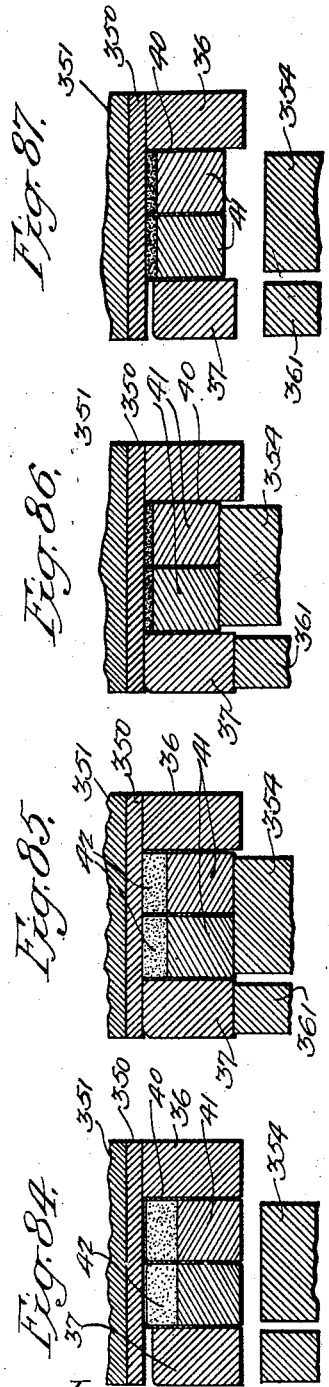

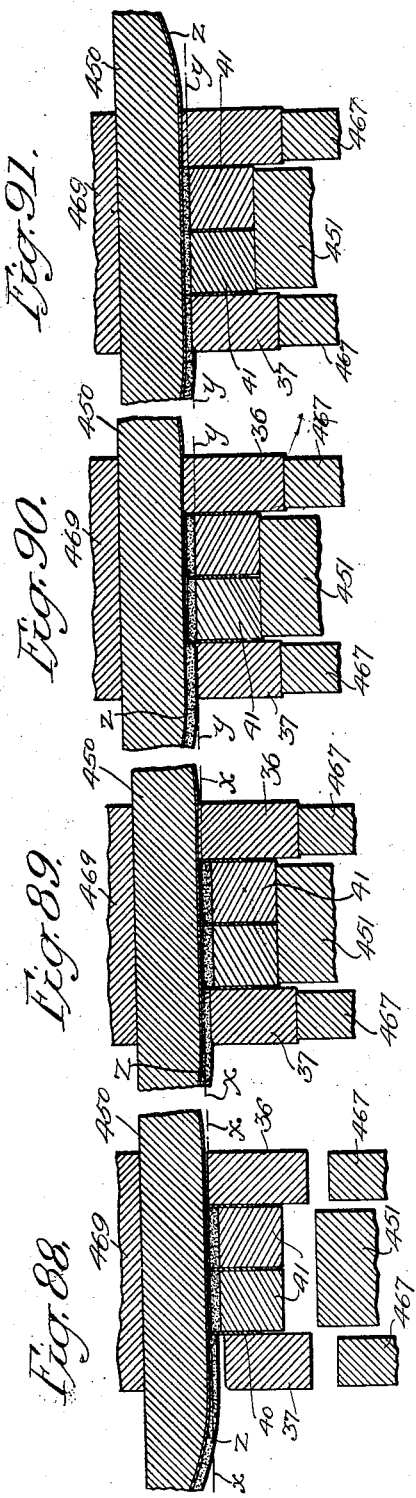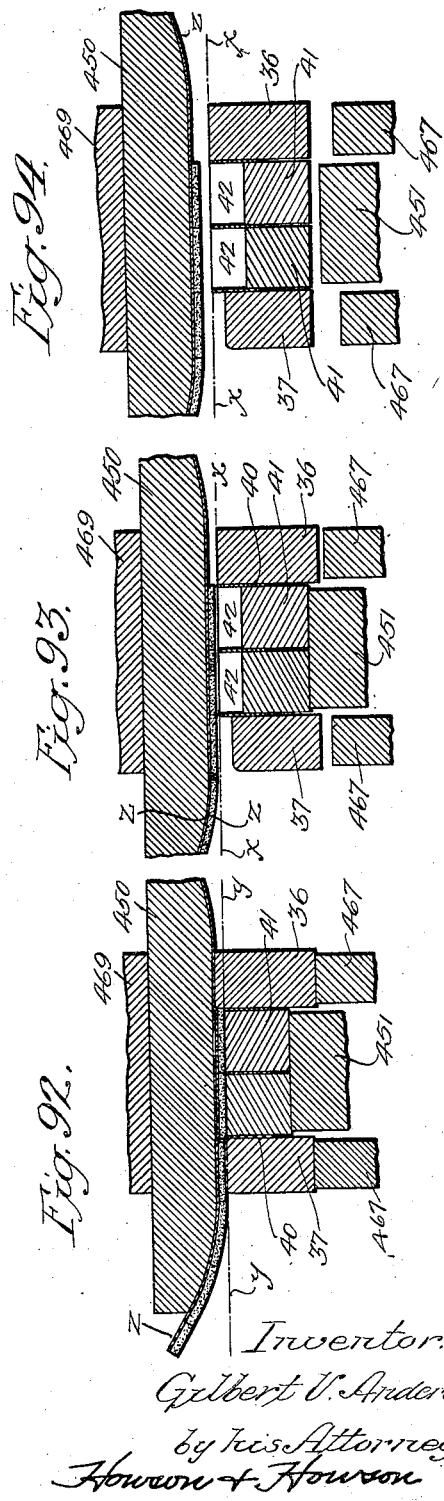

Patented June 16, 1931

1,810,869

UNITED STATES PATENT OFFICE

GILBERT V. ANDERSON, OF PHILADELPHIA, PENNSYLVANIA, ASSIGNOR TO CON-GOLEUM-NAIRN INC., OF PHILADELPHIA, PENNSYLVANIA, A CORPORATION OF NEW YORK

MACHINE FOR MAKING INLAID FLOOR COVERINGS

Application filed September 6, 1927. Serial No. 217,794.

This invention relates to machines for making inlaid linoleum. The machine forming the subject matter of this application for Letters Patent employs what is known as the "mold" process, being distinctive from another well known process termed the "line" method.

In producing inlaid linoleum according to the "line" process, the individual patterns, of which the aggregate design is composed, are cut from preformed sheets of body forming material, and subsequently pressed onto a web of base material to form the finished linoleum.

In the production of inlaid linoleum under the "mold" process a web of base material, usually burlap which has been previously impregnated with a suitable flux, is employed. Granular material, such as ground cork, which has been previously mixed with suitable binder and color pigments, is manually placed and spread, in successive operations, one for each color employed, in a suitable mold overlying the burlap base, to form the configurations of the design. The mold is then removed, leaving the granular material in independent and differently colored loose masses upon the base. The whole is then subjected to a preliminary pressing operation to cause the said loose masses of granular materials to adhere to the base material and to unite one with the others. The partly compressed product is then removed to a finishing press wherein the whole is finally consolidated into the finished linoleum.

This process necessitates considerable manual labor, is slow of production, and the lines of demarkation between the adjoining patterns of the design are irregular and indistinct.

The principal object of this invention is to provide a full automatic machine which will produce inlaid linoleum, from start to finish, without the many manual operations necessitated by the common mode of procedure now employed, thereby accelerating production of the finished product.

Another object of the invention is to improve the mold structure, providing automatic means for filling the different pattern chambers thereof with differently colored granular materials and automatic means for operating the mold structure to cause the contained granular materials to be pressed onto the base material in a manner to produce sharp and distinct lines of demarkation between the patterns of the design.

The construction and operation of the machine will be fully disclosed hereinafter, reference being had to the accompanying drawings, of which:

Fig. 1 is a plan view of a machine for making inlaid linoleum constructed in accordance with the principles of my invention;

Fig. 2 is a right side elevation, looking in the direction of the arrow a, Fig. 1;

Fig. 3 is a left side elevation, looking in the direction of the arrow b, Fig. 1;

Fig. 4 is a rear end elevation, looking in the direction of the arrow c, Fig. 1;

Fig. 5 is a front end elevation, looking in the direction of the arrow d, Fig. 1;

Fig. 6 is a longitudinal sectional elevation taken on the line 6—6 of Fig. 1;

Fig. 7 is a longitudinal sectional elevation taken on the line 7—7 of Fig. 1;

Figs. 8, 9, 10, 11 and 12 are transverse sectional elevations taken on the lines 8—8, 9—9, 10—10, 11—11 and 12—12, respectively, of Fig. 1;

Fig. 13 is a plan view of the machine with the super structure removed;

Fig. 14 is an enlarged plan view of the mold structure employed in my improved machine;

Fig. 15 is an inverted plan view of the mold shown in Fig. 14;

Fig. 16 is a side elevation of the mold;

Fig. 17 is an end elevation of the mold;

Fig. 18 is a longitudinal sectional elevation of the mold, taken on the line 18—18 of Fig. 14;

Fig. 19 is a transverse sectional elevation of the mold structure, taken on the line 19—19 of Fig. 14;

Fig. 20 is a transverse sectional elevation of the mold structure taken on the line 20—20 of Fig. 14;

Fig. 21 is a sectional plan view of the mold structure taken on the line 21—21 of Fig. 17;

Fig. 22 is a sectional plan view of the mold structure taken on the line 22—22 of Fig. 19;

Fig. 23 is a sectional elevation of the mold structure taken on the line 23—23 of Fig. 22;

Fig. 24 is a plan view of the mechanism which feeds the variously colored granular materials to the molds;

Fig. 25 is a transverse sectional elevation of the mold filling mechanism, taken on the line 25—25 of Fig. 24;

Fig. 26 is a longitudinal sectional elevation of the mold filling mechanism, taken on the line 26—26 of Fig. 25;

Fig. 27 is a longitudinal sectional elevation of the mold filling mechanism, taken on the line 27—27 of Fig. 25;

Fig. 28 is a plan view of the reciprocating grate of the granular material feeding mechanism located in the hopper containing said material;

Fig. 29 is a plan view of a small portion of the grate shown in Fig. 28, but illustrating the alternate bars of the grate in an alternative position.

Figure 33:
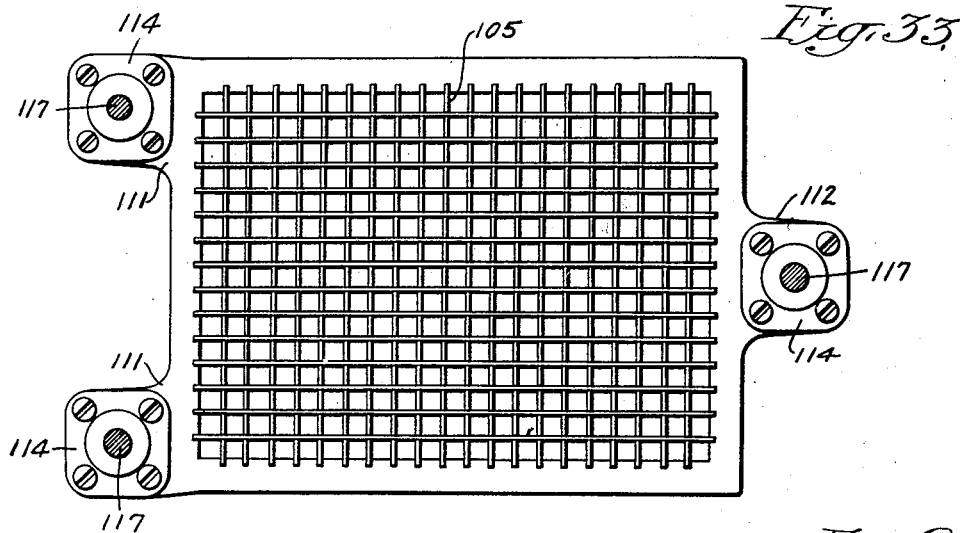
Figure 95:
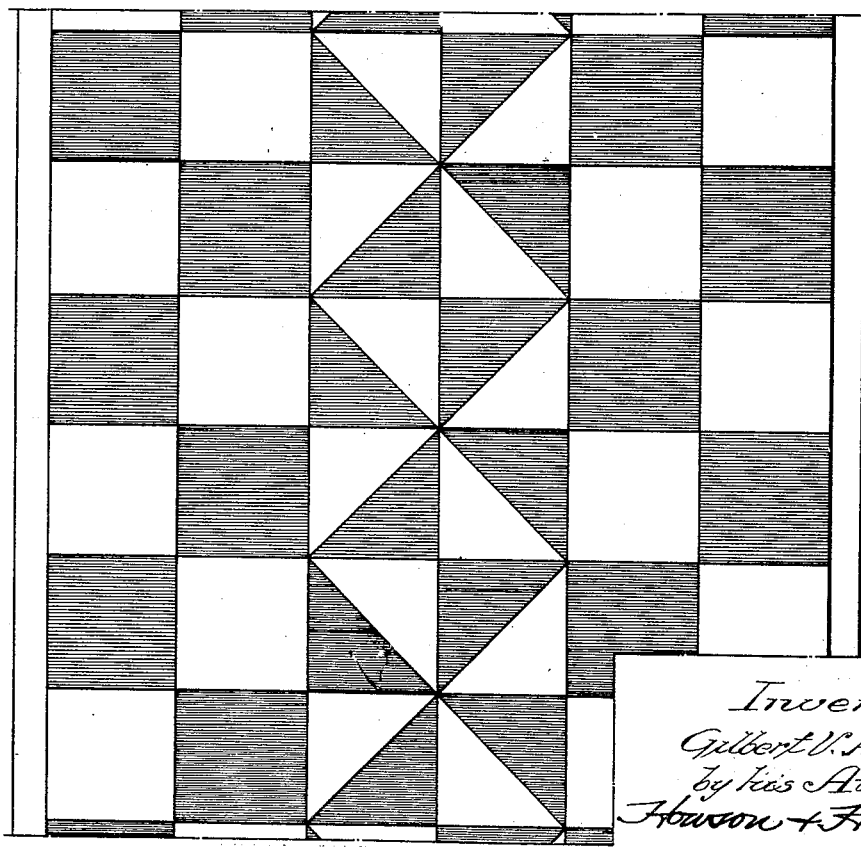

Figs. 30 and 31 are respectively a detail side elevation and face view of the mechanism for reciprocating the individual grate bars, of the granular material feeding mechanism;

Fig. 32 is a plan view of the stencil plates positioned intermediate the hoppers containing the differently colored granular materials and the underlying mold structures;

Fig. 33 is a plan view of a distributing grid positioned in each color hopper intermediate the feeding grate therein and the stencil plate thereunder;

Fig. 34 is a detail sectional elevation of a portion of the mechanism adapted to elevate the mold structures under the stencil plates;

Fig. 35 is a detail sectional elevation of a portion of the mechanism adapted to transfer the mold structures laterally from one line of longitudinal movement under the color hoppers to another line of longitudinal movement under the squeeze platens and vice versa;

Fig. 36 is a plan view of the first squeeze platen and means for lubricating its contacting surface;

Fig. 37 is a sectional elevation taken on the line 37—37 of Fig. 36;

Fig. 38 is a sectional elevation taken on the line 38—38, Fig. 37;

Fig. 39 is an enlarged sectional elevation taken on the line 39—39, Fig. 37;

Fig. 40 is a sectional elevation taken on the line 40—40, Fig. 39;

Fig. 41 is an enlarged sectional elevation of the first squeeze operating plunger, taken on the line 41—41 of Fig. 11, and showing a mold structure and the contained granular material being pressed against the first squeeze platen, shown in Fig. 37;

Fig. 42 is a plan view of the mechanism shown in Fig. 41, under the mold structure;

Fig. 43 is a sectional elevation taken on the line 43—43, Fig. 41;

Fig. 44 is an enlarged sectional elevation of the second squeeze mechanism illustrated in Fig. 6, showing the partly consolidated masses of granular material being finally consolidated and pressed into the base material;

Fig. 45 is a plan view of the mechanism shown in Fig. 44, under the mold structure;

Fig. 46 is a detail sectional elevation, taken on the line 46—46 of Fig. 45;

Fig. 47 is an enlarged side elevation of the feeding and indexing mechanism for the web of base material;

Fig. 48 is a plan view of the mechanism shown in Fig. 47;

Fig. 49 is an enlarged side elevation of the cam mechanism for operating the feeding and indexing mechanism shown in Fig. 47, and illustrating the valve operating cam and a cooperating differential mechanism for controlling the operation of the plunger which operates the upper second squeeze platen;

Fig. 50 is a plan view of the mechanism shown in Fig. 49;

Fig. 51 is an enlarged side elevation of the valve operating cam and cooperating differential mechanism for controlling the operation of the first squeeze plunger shown in Fig. 41;

Fig. 52 is a plan view of the mechanism shown in Fig. 51;

Fig. 53 is a section plan view of the first squeeze plunger control valve, taken on the line 53—53, Fig. 51;

Fig. 54 is a longitudinal sectional elevation taken on the line 54—54 of Fig. 53;

Fig. 55 is a transverse sectional elevation taken on the line 55—55 of Fig. 54;

Fig. 56 is an enlarged side elevation of the cam and an associated differential mechanism for controlling the intermittent longitudinal advancement of the mold structures along the left side of the machine under the hoppers containing the different colored granular materials;

Figs. 56a, 56b and 56c illustrate diagrammatically the various positions assumed by the elements shown in Fig. 56;

Fig. 57 is a plan view of the mechanism shown in Fig. 56;

Fig. 58 is a sectional elevation taken on the line 58—58 of Fig. 57;

Fig. 59 is a sectional elevation taken on the line 59—59 of Fig. 56;

Fig. 60 is a view similar to Fig. 56, but illustrating the cam and associated differential mechanism for controlling the longitudinal advancement of the mold structures along the right side of the machine, under the squeeze platens;

Fig. 61 is an enlarged side elevation of the cam and associated differential mechanism for controlling the transfer of the molds transversely of the machine from the line of longitudinal movement under the squeeze platens to the line of longitudinal movement under the color hoppers;

Fig. 62 is a plan view of the mechanism shown in Fig. 61;

Fig. 63 is a front view of the mechanism shown in Figs. 61 and 62;

Fig. 64 is a front elevation of the mechanism for spraying a lubricant into the mold structures prior to the deposit of the differently colored granular materials therein;

Fig. 65 is a sectional elevation taken on the line 65—65 of Fig. 64;

Fig. 66 is an enlarged sectional plan view of the valve for controlling the spraying of the lubricant into the molds, taken on the line 66—66 of Fig. 64;

Fig. 67 is an enlarged sectional elevation of the take-up mechanism for the finished product, taken on the line 67—67 of Fig. 2;

Fig. 67a is a sectional elevation taken on the line 67a—67a of Fig. 67;

Fig. 68 is a detail view of the cam for controlling the elevation of the distributing grids under the feed hoppers;

Fig. 69 is a detail view of the cam for operating the trap doors in the feed hoppers and the vacuum means for cleaning the stencil plates of surplus granular material, and removing foreign matter from the empty mold, prior to the filling thereof;

Fig. 70 is a detail view of the valve controlling the suction as applied to the vacuum sweeper which clears the stencil plate and the underlying mold structure of undesired materials;

Fig. 71 is a diagrammatic view of the cams of the machine in flat plotted development, adapted to illustrate the relative timing of the several cams during a complete revolution of the shaft to which they are rigidly secured;

Figs. 72 to 77, inclusive, are diagrammatic views illustrating the various relative and successive movements of the series of mold structures employed in the machine;

Figs. 78 to 83, inclusive, diagrammatically illustrate one of the mold structures undergoing the filling operation;

Figs. 84 to 87, inclusive, diagrammatically illustrate the same mold undergoing the first squeeze operation;

Figs. 88 to 92, inclusive, diagrammatically illustrate the same mold undergoing the second or final squeeze operation;

Figs. 93 and 94 illustrate, diagrammatically, the linoleum after the final squeeze operation has been completed and the mold structure being withdrawn therefrom; and Fig. 95 illustrates, diagrammatically, the face of a portion of the finished linoleum.

Referring to Figs. 1 to 13 inclusive, the machine, in its preferred form, comprises a rigid base member 1, on, and to, which are suitably secured a plurality of longitudinally extending main frame members, namely a left side frame member 2, a center frame member 3, and a right side frame member 4. The longitudinal frame members 2, 3 and 4 are rigidly secured together at their opposite ends by means of a front transverse frame member 5 and a rear transverse frame member 6. Suitably secured to the side frame members 2 and 4, and extending parallel to and adjacent the transverse frame members 5 and 6, respectively, is one of a pair of transversely extending bridge members 7 and 8.

Rotatably mounted in bearings 10, 11, 12, 13, 14, 15, 16, 17 and 18, which are rigidly secured to the base member 1, is a main cam shaft 20. The shaft 20 (see Fig. 1) is divided into two sections, one of which extends along the left side of the machine and the other section of which extends along the front end of the machine. The two shaft sections are geared together in 1 to 1 ratio, by means of bevel gears 21 and 22, intermediate the bearings 13 and 14. The main cam shaft 20 is adapted to be continuously rotated by any suitable means and in the present instance is provided with a spur gear 23, to which power can be applied from any suitable source.

Adjacent the upper edge of each of the longitudinal main frame members 2, 3 and 4 is formed a suitable track 24 comprising a lower rail 25 and an upper rail 26 (see Fig. 10). These tracks 24, 24 extend longitudinally along the right and left sides of the machine intermediate the transverse bridge members 7 and 8 (see Figs. 6 and 7).

The bridge members 7 and 8 are respectively provided with mold transfer carriages 27 and 28 (see Figs. 8 and 12). Each transfer carriage is provided with a pair of cooperating short track sections 24a, which are adapted to be positioned in contiguous alignment with the cooperating pairs of tracks 24, 24 at either the right or left side of the machine, and are movable within the said bridge members from the right to the left side of the machine, and vice versa.

A plurality of mold structures 30, 30 are operatively mounted in each cooperating pair of the tracks 24, 24 (see Figs. 6 and 7) and are adapted to be moved longitudinally along said tracks, in intermittent steps, and into the track sections 24a, 24a in the transfer carriages 27 and 28, to be transferred from the right side pair of cooperating tracks 24, 24 to the left tracks 24, 24 and vice versa (see Figs. 72 to 77 inclusive). Thus it will be noted that a mold structure 30, starting at the front end of the left side of the machine, can be moved rearwardly, in intermittent steps, along the left side tracks 24, 24 and into the track sections 24a, 24a of the rear transfer carriage 28. The transfer carriage 28 is then moved transversely of the machine, bringing the track section 24a, 24a thereof into contiguous alignment with the tracks 24, 24 at the right side of the machine. The mold structure 30 is then moved forwardly, in intermittent steps, along the said right track 24, 24 and into the track sections 24a, 24a in the forward transfer carriage 27. The forward transfer carriage 27 with the contained mold structure is then moved transversely of the machine bringing the said mold structure into contiguous alignment with the aforesaid left side tracks 24, 24 and the mold structure subsequently started on a repeat of the cycle of movement just described.

Each mold structure 30, in passing through the above described cycle of movement, and upon leaving the forward transfer carriage 27 and passing onto the left side tracks 24, 24 moves under a lubricating device shown in detail in Figs. 64 and 65 which sprays the interior of the mold with a suitable fluid to prevent the granular material, of which the body of the linoleum is composed, from adhering to the interior of the pattern forming chambers of the mold. The mold structure is then moved to a position under a first color containing hopper shown in detail in Figs. 24 to 27 inclusive, from which suitably colored granular material is deposited in some of empty pattern forming chambers of the mold structure, thence to a position under a second color hopper from which the mold receives differently colored granular material in the remaining empty pattern chambers thereof. Any desired number of different colors may be placed in the mold from different color hoppers arranged along and above the mold guide tracks 24, 24. In the present instance, I have shown but two color hoppers for purpose of illustration.

After the mold structure receives the desired number of masses of differently colored granular materials, it is moved into the rear transfer carriage 28 and is transferred thereby to the right side tracks 24, 24 and thereafter passes to a primary squeezing device shown in detail in Figs. 36 to 42 inclusive, where the loose masses of granular materials within the pattern chambers of the mold are primarily consolidated. From the first squeeze apparatus the mold structure, with the partly consolidated masses of granular materials therein, passes to a second or final squeeze device shown in detail in Figs. 44 and 45. At this point a web of suitable base material, such as burlap, is introduced, and the partly consolidated masses of granular material are finally pressed onto and into the body of the base material to form the finished product.

If desired, the final squeeze apparatus may be heated in any suitable manner to produce various well known finishes on the face of the linoleum. At the final squeeze position the granular material is ejected from the mold prior to the final consolidation and the finished linoleum is formed into a roll, the empty mold structure passing onto the forward transfer carriage 27 to be moved to the left side tracks 24, 24 to start a new cycle of operations as above described.

The mold structure

Referring to Figs. 14 to 22 inclusive, each mold structure 30 comprises a rigid rectangular frame 31, in the opposite ends of which are suitably journaled rollers 32, 32 adapted to run in the tracks 24, 24 between the upper and lower rails 25 and 26 thereof. Bars 33, 33 extend between and are secured to the spindles 34, 34 of each pair of rollers 32, 32, at each end of the rigid mold frame 31.

In the upper face of the rigid frame 31 of each mold structure 30 is formed a pattern cavity 35 (see Figs. 14, 18 and 19). Immediately adjacent to and within the walls of said cavity is operatively mounted a forward clamp plunger 36, a rear clamp plunger 37 and side clamp plungers 38, 38 which together form a limiting border around a pattern area 39. The greatest dimension of the pattern area 39 is substantially equal to the width of the web of base material employed in the finished linoleum.

The pattern area 39 is divided into a number of suitable pattern configurations (see Fig. 14) which collectively form a complete block or unit of the design of the finished linoleum; and each of the pattern configurations is outlined by a relatively thin dividing fin or wall 40, the upper edges of which are aligned in a single horizontal plane $x$, and the lower edges of which are secured to and within a removable bottom plate 43 (see Figs. 18 and 19), which is secured within the bottom of the pattern cavity 35 under pattern plungers 41 and the border clamp plungers 36, 37, 38 and 38. Within the limits of the dividing walls 40 of each pattern configuration is slidably mounted one of the pattern plungers 41, between the upper face of which and the plane $x$ of the said walls 40 is formed a pattern chamber 42 which is adapted to receive the prepared granular material.

In the under face of the rigid frame 31, of each mold structure 30, is formed a cavity 45 within which is slidably mounted a plunger operating frame 46 (see Figs. 18 and 19). Each pattern plunger 41 consists of a plate having the same shape as the compartment in which it is located, the plate being mounted on the upper end of a stem 47. The stems 47 extend from the respective pattern plungers 41 through the removable bottom plate 43, through a fixed partition 48, which separates the pattern cavity 35 from the plunger cavity 45, and through the plunger operating frame 46. Each plunger stem 47 is secured at its lower end to the said plunger operating frame 46, having a shoulder 49 engaging the upper side thereof and a collar 50 engaging the lower side thereof.

Between the upper side of the plunger operating frame 46 and the lower side of the fixed partition 48, certain of the plunger stems 47 are encircled by compression springs 51, which tend to hold the pattern plungers 41 in the bottoms of the respective pattern chambers 42 and the plunger operating frame 46 in the lower portion of the cavity 45.

The border clamp plungers 36, 37 and 38, 38 are each provided with a plurality of depending stems 52 which extend through the removable bottom plate 43, through enlarged apertures 53 in the fixed partition 48, and are provided with enlarged heads 54 which are slidably mounted in the plunger operating frame 46. Compression springs 55 encircles the stems 52 and are confined thereon between the heads 54 thereof and the bottom of the removable bottom plate 43.

Within a cavity 56 formed in each end of the rigid frame 31 of each mold structure 30, intermediate the rollers 32, 32 thereon, is slidably mounted a key block 57 (Fig. 20) on the lower end of which is rigidly secured a key 58, by means of which the mold structure is advanced longitudinally of the machine along the tracks 24 therein. Limit rods 59, 59 extend downwardly through and are slidable in the fixed partition 48 of the rigid frame 31, being secured at their lower ends within the slidable key blocks 57 and being provided at their upper ends with heads 60, 60 which rest on the upper face of the fixed partition 48. Compression springs 61, 61 encircle the said limit rods 59, 59 between the lower face of said fixed partition on an upper side in the key blocks 57, thus tending to maintain the said key blocks and their associated keys 58, 58 in their lowest possible position.

Registry blocks 62, 62 (see Figs. 14 and 18) are secured to the opposite ends, respectively, of the rigid frame 31, intermediate the rollers 32, 32 thereon, for purposes hereinafter set forth.

At each of the respective corners of and on the lower face of the plunger operating frame 46, the said frame is provided with a laterally extending lug 63, which is adapted to be engaged by a latch 64, pivotally mounted at 65 on the side of the rigid mold frame 31. Each latch 64 is provided with a bifurcated projection 64a, between the arms of which is pivotally mounted, at 66, an operating finger 67. The finger 67 is secured to the pivot spindle 66 by means of a set screw 68 and the said pivot spindle extends beyond the bifurcated projection 64a, at one side thereof and is encircled by a spiral spring 69, one end of which is secured in the said spindle and the other end of which is secured in the said projection 64a, tending to maintain a flat portion 70 of the said finger 67 in contact with a flat portion 71 of said latch 64, for purposes hereinafter described.

*The color hoppers and means for feeding the granular material from the hoppers to the molds*

Referring to Figs. 1, 3, 4, 5, 7 to 11 inclusive and 24 to 34 inclusive, color hopper supporting frames 75 and 76 are secured to and project vertically from the left side and center main frame members 2 and 3 respectively. Transverse supporting bars 77, 78, 79, 80, 81 are secured to and extend between the superposed frames 75—76. The color hoppers being of the same general construction, the description of one will suffice.

The color hoppers each comprise a box-like structure 85 (see Figs. 14 and 25) rigidly secured, adjacent its upper end, to a pair of the cross bars 78—79, 80—81. Immediately adjacent the lower edges of the color boxes 85, 85 is a pair of longitudinally extending vertical plates 86, 86 which form the side plates of feeding boxes 87 positioned in vertical alignment with the color hoppers 85. The side plates 86, 86 are attached at their opposite ends to transverse supporting bars 88, 88 (see Fig. 24), secured in the frames 75 and 76.

The feed boxes 87 are provided with end plates 89, 89 which extend between and are secured to the longitudinal side plates 86, 86. The end plates 89, 89 of each hopper feed box are slotted horizontally for the reception of two separate series of grate bars 90 and 91 respectively (see Fig. 28).

The grate bars are each provided with vertical grooves 92 and 93 formed alternately in their opposite side faces. The grate bars 91 are held rigidly in the feed boxes 87, while the grate bars 90 are adapted to be reciprocated from the position shown in Fig. 28 to that shown in Fig. 29, wherein the vertical grooves 92 of one set of bars register with the vertical grooves 93 of the other set of bars to permit free passage of the granular material contained in the respective color hoppers 85 to pass through the grate 90—91 onto a bottom 94 in the feed box 87. The bottom 94 is composed of a series of flat blades or trap doors 95 (see Fig. 26), each of which is secured to a spindle 96 pivotally mounted in the side plates 86, 86, and extending beyond one of said plates. On the outer extended end of each trap door pivot rod 95 is secured a gear 97, which meshes with a reciprocable toothed rock rod 98 (see Fig. 27).

The grate bars 90, 91 are provided with vertically extending harrow teeth 99 (see Fig. 26) which tend to break up any lumps of the granular material which may form in the color hoppers 85. The grate bars 90 are each secured to a cross rod 100 whereby they may be reciprocated in unison by means hereinafter set forth. The rack rod 98 likewise is reciprocated, by mechanism hereinafter set forth, to open and close the trap doors 95 at the proper time.

Secured to the lower end of the feed box 87 of each color hopper 85 is a guide chute 101. The guide chute 101 forms one portion of a telescoping chute, the other portion of which is indicated at 102 having its lower edge immediately adjacent the upper face of a distributing grid 105 (see Fig. 26).

The distributing grid 105, shown in detail in Fig. 33, and the lower half 102 of the telescoping guide chute are adapted to be moved from the position illustrated in several of the mentioned figures of the drawing to a position wherein the lower face of the distributing grid 105 lies immediately above and adjacent the upper face of a fixed stencil plate 106.

The mold structure 30, underlying each respective color hopper, is adapted to be raised to a position wherein the upper plane $x$ of the pattern walls 40 thereof lies immediately adjacent the lower face of the said stencil plate 106.

It will be here noted that the stencil plate 106 underlying each respective color hopper has openings 107 therein (see Figs. 26 and 32) which register with the particular material receiving chambers 42 of the mold structure 30, which are to receive the particular colored granular material contained in that particular color hopper, the remainder of the area of the particular stencil plate 106 is plain, in order to exclude granular material of the particular color at hand from the pattern chambers 42 which are to receive some other color contained in another of the color hoppers. Thus vari-colored patterns are obtained in the completed design.

The distributing grids 105 are adapted to receive a gyratory motion over the stencil plates 106 in order to distribute the material over the area of the stencil plate and thus cause the granular material to pass through the openings 107 therein to the material receiving chambers 42, in the mold structure 30, positioned therebelow.

Prior to the descent of the distributing grid and immediately after a fresh mold structure 30 is positioned under the stencil plate 106, the upper face of the stencil plate is swept clean of all granular material remaining therein from a previous distribution, and the empty chambers 42 of the underlying mold are cleared of all foreign matter by means of sweeper heads 110 which normally occupy a position at one end of, and clear of, each distributing grid 105 (see Fig. 26), and are moved backward and forward under the said distributing grid before it is lowered into position adjacent the stencil plate. The operation of the vacuum sweeper heads 110 will be more fully disclosed hereinafter.

The gyratory motion is applied to the distributing grids in the following manner: Each grid 105 is provided at one of its ends with a pair of lateral extensions 111—111 at opposite corners thereof, and at its opposite end with a lateral extension 112 at the center thereof. In each of the said extensions is provided a ball bearing (see Fig. 25), the outer race 113 of which is secured within the extension by plates 114, 115, and the inner race 116 of which is secured to the end of a crank 117, by means of a plate 118 and screw 119. The crank 117 is formed on the lower end of a vertical spindle 120. The vertical spindle is of a telescoping nature having a lower sleeve end 121 journaled in a bearing 122 and having a rigid shoulder 123 underlying the said bearing and a collar 124 overlying said bearing, whereby the said sleeve end 121 of the said spindle is restricted as to axial movement in said bearing, but is permitted unrestricted rotary motion therein.

The sleeve section 121 of the telescoping shaft 120 is provided with a key 125 (Fig. 25), adapted to slide in a keyway 126 formed in the upper section 127 of the said telescoping shaft 120, which snugly fits within the said sleeve section 121 thereof. The upper section 127 of the shaft 120 is journaled in a bearing 128, and is prevented from receiving axial movement therein by a collar 129 secured to the shaft section 127, below the bearing 128, and a gear 130 secured to the shaft above the bearing 128.

The upper individual bearings 128, 128 are rigidly secured to the nearest adjacent frame member 75 or 76, and the lower bearings 121, 121, adjacent each of the said frame members 75 and 76 respectively are integrally formed on a vertically reciprocable head 131 (see Figs. 11 and 26), which is slidably mounted in guideways 132 formed in the respective frame members 75 and 76. Rotatably mounted in each of, and extending between, the frame members 75 and 76, and adjacent the guideways 132 formed therein, is a rock shaft 133 (see Fig. 26) on which is secured a bell crank lever 134 adjacent each of the said frame members 75 and 76. One arm 135 of each bell crank lever 134 is connected by means of a link 136 to one end of the slidable bearing head 131, and the other arm 137 of the said bell crank lever 134 is connected by means of a link 138 to the corresponding arm of the bell crank lever 134 at the opposite end of the respective slidable bearing head 131. Thus it will be obvious, that by rocking one of the shafts 133 the other shaft 133 will also be rocked and in so doing the bearing carrying heads 131 on each of the frame members 75 and 76 will be vertically reciprocated, carrying with them the lower bearings 121, 121 of the telescoping shafts 120, 120 and consequently moving the distributing grids 105, 105 toward and away from the stencil plates 106, 106. The outer sections 102 of the telescoping guide chutes are secured to the bearings 121 and consequently move in fixed relation to and with the said bearings. One of the shafts 133 extends beyond the color hopper supporting frame 75 and is provided with a lever 139 (Fig. 3). The free end of the lever 139 is pivotally connected to an operating rod 240 having a head 240a, on which is rotatably mounted a roller 241 adapted to a groove 242 in a cam 243 (Fig. 68) on the cam shaft 20. By this means, the shafts 133, 133 receive their rocking motion in timed relation to the other elements of the machine.

The gears 130 in the upper ends of the telescoping spindles 120 mesh with similar gears 140, which are secured to horizontally extending shafts 141 and 142 rotatably mounted in bearings 143 and 144 secured to the frame members 75 and 76 respectively (see Figs. 9, 10 and 26). On one end of each of the shafts 141 and 142 is secured a gear 145, each of which meshes with a corresponding gear 146, 146 secured to a transverse shaft 147 journaled in bearings 148 and 149 secured to the frame members 75 and 76 respectively. The shaft 147, adjacent the bearing 149 is provided with a drive pulley 150 by means of which the said shaft 147 is continuously driven from any suitable source of power (see Figs. 1 and 5).

Adjacent the bearing 148 the shaft 147 is provided with a spur gear 151 (see Figs. 3, 5, 30 and 31) which meshes with a spur gear 152 rotatably mounted on a stud 153 secured in the frame member 75. The gear 152 has an eccentric 154 formed integral therewith, around which a strap 155 extends. The strap 155 has an arm 156 which is pivotally connected at 157 to a lever 159. The lever 159 is secured on one end of a shaft 160 which is journaled in bearings on the frame members 75 and 76. The shaft 160, intermediate the frames 75 and 76, is provided with levers 161 which are connected by links 162 with the cross bar 100 at one end of one of the series of reciprocating grate bars 90. The reciprocating grate bar series of the other color hopper are connected by links 163, 163 with the rear end cross bar 100a of the first color hopper. Thus it will be obvious that the grate bars 90 and the distributing grid 105 of each color hopper are continuously operating.

Referring to Figs. 7 and 32, the stencil plates 106, 106 are made of comparatively thin metal, and are each secured to a thicker carrying plate 165 which is provided with a rectangular opening 166 immediately under the stencil plate 106. The carrying plates 165, 165 are slidably mounted in a platform 167 which extends longitudinally under the color hoppers 85, 85 intermediate the bridge members 7 and 8, and is supported by the left side main frame member 2 and the center main frame member 3. The carrying plates 165, 165 with their stencil plates 106, 106 may be conveniently removed, when desired, by sliding them transversely from under their respective hoppers.

The top faces of the stencil plates 106, 106, the top faces of the carrying plates 165, 165, and the top face of the supporting platform 167 lie in a single horizontal plane over which the vacuum sweepers 110 (see Figs. 26 and 27) are adapted to reciprocate to remove surplus granular material therefrom and to cleanse the empty chambers of the underlying mold structures 30, 30.

The vacuum sweepers 110 each comprise a vertically extending wiper plate 170 having bearings 171, 171 thereon, through which supporting rods 172 pass. The rods 172 are secured, against relative movement in the bearings 171, by screws 173. The rods 172, 172 are slidably mounted in the bridge members 7 and 8, and are adapted to be longitudinally reciprocated by means of a cam 174 secured to the cam shaft 20.

The rods 172 are each connected through a link 273 to one end of a lever 274 which is secured to a shaft 275, pivotally mounted in brackets 276 secured to the main base 1. On one end of the shaft 275 is a lever 277 which is pivotally connected at 278 to a forked operating link 279, which straddles the cam shaft 20 (see Fig. 69) and is provided with a roller 280 adapted to ride in the groove 281 of the cam 174.

The cam 174 is provided with a laterally extending peripheral flange 282 having an opening 283 therein. A lever 285 is secured to a rock shaft 286, carried by the brackets 276, 276. The free end of the lever 285 engages the periphery of the flange 282, and is adapted to move into the opening 283 therein when the cam 174 rotates, to rock the shaft 286. A lever 287 is also secured to the shaft 286 and its free end is connected, by a link 288 to one end of the hopper trap door operating rack rod 98 (see Figs. 6 and 7). When the opening 283 is in line with the end of the lever 285, a spring 289, having one of its ends attached to the trap door operating rack rod 98, and its opposite end attached to a fixed portion 86 of the machine, moves the said rack rod 98, the link 288 and the lever 285 in one direction to open the hopper trap doors 95, 95. Rotation of the cam 174 causes the lever 285 to be moved out of the opening 283 and thereby moves the rack rod 98 in the opposite direction to close the said hopper trap doors 95, 95.

Each wiper plate 170 of the vacuum sweepers 110, at its center, is provided with a hollow vacuum nozzle 175, of sufficient width to include the outermost transversely disposed openings 107 of the stencil plates 106 (see Figs. 7 and 9). A hollow duct 176 is formed in each wiper plate 170 and connects, at one of its ends, with the vacuum nozzle 175 and at its opposite end with a flexible duct 177. The flexible ducts 177, 177 are connected to a rigid duct 178 (Fig. 70), which in turn is connected to any desired form of suction apparatus (not shown).

A vacuum control valve 179 is located in the rigid duct 178, and comprises a rectangular casing having a valve plate 179a slidably mounted therein. The sliding valve plate 179a is provided with an aperture 179b, adapted to be placed in alignment with the duct 178 to permit a partial vacuum being drawn in the nozzles 175. The valve plate 179a is operated by a cam 180 on the cam shaft 20, as shown in Fig. 9.

To prevent the differently colored granular materials from becoming mixed, one with the other, on the platform 167, the said platform is provided with vertically extending partitions 181, 182, 183 (see Fig. 7). A wiper plate 170 operates between each adjacent pair of partitions 181—182, 182—183 under the respective color hoppers 85, 85. The normal rest positions of the wiper plates 170, 170 are adjacent the partitions 181 and 182 respectively. The first longitudinal movement of the wiper plates 170, 170 sweeps the surplus granular material lying on the platform 167 to points thereon adjacent the partitions 182 and 183 respectively and into the path of transversely and continuously moving endless conveyers 185, 186 (see Fig. 7).

The conveyers 185 and 186 deposit the surplus granular material into receiving boots 187, 188 of elevators 189, 190, which in turn deposit the material in the respective color hoppers 85, 85.

The conveyers 185 and 186, in the present instance, consist of scraper blades 191 secured to sprocket chains 192 which pass around sprocket wheels 193 and 194 secured to shafts 195 and 196 suitably journaled in the hopper frame members 75 and 76.

The elevators 189 and 190 each comprises a sprocket chain 197, passing around sprocket wheels 198, 199, and having buckets 200, 200 secured thereto. The sprockets 198—198 are secured to a shaft 201 journaled in bearings 202, secured to the left side of the main frame member 2. The sprockets 199, 199 are secured to a shaft 203 journaled in bearings 204, 204 secured to the color frame cross members 77, 79, 81.

The conveyers 185 and 186 and the elevators 189 and 190 are continuously driven in the following manner: The conveyer shaft 195 is provided with a pair of sprocket wheels 205 and 206. The sprocket wheel 205 is operatively connected by a sprocket chain 207 with a sprocket wheel 208 on the continuously rotating gyrator drive shaft 142. The sprocket wheel 206 is operatively connected by a sprocket chain 209 with a sprocket wheel 210 on the lower elevator shaft 201.

*The mold elevating mechanism*

In order to insure the granular material, from the respective color hoppers 85, 85, entering the proper empty chambers 42 in the mold structures, the mold structures are elevated under the respective stencil plates 106, 106 from a lower traversing position to an upper quiescent position, wherein the upper plane x of the chamber walls 40 is coincident with the plane of the lower face of the said stencil plates 106, 106. In this position, the border plungers 36, 37, 38, 38 of the mold structures 30 lie within the rectangular openings 166 in the stencil carrying plates 165 (see Fig. 34).

The upper rails 26, 26 of the left side tracks 24, 24 are vertically recessed under each color hopper 85, 85 as indicated at 211, to provide clearance for the mold structure 30, 30 thereunder, when in their elevated positions, and to provide stops 212 which are engaged by the register blocks 62 on the mold structures for limiting the vertical movement of the mold structures when the walls 40 thereof engage the under sides of the stencil plates 106, 106 as above noted. The rails 26, 26 are also recessed on their inner sides, as shown at 213, to provide guideways for movable rail sections 214, which engage the upper sides of the mold wheels 32, 32. The movable rail sections 214 are each secured to a vertically slidable guide bar 215 adapted to guideways 216 formed in the respective frame members 2 and 3. There are four of these guide bars 215, as shown in Fig. 13. The lower end of each bar 215 is secured to a mold elevating platform 220. The elevating platform 220 is adapted to raise, simultaneously, the mold structures 30, 30 underlying the respective color hoppers 85, 85.

The elevating platform 220 is operated by means of a double toggle mechanism, as clearly shown in Fig. 7, in order that the said platform will be raised in a straight vertical plane and at the same time maintain a true horizontal position throughout the elevating operation. At each end of the mold elevating platform 220 a series of links 221 are pivotally attached thereto, as indicated at 222. The links 221 are pivotally connected at 223 to a second series of links 224, the lower ends of which are pivoted at 225 to brackets 226 secured to the main base 1. The pivots 223 of the toggles 221—224, at each end of the platform 220, are cooperatively connected by longitudinally extending links 227. The links 227 are adapted to be moved longitudinally, to straighten the toggles 221—224, by an operating rod 228, having a head 229 provided with a roller 230 adapted to travel in a cam groove 231 of a cam 232, which is secured to the cam shaft 20.

As the elevating platform 220 is raised, grooved blocks 235 thereon (Fig. 18) engage the keys 58 on each end of the mold structures 30, 30, and thereby raise the said mold structures until the walls 40 thereof engage the under side of the stencil plates 106 and the registry blocks 62 on the mold structures 30, 30 engage the fixed stops 212, of the upper track rails 26. Continued vertical movement of the elevating platform 220 causes the slide blocks 57, which carry the keys 58, to move in the cavities 56 against the action of the compression springs 61 therein. During this continued vertical movement of the elevating platform, a plate 236 thereon engages the lower ends of the plunger stems 47 and moves the pattern plungers 41, 41 upwardly in the pattern chambers 42, in order that the depth of the said chambers above the plungers will be such that the chambers will receive the proper amounts of granular material. The thickness of the plate 236 governs the position of the plungers 41, 41 in the pattern chambers 42, and this may be varied by adding or removing shim plates 237, located between the plate 236 and the platform 220.

By this means granular materials of different consistencies may be employed in the respective color hoppers 85, 85, which, when subjected to the squeezing operation, will compress to the same thickness throughout the area of the finished linoleum; and also by this means the thickness of the finished linoleum is minutely controlled, and different linoleums of various thicknesses produced.

When the elevating platform 220 is lowered, the movable upper rail sections 214 again engage the upper sides of the mold wheels 32 and positively carry them into contact with the lower fixed rails 25 of the tracks 24, 24 so that the mold structure will be drawn clear of the stencil plates, etc. before being again traversed along the tracks 24, 24.

*The mold traversing mechanism*

The mold structures are traversed longitudinally of the machine along the left side tracks 24, 24 in one direction and along the right side tracks 24, 24 in an opposite direction, by similar mechanisms, description of one of these mechanisms sufficing for a clear understanding of the operation of both.

Extending longitudinally under each of the lower rails 25, 25 of the tracks 24, 24 is slidably mounted a mold traversing bar 245. These bars are suitably guided in the frame members 2, 3 and 4. On the upper face of each traversing bar 245 is a series of pairs of upwardly extending spaced lugs 246 (Figs. 13, 38, 46), each pair being adapted to engage the opposite sides of the keys 58 on the opposite ends of the mold structures 30.

The pair of cooperating traversing bars 245, 245 on each side of the track are operatively connected for unitary movement by means of a transversely extending coordinating shaft 247 rotatably mounted in the frame members and having a gear 248 adjacent each of its respective ends, which mesh with teeth 249 formed on the under sides of the said pair of traversing bars 245, 245 (Figs. 10 and 34).

Connected to one end of one of the traversing bars 245, of each cooperating pair, is a piston rod 250 (Fig. 13), operatively connected at its opposite end to a piston 251 operable in a cylinder 252. Motive fluid is admitted to and exhausted from the respective ends of the cylinders by pipes 254 and 255. The pipes 254 and 255 are respectively connected at their opposite ends to ports 254a and 255a in a control valve casing 256 (Figs. 56, 57, 58, 59). The valve casing 256 is also provided with fluid inlet and exhaust ports 257 and 258 respectively.

The respective pairs of traversing bars 245, 245 are also connected by a link 259 to one end of a lever 260, which is pivoted at 261 to a bracket 262 secured to the main base 1.

In the valve casing 256 is a sliding piston valve 263 (Fig. 58) movable in one direction therein by a compression spring 264. The piston valve 263 is also provided a port 265, which registers at all times with the port 254a in the casing, and a port 266 which registers at all times with the port 255a in the casing.

The ports 265 and 266 are respectively connected by passages 267 and 268 with grooves 269 and 270 formed in the periphery of the valve piston 263. The grooves 269 and 270 are adapted to be brought into registry with the fluid inlet port 257 and fluid exhaust port 258 at different times during the mold traversing operation.

The piston valve 263 is connected by a link 290 to a lever 291 which is pivoted at 292 to a bracket 293 secured to the main base 1. The lever 291 is also connected by a link 294 to one end of a double ended lever 295 which is pivoted at 296 to the aforesaid lever 260. The other end of the lever 295 is connected by a link 297 to a lever 298 pivoted at 299 to the base 1. The link 297 is pivotally connected to the lever 298 by a spindle 300 on which is rotatably mounted a roller 301 adapted to be engaged by an operating cam 302 on the shaft 20.

As the cam 302 is rotated in the direction of the arrow Fig. 56, the lever 298 is rocked from the position shown in Fig. 56 to that shown in Fig. 56a, and in turn, through the link 297, rocks the double ended lever 295 around its pivot 296 on the lever 260. Rocking of the lever 295 rocks the lever 291, through the link 294, and thereby moves the piston valve 263 in the valve casing 256 against the action of the spring 264, through the medium of the link 290 which connects the piston valve 263 with the lever 291.

Movement of the piston valve in this direction causes the groove 270 to register with the fluid inlet port 257, permitting fluid under pressure to flow through the passage 268 and port 266 to the port 255a in the casing, and thence through the pipe 255 to one end of the cylinder 252. The groove 269 of the piston valve 263 at this time is in registry with the exhaust port 258 in the casing 256 and the port 265 is in registry with port 254a, thus spent fluid is permitted to pass from the opposite end of the cylinder 252 through the pipe 254, casing port 254a, valve port 265 and passage 267 to the groove 269 and thence through the exhaust port 258.

The piston 251 in the cylinder 252 is now moving toward the exhausting end of the said cylinder, and thereby moving the traversing bars 245, 245 in a direction to traverse the mold structures located in the left side of the machine along their tracks 24, 24.

Movement of the traversing bars 245 causes the lever 260 to be turned on its pivot 261, and thereby gradually change the position of the pivotal center 296 of the double ended lever 295 from that shown in Fig. 56a to the position shown in Fig. 56b, attained when the traversing bars 245 have reached the end of their required movement, the said lever 295 assuming a position which permits the spring 264 to return the valve piston 263 to its neutral position, shown in Fig. 58.

As the cam 302 continues to rotate the roller 301 rides from the high portion of the cam to the low portion thereof, rocking the lever 298 from the position shown in Fig. 56b to that shown in Fig. 56c. The double ended lever 295 is consequently rocked on its pivot, permitting the piston valve 263 to move, by the action of the spring 264, from the neutral position in the casing 256 to a position therein where the groove 270 registers with the exhaust port 258, thereby exhausting the spent fluid from the outer end of the cylinder 252 through the pipe 255, piston port 266, passage 268, groove 270 and exhaust port 258. The groove 269 now registers with the fluid inlet port 257, permitting motive fluid under pressure to flow through the passage 267, piston port 265, casing port 254a and the pipe 254 to the inner end of the cylinder 252 moving the piston 251 therein, in a direction to return the traversing bars 245, 245 to their former positions. The lever 260 is thereby turned on its pivot 261 and gradually changes the position of the double ended lever 295 from the position shown in Fig. 56c to that shown in Fig. 56, and consequently moving the piston valve 263, against the action of its spring 264, to the neutral position shown in Fig. 58.

Fig. 60 illustrates the mechanism for controlling the operation of the traversing bars on the right side of the machine, for moving the mold structures into the different squeezing positions. This mechanism is substantially the same, in construction and operation, as the mechanism just described, for moving the mold structures along the left side of the machine under the various color hoppers, with the exception that the cam 302a has two high portions and two low portions as compared with a single high and a single low portion on the cam 302. This difference in the cams merely provides for two reciprocations of the right side traversing bars 245, for one reciprocation of the traversing bars 245 on the left side of the machine.

The mold advancing movement of the traversing bars 245 toward the rear of the machine, along the left side thereof and under the color hoppers is effected at a time when the elevating platform 220 is in its lowermost position and the grooved blocks 235 are disengaged from the keys 58 of the mold structures, as shown in Fig. 18. The keys 58 are now in engagement with the lugs 246 on the traversing bars 245. The mold structure 30, under the second color hopper 85, advances to a position within the transfer carriage 28 in the rear bridge member 8 and the mold structure under the first color hopper 85 advances to the position under the second color hopper 85. The position under the first color hopper 85 is filled by a mold structure removed from the transfer carriage 27 in the front bridge member 7.

The accuracy of the stroke of the traversing bars 245 and consequently the accuracy of registry of the lugs 246 thereon with the keys 58 on the mold structures 30, and the registry of these keys with the grooved blocks 235 on the elevating platform 220 is controlled, in the rearward movement of the traversing bars, by a lock nut 251a of the piston 251 engaging the inner side of the head 252c of cylinder 252, and in the forward or return stroke of the said traversing by an adjustable abutment 252d in the opposite head 252e of the cylinder 252.

The cut off of the supply of motive fluid to the different ends of the cylinder 252 may be minutely controlled by adjusting the double ended lever 295 relative to its pivot 296, thus undesirable hammering of the elements is obviated. Adjustment of the lever 295 relative to its pivot 296 changes the leverage ratio between the pivot 296 and the opposite ends of the lever 295 and is accomplished in the following manner:

On the pivot stud 296 is rotatably mounted a pivot block 304 having an integral and threaded stem 305 which passes through a rigid anchor block 306, aligned with the pivot block 304 in a longitudinally extending opening 307 formed through the center of the lever 295. A pair of nuts 308, 308 are threaded on the stem 305 and engage the opposite top and bottom faces of the anchor block 306, thus the lever 295 may be moved longitudinally with respect to the pivot block 304, and is guided on said pivot block by plates 309, 309 secured on the pivot stud 296 and embracing both the pivot block and the lever on opposite faces thereof.

*The lateral transfer mechanism for the mold structures*

As above mentioned, in each of the bridge members 7 and 8 is a carriage 27 and 28 respectively, which moves transversely of the machine and thereby transfers the mold structures from the left side to the right side thereof, and vice versa. Each transfer carriage 27 or 28 is provided with a set of supporting wheels 310, 310 (Fig. 35) which ride on lower rails 311, 311 secured to the lower faces of the bridge members 7 and 8 respectively. The rails 311 also act as lateral guides for the transfer carriages, engaging guide pads 312, 312 on the sides thereof. The transfer carriages are also provided with top guide pads 313, 313 which are engaged by depending guide ribs 314, 314 extending longitudinally of the bridge members 7 and 8 respectively, whereby raising of the transfer carriages therein is prevented.

As above mentioned, each transfer carriage 27 and 28 is provided with short track sections 24a, 24a, into which the wheels 32, 32 of the mold structures 30 are moved by the traversing bars 245. When in this position, the lugs 246, on the traversing bars 245, which engage the mold keys 58, are in lateral alignment with a rigid guide track 315 which is supported partly by the center main frame member 3 and partly on brackets 316, 316 secured to the respective main frame members 2, 3 and 4, as clearly shown in Figs. 13 and 35. As the carriages move longitudinally of the bridge members the keys 58 of the contained mold ride in the track 315, and thus control the position of the mold structure in the carriage during the lateral transfer of said mold.

The carriages 27 and 28 are moved longitudinally of the respective bridge members 7 and 8 by means of pistons operably mounted in cylinders 317, one of which is rigidly secured adjacent one end of each of the said bridge members. The outer end 318 of each piston rod is rigidly secured in a lug 319 formed integrally with and on one side of each respective carriage 27 or 28.

Motive fluid is admitted to and exhausted from the opposite ends of each of the respective cylinders 317 through pipes 320 and 321, which are respectively connected to ports 320a and 321a in a valve casing 322 (Figs. 61, 62, 63). The valve casing 322 is also provided with a fluid inlet port 323 and an exhaust port 324.

The carriage 27 or 28 is connected by a link 325 with one arm 326 of a bell crank lever 327 which is pivoted at 328 to the main base 1. The second arm 329 of the bell crank lever 327 is connected by a link 330 to one arm 331 of a bell crank lever 332 which is pivoted at 333 to a rigid bracket 334. The second arm 335 of the bell crank lever 332 carries a pivot stud 336 for a double ended lever 337. One end of the double ended lever 337 is connected by a link 338 to a lever 339 pivoted at 340 to the base 1. On the pivot spindle 341 connecting the link 338 and lever 339 is a roller 342 which is engaged by a control cam 343 secured to the cam shaft 20. The operation of the mechanism just described for reciprocating the carriages 27, 28 in their respective bridge members 7 and 8 is substantially the same as the operation of the mechanism previously described, in detail, for reciprocating the mold traversing bars 245 and will not be repeated. The additional levers and links included in the later described construction compensate for the increased amount of movement of the carriage 27 or 28 over that of the traversing bars 245. Registry of the track sections 24a in the carriages 27 and 28, with the tracks 24, 24 at the respective right and left sides of the machine, and the cut-off of the motive fluid from the cylinders 317 are governed and accomplished in the same manner as above noted relative to the traversing bars and the mold structures, that is, the movement of the piston in the cylinder is limited by the stops in the cylinder as above noted, and the double ended lever is adjustable with respect to its pivot stud.

When the carriage 28 in the rear bridge member 8 completes the lateral transfer of the mold structure therein, the keys 58 of the mold structure are lying between the lugs 246, 246 of the traversing bars 245, 245 in the right side of the machine, whereupon these bars are moved in a manner above noted to carry the mold structure into the first squeeze position. From there it is moved to the second squeeze position and subsequently to a position within the carriage 27 of the front bridge member 7. This carriage then transfers the mold structure laterally, into position to be moved by the left side traversing bars for a repeat of the cycle just described.

The first squeeze

The mechanism for applying the first squeeze to the granular material previously placed within the pattern chambers 42 of the mold structure is clearly shown in Figs. 1, 2, 6, 10, 11, 13, 36 to 43 inclusive and 51 to 55 inclusive, and comprises an upper platen 350 (see Figs. 11, 37, 38 and 39) which is secured to the under side of an arch member 351. The arch member 351 is secured at its opposite ends to the center main frame member 3 and the right side main frame member 4, respectively. On the base 1, in vertical alignment with the platen 350, is a pattern plunger and a border plunger elevating mechanism comprising a plunger 352 (see Figs. 11, 41 and 42) which is slidably mounted in a cylinder 353, secured to the base 1. On the upper end of the plunger 352 is secured a cross head 354 provided with depending ears 355 having slide grooves 356 formed therein. Slides 357, 357, secured respectively to the main frame members 3 and 4, fit within the grooves 356, 356 and guide the cross head 354 during its vertical movement. Lugs 358, 358 which are formed integral with and extend laterally from the cross head 354 engage the upper ends of the slides 357 and limit the downward movement of the cross head (see Fig. 11).

On each end of the cross head 354 is secured a block 359 (see Fig. 42) having a groove 360 adapted to engage the key 58 at each side of the mold structure 30. As the plunger 352 is elevated, the grooved blocks 359 engage the mold keys 58 and raise them out from between the lugs 246, 246 of the traversing bars 245. Continued vertical movement of the plunger 352 causes the upper edges of the walls 40 of the pattern chambers of the mold and the border plungers 36, 38, 38 to engage the under side of the platen 350 (see Fig. 41), the operating clearance between the mold wheels 32, 32 and the upper and lower rails 25 and 26 of the tracks 24, 24 permitting a very slight vertical movement of the mold structure to permit this contact, and thereby take up the operating clearance between the top edges of the pattern walls and the bottom face of the platen. The border plunger 37, the upper face of which normally lies below the plane $x$ of the upper edges of the walls 40, is also moved into contact with the platen 350, to strengthen the outermost wall 40 lying adjacent the plunger 37, by spring-loaded pins 361, 361 in the cross head 354 engaging the stems 52, 52 of the border plunger 37.

Subsequent vertical movement of the plunger 352 causes a presser plate 362 on the cross head 354 to engage the stems 47 of the pattern plungers 41, and thereby move said pattern plungers to squeeze the masses of granular material, which lie within the mold chamber 42, between the pattern plungers 41 therein and the platen 350, and within the confines of the chamber walls 40. Movement of the plunger stems 47 moves the operating frame 46 in the mold cavity 45 to an extent permitting the latches 64 on the mold frame 31 to move, by gravity, under the lugs 63 of the operating frame 46, thereby maintaining the pattern plungers 41 in their partly elevated positions in the pattern chambers 42 of the mold. Thus the individual mass of granular material in each of the pattern chambers 42 is primarily consolidated.

The elevating plunger 352 now recedes, carrying the mold keys back into engagement with the propelling lugs 246 of the traversing bars 245, and releasing the grooved elevating blocks 359 from the keys 58 to permit the mold structure to be moved on to the second squeeze apparatus.

The border plunger 37 again assumes its normal position below the plane $x$ of the pattern chamber walls 40, by action of the springs 55 surrounding the stems 52 of the said border plunger.

The plunger 352 (see Fig. 41) is of the shoulder type, being formed with a head 365 of comparatively large diameter and a neck 366 of relatively smaller diameter, whereby a shoulder 367 is formed on the plunger, which engages an internal flange 368 formed in the cylinder 353, which limits the upward movement of the plunger in the cylinder. Motive fluid conveying pipes 369 and 370 communicate with the interior of the cylinder 353 respectively above and below the head 365 of the plunger 352, and with ports 369a and 370a in a valve casing 371. The valve casing 371 is also provided with fluid inlet and exhaust ports 372 and 373 respectively. In the casing 371 is a piston valve 374 of the same general construction as above noted.

The plunger 352 is connected by a link 375 (see Figs. 10 and 51) with one arm 376 of a bell crank lever 377, which is pivoted at 378 to the frame member 4. The other arm 379 of the bell crank lever 377 is connected by a rod 380 to a floating lever 381, at a point 382 intermediate the ends thereof. One end of the floating lever 381 is directly coupled to the piston valve 374 at a point 374a, and the other end of said floating lever is connected at a point 383a by a link 383 to a lever 384 which is pivoted at 385 to the base 1. On the spindle 386, which pivotally connects the lever 384 and link 383, is a roller 387 which is engaged by an operating cam 388 on the cam shaft 20.

As the cam 388 rotates, the roller 387 will move to the low portion 388a thereof causing the floating lever to fulcrum at the point 382 and thereby moving the piston valve 374 in a manner to permit motive fluid, under pressure, to flow from the inlet port 372 to the port 370a and thence through the pipe 370 to the under side of the plunger 352, causing said plunger to rise, and permitting spent fluid to exhaust through the pipe 369, port 369a, valve 374 and exhaust port 373.

Raising of the plunger 352 gradually rocks the bell crank lever 377, and thereby moves the rod 380 longitudinally. This movement of the rod 380 rocks the floating lever 381, using the point 383a as a fulcrum and thereby returns the valve 374 to its neutral position.

Continued rotation of the cam 388 causes the roller 387 to again ride the high portion 388b thereof, which again rocks the floating lever on the pivot point 382, moving the piston valve in a manner to permit motive fluid, under pressure, to flow from the fluid inlet port 372 through the piston valve 374 to the port 369a, thence through the pipe 369 to the upper side of the head 365 of the plunger 352, thereby lowering the said plunger, and permitting spent fluids to pass from the under side of the plunger through the pipe 370, port 370a, valve 374, to the exhaust port 373.

As the plunger 352 is lowered the rod 380 is again gradually shifted longitudinally, rocking the floating lever on the pivot point 383, and again returning the piston valve 374 to its neutral position.

*Squeeze platen lubricating mechanism*

To prevent the granular material from adhering to the squeeze platen 350, the said platen is lubricated, prior to each squeeze operation performed thereby, by a felt pad 390 (see Figs. 38 and 39) which extends transversely of and under the platen 350. The upper edge of the pad 390 engages the under side of the platen 350 and the lower edge of the pad is submerged in a suitable lubricating fluid contained within a reservoir 391 formed in a carrier 392. The carrier 392 is vertically slidably mounted in a reciprocating bed 394. The bed 394 is provided with integral extending bearings 395, which are slidably mounted on guide bars 396, 396 secured, at their opposite ends, to the frame members 3 and 4, and extending parallel to the opposite sides of the arch member 351, which supports the squeeze plate 350. A vertical slot 397 is formed in the bed 394, within which the carrier 392 is maintained, having an upstanding leg 398 at each of its ends which is provided with a laterally extending foot 399. Each foot 399 overlies a sliding cam bar 400 carried in each end of the bed 394. The cam bars 400, 400 are adapted, when the bed 394 is reciprocated, to engage abutments 401 and 402 on the frame members 3 and 4 respectively, and thereby raise and lower the lubricating pad 390. Each cam bar 400 is provided with an inclined cam face 403 which rides under a similar face 404 on the carrier shoes 399 for raising the carrier. A spring 405 is located between each end of the carrier 392 and a bar 406 which straddles the upper part of the slot 397 formed in the reciprocating bed 394, and tends to lower the carrier 392 in the bed 394.

The bearings 395, 395 are each vertically grooved, as indicated at 407 (see Figs. 36 and 37), for the reception of a roller 408, carried by one arm 409 of a bell crank lever 410, pivoted at 411, one on each side of a bracket 412 which is formed integral with and strengthens the arch member 351. The second arms 413, 413 of the bell crank levers 410, 410 are pivotally connected to an adjustable head 414, on an operating rod 415. The lower end of the operating rod 415 is pivotally connected between the free ends of a pair of levers 416, (see Figs. 6 and 11) one of which extends to each side of the squeeze cylinder 353 and are loosely pivoted on the pivot rod 378 beforementioned. Each lever 416 is connected by a link 417 (see Fig. 10) to a yoked arm 418 of a bell crank lever 419 which is pivoted at 420 to the frame member 3. The other arm 421 of the bell crank lever 419 is pivotally connected to one end of an operating rod 422, the other end of which has a head 423 thereon, which straddles the cam shaft 20, and is equipped with a roller 424 riding in a cam groove 425 of a cam 426 secured to the cam shaft 20.

As the cam 426 revolves, the bed 394 is reciprocated under the platen 350. As the reciprocating bed 394 approaches the frame member 4, one end of each of the cam bars 400 strikes its respective abutment 402 moving the bars 400, 400 relative to and within the bed 394, thus the inclined cam faces 403, 403 of the cam bars 400, 400 engage the inclined cam faces 404, 404, on the feet 399, 399 of the carrier 392 thereby raising the carrier. The lubricating pad 390 is now in position to wipe the under face of the squeeze platen 350, on the return stroke of the reciprocating bed 294. As the bed 294 approaches the end of its return stroke, the opposite ends of the cam bars 400, 400 engage the abutments 401, 401 and moves the raised portions of the cam bars from under the feet 399, 399 of the carrier 392. The carrier 392 is then lowered in the reciprocating bed 394, and the lubricating pad 390 does not again engage the platen until the return stroke of the next reciprocation of the bed 294.

*The mold lubricating mechanism*

To prevent the granular material from adhering to the pattern walls 40, and the pattern 41 within the pattern chambers 42 of the molds, when the squeezing or consolidation of the material in the pattern chambers is effected, these parts are lubricated, by a suitable fluid being sprayed thereon, before the molds receive their loose masses of granular materials from the color hoppers 85, 85. For this purpose an atomizer is provided on the front bridge member 7 at the left side of the machine (Figs. 1 and 7, 64 and 65). The atomizer comprises a fluid container 430 having feet 431 secured to the bridge member 7. Adjacent the top and at one side of the atomizer body 430 is a slot 432, closed by a cover 433 in which is mounted a plurality of air tubes 434. Within each air tube is a lubricant conveying tube 435, one end of which terminates at a point slightly above the free end of air tube 434. The other end of the lubricant conveying tube 435 terminates at a point slightly above the bottom of, and within, the container 430.

The free end of the air tube is contracted, and is provided with an opening in line with the lubricant conveying tube 435 to concentrate the air flow at the end of the lubricant tube 435, and thus draw the lubricant therethrough projecting the atomized lubrication into the pattern chambers of the molds.

Air, under pressure, is admitted at predetermined intervals to the top of the container 430 by means of a pipe 436 connected at its opposite end to a valve 437. A pipe 438 connects the valve 437 with a source of air supply (not shown). Within the valve casing 437 is a piston valve 439 having a through passage 440 therein, which is adapted to align with the pipes 436 and 438 to permit the passage of air under pressure from the latter to the former. The piston valve 439 is provided with a head 441 having an inclined face 442 adapted to be engaged by one of the end bars 33 on each mold structure, when the pattern chambers 42 of the mold structure are passing under the atomizer jets 434, 435. A spring 443 resiliently maintains the valve head 441 in a projected position. The reservoir 430 may be refilled through an opening 444, normally closed by a screw plug 445.

*The second squeeze mechanism*

After the masses of granular material have been primarily consolidated in the pattern chambers 42 of the mold structures 30, the molds are moved to a second squeeze position wherein these partly consolidated masses of granular material are finally consolidated on a web of base material to form the finished linoleum.

The second squeeze mechanism is clearly shown in Figs. 1, 2, 6, 9, 13 and 44 to 50 inclusive, and includes an upper platen 450 (see Figs. 9 and 44), under which a web $z$ of base material is moved in intermittent steps, each of which is substantially equal to the shortest overall measurement of the pattern area 39 of the mold structures 30, the greatest overall measurement of this pattern area 39 being substantially equal to the width of the web $z$.

In the second squeeze operation, the border plungers 38, 38 (see Fig. 44) engage the base material $z$ along its longitudinal side edges, at the place where the present mold is to deposit or "set" its contained design formed of partly consolidated masses of granular material; the border plunger 37 engages that portion of the finished linoleum which was "set" by the previous mold structure, and the pattern wall 40 of the present mold structure, which lies immediately adjacent the inner edge of the said border plunger 37 and constitutes one of the limits of the pattern area 39 in the present mold structure, is in registry with the rear transversely extending sharp edge of the last "set" section of the finished linoleum; and the plunger 36 engages the web $z$ transversely thereof in a line parallel to the said sharp edge of the last "set" design unit to form a sharp edge on the design unit about to be deposited on the base web $z$.

The mold structure 30 is placed under the upper platen 450, and over a mold plunger operating platform 451, which is in vertical alignment with the platen 450, by the traversing bars 245 on the right side of the machine. The pattern plungers 41 in the pattern chambers 42, as previously described, are held in a partly elevated condition in the pattern chambers by the latches 64.

The mold plunger operating platform 451 is provided with depending ears 452, 452 (see Fig. 44) in which are formed guide grooves 453 for the accommodation of vertically extending guide slides 454, 454 respectively secured to the main frame members 3 and 4.

The platform 451 is raised and lowered by a double toggle mechanism (see Fig. 6) comprising links 455, 455 pivotally attached to the underside of the platform 451, and links 456, 456 pivotally attached to the base 1. The links 455 and 456 are pivotally attached to each other and to a longitudinally extending connecting link 457, as indicated at 458. The link 458 is pivotally attached to one end of an operating rod 459, the other end of which is provided with a head 460, equipped with a roller 461 adapted to ride in a groove 462 in a cam 463, which is secured to the cam shaft 20.

The upper face of the platform 451 is provided with blocks 464 (see Fig. 45) having grooves 465 therein, which engage the keys 58 of the mold structures 30 and raise them clear of the lugs 246 of the traversing bars 245. A plate 466 is also secured to the upper face of the platform 451. The platform 451 is also provided with a series of spring-loaded pins 467, 467 and 468, 468.

As the toggles 455—456 are straightened, as shown in Fig. 6, the grooved blocks 464 first engage the mold keys 58 and raise them as above noted. The mold structure 30 and consequently the pattern walls 40 are held against vertical movement by the upper rails 26, 26 of the tracks 24, 24. The spring-loaded pins 467 engage the stems 52 of the border plungers 36, 37 and 38, 38 moving them into contact with the web $z$ and the edge of the last "set" design unit of the finished linoleum, as above noted. Continued vertical movement of the platform 451 causes the plate 466 to engage the stems 47, 47 of the pattern plungers 41, 41 moving said plungers vertically in the pattern chambers 42 until the upper faces of the said pattern plungers 41, 41 lie in a plane coincident with the plane $x$ of the upper edges of the pattern walls 40, the upper platen 450 at the same time moving slightly upward to permit the partly consolidated masses of granular materials to be moved, by the pattern plungers 41, 41 out of the pattern chambers 42, 42. The upper faces of the pattern plungers 41, 41 and the upper edges of the pattern walls 40 together form a smooth lower platen surface for further operation during the final consolidation of the finished product.

The spring-loaded pins 468, 468 engage the operating fingers 67, 67 of the latches 64, 64 releasing the latches from the lugs 63, 63 of the pattern plunger operating frame 46.

The upper platen 450 is mounted on a carrier 469 (see Fig. 9), which is provided with guide grooves 470, 470 for the accommodation of guide slides 471, 471 secured respectively to brackets 472—473 secured to the main frame members 3 and 4 respectively. The brackets 472 and 473 are rigidly connected at their upper ends to a cross beam 474, on which are pivotally mounted links 475, 475 constituting one half of a double toggle mechanism. Links 476, 476 are pivotally attached to the upper platen carrier 469 and to the links 475, 475. The two toggles 475—476, 475—476 are cooperatively connected by a horizontal link 477. A yoke lever 478 straddles the bracket 473. The pivot spindles 479 and 480 of the links 475, adjacent the bracket 473, are extended beyond the bracket 473 and are secured in the yoke lever 478, whereby the toggles may be operated by the said yoke lever 478. The outer end of the yoke lever 478 is operatively connected by a link 481 to one end of a plunger 482, which is provided with a head 483 operatively mounted in a cylinder 484 which is secured to the main frame member 4.

When the toggles 455—456 are straightened the lower platform 451, and consequently the pattern plungers 41 are raised, and the pattern plungers 41 then form a rigid abutment against which the upper platen 450 operates to squeeze the linoleum to a finished state. The possibilities of the lower toggles 455—456 collapsing under the pressure exerted by the upper toggles 475—476, which control the operation of the upper platen 450, is eliminated by the fact that the pivotal centers of the links constituting these lower toggles are maintained in positive alignment by the cam 462 and the operating rod 459, during the period of descent of the upper platen 450.

Motive fluid conveying pipes 485 and 486 are connected to the respective ends of the cylinder 484 and to ports 485a and 486a in the respective ends of a valve casing 487, Fig. 49. The valve casing 487 is provided with an inlet port 488, for motive fluid under pressure, and an exhaust port 489, for spent fluid.

The plunger 482 is connected by a link 490 to one arm 491 of a bell crank lever 492 (see Fig. 2), which is pivoted at 492a in the frame of the machine. The second arm 493 of the bell crank lever 492 is connected by a link 494 to a point 495 on a floating lever 496 intermediate the ends thereof (see Fig. 49). One end of the floating lever 496 is directly coupled at 497 to a piston valve 498 slidably mounted in the valve casing. The other end of the floating lever 496 is pivotally connected at 499 to a link 500. The opposite end of the link 500 is pivotally connected at 501 to a lever 502 which is pivoted at 503 to the base 1. A roller 504, rotatably mounted on the pivot spindle 501, engages a cam 505 secured to the cam shaft 20. The mechanism just described operates in substantially the same manner as previously described relative to the other differential valve operating mechanisms.

The cam 505 is so shaped that throughout the second squeeze and setting operation, the upper platen 450 is moved to various horizontal levels. Obviously as the cam 505 rotates the floating lever 496 is rocked around the pivot 495, and the piston valve 498 is moved in a manner to admit motive fluid, under pressure, to one end of the cylinder 484 and exhaust spent fluid from the opposite end of the cylinder, whereby the plunger 482 in the cylinder 484, which controls the position of the upper platen 450, is moved. Movement of the plunger 482 causes the floating lever 496 to be rocked on the pivot 499 by the rod 494, and thereby return the piston valve to its neutral position, whereby further movement of the plunger 482 in the cylinder 484 is arrested until the roller 504 rides onto a portion of the cam 505 having a different elevation and the floating lever is again rocked about the pivot 495, to again operate the piston valve 498.

*The base material feeding mechanism*

The web z of base material, in the form of a roll, is placed upon a supporting shaft 510 mounted in bearings 511 and 512 formed in brackets 513 and 514 secured to the rear bridge member 8 (see Figs. 2 and 6), and passes under a plain faced roll 515 and over a second plain faced roll 516, rotatably mounted in the said brackets. From the roll 516, the web of base material passes over another plain faced roll 517 rotatably carried in brackets 518 carried by the cross beam 474 over the second squeeze platen 450. From the roll 517 the web of base material (burlap) passes partly around a roll 519, which is faced with ordinary carding cloth 520 in order to secure a purchase on the burlap. The web of burlap then passes under the second squeeze upper platen 450, and partly around a second roll 521 which is faced with carding cloth 522. The web z, after leaving the platen 450, is in the form of finished linoleum, which passes from the roll 521 around a plain faced roll 523 to a take-up roll 524 carried by a shaft 525 which is rotatably mounted in the brackets 513 and 514.

The rolls 519 and 521 are secured to shafts 527 and 528, rotatably mounted in brackets 526, 526, which project laterally from, and are formed integral with, the carrier 469 of the upper platen 450. Thus the said rolls move up and down with the said platen and their facings of carding cloth prevent the web z from moving relative to the said platen.

The web z is fed in intermittent steps of predetermined length, each of which is equal to the width of the design area 35 of the mold structures 30, by a ratchet wheel 529 secured to one end of the shaft 528 and engaged by a pawl 530 mounted on one end of a short spindle 531 rotatably mounted in one arm 532 of a lever 533. The lever 533 is loosely pivoted on the said shaft 528 (Fig. 47) and is provided with a second arm 534 which is connected by a link 535 to a lever 536 pivoted to the main frame 4. The lever 536 is provided at its outer end with a gear segment 537, which meshes with a pinion 538 on the outer end of one of the equalizing shafts 247, which are geared to and effect coordinate movement of the traversing bars 245, 245 on the right side of the machine.

The take-up roll 524 is also operated by the arm 536 through a link 540 which is connected to a double arm lever 541 pivotally mounted on the hub 543a of a ratchet wheel 543, which is loosely mounted on a short shaft 544 coaxially aligned with the take-up shaft 525, see Fig. 67. A pawl 542 on the lever 541 engages the teeth of the ratchet wheel 543, by which said ratchet wheel is rotated. The ratchet wheel 543 is held in frictional engagement with a take-up disc 545, secured to the short shaft 544, by means of spring 546 encircling the said shaft 544 and confined between a ring 547 on the hub 543a of the ratchet wheel 543 and an adjusting nut 548 threaded on the outer end of the shaft 544. A lock nut 548a secures the adjustment. The ring 547 acts to force the ratchet wheel 543 against the take-up disc 545 and also acts to maintain the lever 541 loosely on the hub 542 of the said ratchet wheel. The inner end of the shaft 544 is provided with a collar 549 having a groove 550 formed in one of its sides for the reception of a squared end 551 of the take-up shaft 525.

As the traversing bars 245, 245 are reciprocated, the segmental arm 536 is rocked, thereby operating the take-up mechanism to wind up or take up the finished linoleum, and also operating the feed roll 521 to advance the web z under the platen 450, if the operating pawl 530 is in engagement with the ratchet wheel 529. Engagement of these elements 530 and 529 is controlled by a cam 552 secured to the cam shaft 20. The spindle 531 which carries the operating pawl 530 also has an arm 553 secured thereto, which is operated by a link, lever and operating rod mechanism 554—555—556 from the cam 552, the operating rod 556 having a head 557 which straddles the shaft 20 and is equipped with a roller 558 riding the cam 552 (Fig. 49). It will be here noted that the traversing bars 245 on the right side of the machine receive two reciprocations for one reciprocation of the traversing bars on the left side of the machine, for reasons hereinafter stated, and during one of these reciprocations of the bars on the right side of the machine a mold structure 30 remains in engagement with the second squeeze platen 450 and web z, therefore, it is necessary to release the web feeding roll 521 from the mechanism which normally effects the feeding of the web z. This is accomplished by the mechanism just described. Feeding of the base web z is resisted by a flanged wheel 559 secured to the shaft 510 and a cooperating friction band 559a anchored at 559b to the bracket 514, as shown in Fig. 3.

To prevent the web z from becoming loose or non-taut while the pawl 530 is out of contact with the feed ratchet wheel 529, an indexing wheel 560 is provided and secured on the shaft 528 (see Fig. 47). The index wheel 560 is provided with notches 561 into which an index pawl 562 is adapted to be successively moved after the feed roll 521 is rotated, by the feed ratchet wheel 529, and to remain in the occupied notch between the intermittent movements of the said feed roll.

The index pawl 562 is secured to one end of a short spindle 563, which is rotatably mounted in a bearing 564 rigidly attached to one of the brackets 526. On the opposite end of the spindle 563 is secured an arm 565 which is adapted to be operated through a link, lever and operating rod mechanism 566—567—568, by a cam 569 secured to the cam shaft 20. The operating rod 568 has a head 570 straddling the shaft 20 and equipped with a roller 571 which rides the cam 569.

Figs. 78 to 83 illustrate diagrammatically the manner in which the loose masses of differently colored granular materials are deposited in the pattern chambers 42 of the mold structures 30.

Fig. 78 illustrates the mold structure as being positioned under the stencil plate 106 of the first color hopper 85.

Fig. 79 shows the next successive operation, the mold structure being elevated to a position wherein the upper edges of the pattern walls 40 are in contact with the under side of the stencil plate 106.

Fig. 80 shows the next operation wherein the pattern plungers 41 are slightly raised within the pattern chambers 42 in order that the said chambers will receive the proper amount of granular material.

Fig. 81 shows one chamber 42 filled with granular material, the other chamber being sealed by a plain portion 107a of the stencil plate 106. The plunger 41 is then slightly lowered in the chamber 42 until the top of the body of granular material lies slightly below the top edges x of the pattern walls 40. Thus loss of granular material from the filled chambers is prevented as the mold structures are conveyed through the machine to the squeeze positions.

Fig. 82 shows the mold structure in its lowered or traversing position with one chamber 42 filled and the other chamber empty.

Fig. 83 shows the mold structure, after it has gone through the operations just described, under the second color hopper, wherein the second chamber 42 has been filled and the first filled chamber has been sealed by the plain portion 107b of the stencil plate 106a during the filling of the second chamber.

Fig. 84 shows the filled mold under the first squeeze platen 350, having been slightly raised thereunder until the top edges x of the walls 40 are in contact with the said platen.

Fig. 85 shows a continued upward movement of the cross head 354, the border plungers 36, 37, etc. being in contact with the platen 350 and the pattern plungers 41 in the pattern chambers 42 having started to consolidate the loose masses of granular material in the said pattern chambers.

Fig. 86 shows the pattern plungers 41 as having completed their upward consolidating movement in the pattern chambers 42 and the granular material primarily compressed therein.

Fig. 87 shows the pattern plunger operating cross head 354 as having receded.

Fig. 88 shows the mold structure, with the partly consolidated masses of granular material in the pattern chambers, just after the said mold structure has been positioned under the second squeeze platen 450.

Fig. 89 shows the border plungers 36 and 37 as having been raised to a position wherein they are contacting with the base web z and the last set design unit respectively.

Fig. 90 shows the pattern plungers 41, 41 and the upper platen 450 as having been raised to a position wherein the partly consolidated masses of granular material have been ejected from the pattern chambers 42, 42, lying between the upper platen 450 and a platen surface y, formed by the upper surfaces of the pattern plungers 41, 41 and the top edges of the pattern walls 40.

Fig. 91 shows the second or final squeeze being effected between the upper platen 450 and the lower platen surface y, the granular material being pressed onto and into the base web z.

Fig. 92 shows the upper platen 450 as being raised to strip the finished linoleum from the lower platen surface y.

Fig. 93 shows the entire mold structure completely disengaged from the finished linoleum, and Fig. 94 shows the mold structure as being ready to be removed to the first color hopper for recharging, it being noted that the pattern plungers are in their lowermost positions in the pattern chambers 42.

The movements of the mold structure through the machine are clearly illustrated in Figs. 72 to 77, upon reference to which it will be noted that there are four mold structures M¹, M², M³ and M⁴ employed in the present form of the machine.

Each of these mold structures is movable in intermittent steps to a plurality of positions indicated at A, B, C, D, E, F, G and H.

The mold structure M¹, in position A, Fig. 72, is lying within the front lateral transfer carriage 27, located in the front bridge member 7, which has been moved to the left side of the machine, in line with the tracks 24, 24 at the left side of the machine.

The mold structure M² occupies position B, under the first color hopper 85 from which some of the pattern chambers 42 have received a supply of granular material of one color.

The mold structure M³ occupies position C, under the second color hopper 85, from which the pattern chambers 42 therein, not previously filled when the mold structure was in position B, have received a supply of granular material of a second or different color from that received in position B.

The mold structure M⁴ occupies position G, which is the second squeeze position, it being understood that the mold structure M⁴ has successively progressed through positions A, B, C, D, E and F.

The first operation of the machine is a longitudinal traversing movement of the left side traversing bars 245, 245 to traverse the mold structures M¹, M² and M³ from the positions shown in Fig. 72 to those illustrated in Fig. 73, and at the same time the second squeeze operation of mold structure M⁴ in position G is started.

In Fig. 73, the empty mold structure M¹ is placed in position B to receive the granular material from the first color hopper 85, the mold structure M² is in position C under the second color hopper 85, to complete the filling of its mold chambers 42, and the filled mold structure M³ is in position D within the lateral transfer carriage 28 in the rear bridge member 8.

Fig. 74 shows the filled mold structure M³ having been laterally transferred to position E at the right side of the machine in line with the tracks 24 therein, and being in a position to be engaged and moved by the right side traversing bars 245, 245, while the filling of the mold structures M¹ and M², in positions B and C, progresses and the second squeeze operation of mold structure M⁴, in position G, continues.

The next operation is the forward traversing of the mold structure M³ by the right side traversing bars 245 from position E to position F, Fig. 75, wherein the mold structure M³ is placed under the first squeeze platen 350. The first squeeze operation is then effected on mold structure M³, while the filling of mold structures M¹ and M² and the second squeeze operation on mold structure M⁴ continues.

When the first squeeze operation is completed on the mold structure M³, position F, Fig. 75, the second squeeze operation on the mold structure M⁴, position G, Fig. 75, has been completed whereupon the traversing bars 245 on the right side of the machine are reciprocated for the second time, to traverse the mold structures M³ and M⁴ forwardly, the mold structure M⁴ going to position H, which is within the lateral transfer carriage 28 of the front bridge member 7 at the right side of the machine, and the mold structure M³ entering position G to receive its second squeezing operation, as clearly shown in Fig. 76.

The mold structure M⁴ is then transferred laterally from position H in alignment with the tracks 24 at the right side of the machine to position A in alignment with the tracks 24 at the left side of the machine, as clearly shown in Fig. 77, which corresponds with the position of the mold structure M¹ in Fig. 72.

Thus the cam shaft 20 has made one complete revolution and the machine has undergone one complete cycle of operation. It will be here understood that four complete cycles of the machine are required to advance any one of the mold structures completely around the machine from position A back to the same position.

The relative timing of the several controlling cams secured to and rotated by the said cam shaft 20 is clearly shown in Fig. 71, which is a flat plotted development of the several cams, the spaces between the vertical lines each indicating 10°.

The position of the elements of the machine as shown throughout the drawings of this application correspond to the zero position on the cam diagram of Fig. 71. Fig. 72 also illustrates the position of the molds M¹, M², M³ and M⁴ at the said zero position of the cam shaft 20.

Fig. 73 illustrates the operations which take place when the cam shaft 20 rotates from the zero position to the 51° position; Fig. 74 illustrates the operations between the 51° position and the 111° position; Fig. 75 illustrates the operations between the 111° position and the 249° position; Fig. 76 between the 249° position and the 300° position; and Fig. 77 from 300° to 360° which completes a full revolution of the cam shaft 20.

The first revolution of the cam shaft 20, through the cam 302, which controls the reciprocation of the left side traversing bars 245, 245, moves the mold structure M¹ rearwardly from position A (Fig. 72) to position B (Fig. 73) where it is stopped under the first color hopper 85.

In passing from position A to position B, one of the end bars 33 of the mold structure M¹ engages the inclined face 442 of the head 441 of the piston valve 439, moving the piston longitudinally, causing the port 440 therein to register with the pipes 436 and 438, thereby permitting air under pressure to flow to the lubricating jets 434—435 and spraying lubricant from the reservoir 430 into the pattern chambers 42, 42 of the mold structure and onto the walls 40, 40 of these chambers.

As the mold structure M¹ reaches position B, the cam 232 effects the raising of the mold elevating platform 220, disengaging the keys 58, 58 of the said mold structure M¹ from between the lugs 246, 246 of the traversing bars 245, and thereby permitting the said traversing bars 245 to be returned to their forward positions. Raising of the mold elevating platform 220 and consequently the mold structure M¹ first causes the upper edges of the pattern walls 40 thereof to contact with the under side of the stencil plate 106 lying between the said first color hopper 85 and said mold structure, the openings 107 therein registering with those of the pattern chambers 42, which are to receive granular material from the first color hopper 85, see Fig. 79, and other pattern chambers 42 being sealed by the plain portions 107a of said stencil plate. Continued elevation of the platform 220 causes the plate 236 thereon to press the stems 47, 47 of the pattern plungers 41, 41 to raise slightly the said pattern plungers 41 in their respective pattern chambers 42, whereby the capacity of said chambers is minutely controlled to receive just the correct amount of granular material from the first color hopper 85. The vacuum sweeper head 110, with suction applied to the vacuum nozzle 175 thereof, is now moved by its cam 174 from a rearward position to a forward position over the stencil plate 106, thereby removing dust and other foreign matter from the pattern chambers 42 of the mold structure M¹.

The continuously gyrating distributing grids 105 are now lowered by their cam 243 to a position immediately adjacent the upper face of the stencil plate 106, and the trap doors or valves 95 of the first color hopper 85 are opened to permit a quantity of the granular material from said hopper to be dropped into the gyrating distributing grid 105 to spread the said material over the said stencil plate 106 and through the openings 107 thereon into the registering pattern chambers 42, 42 of the mold structure M¹. The distributing grid 105 is then raised to its inoperative position and the vacuum sweeper head 110, with no suction applied thereto, is passed rearwardly over the said stencil plate, by its operating cam 174, thereby sweeping the surplus granular material, remaining on the stencil plate 106, into the path of the continuously operating endless belt conveyer 185, to be returned to the said hopper 85 by the continuously operating elevator 189.

The mold elevating platform 220 is then lowered by its controlling cam 232 and the keys 58, 58 of the mold structure M¹ again enter between the pairs of lugs 246, 246 on the respective traversing bars 245, 245, at the left side of the machine.

The second revolution of the cam shaft 20 first moves the mold structure M¹ from position B to position C, under the second color hopper 85, at which position the operations described relative to those undergone by the mold structure while in position B are repeated. The pattern chambers 42, 42 of the mold structure M¹ which were filled with granular material in position B, in the new position C are sealed by the plain portions 107b of the stencil plate 106a, under the second color hopper 85, the empty pattern chambers 42 which were closed by the plain portion 107a of the stencil plate 106 in position B being replaced by openings 107 in the stencil plate 106a which register with the empty pattern chambers 42.

During the next or third revolution of the cam shaft 20 the filled mold structure M¹ is moved by the operation of the traversing bars 245, 245 on the left side of the machine from position C out of the tracks 24 at the left side of the machine into the short track sections 24a in the transfer carriage 28, located in the rear bridge member 8 position D. The said transfer carriage 28 and mold structure M¹ are then moved laterally from position D at the left side of the machine to position E at the right side of the machine, and the short track sections 24a therein are brought into alignment with the tracks 24 at the right side of the machine. This operation is controlled by the cam 343a operating the valve 322a, which controls the reciprocation of the piston in the rear lateral transfer cylinder 317a (Fig. 1) secured to the rear bridge member 8.

During this lateral transfer movement of the mold structure M¹ from the left to the right side of the machine, the keys 58 thereof are moved laterally out from between the lugs 246, 246 of the left side traversing bars 245, 245 into registry with and ride in the rear guide track 315 (Fig. 13), and a cleaning pad 575 (Figs. 13 and 35) wipes the upper surface of the border plunger 37 as it passes thereunder. The cleaning pad 575 is mounted on a resilient plate 576 secured to the center main frame member 3.

The keys 58, 58 of the mold structure M¹ now lie between the lugs 246, 246 of the right side traversing bars 245, 245 which latter are moved in a forward direction by the piston in the operating cylinder 252a (Fig. 13) under the control of the valve 256a operated by the cam 302a. This forward movement of the right side traversing bars 245, 245 moves the mold structure M¹ from position E out of the short track sections 24a in the said rear transfer carriage 28 into and along the tracks 24 at the right side of the machine, to position F, under the first squeeze platen 350.

During the above noted lateral transfer of the mold structure M¹, the lubricating wiper pad 390 is reciprocated by its operating cam 426 across the under side of the first squeeze platen 350 returning to its normal inoperative position adjacent the center main frame member 3. During the first stroke of its reciprocation toward the frame member 4, the pad 390 is out of engagement with the platen 350, and as it approaches the limit of this movement the cam bars 400, 400 engage the abutments 402, 402 in the frame member 4, and thereby raise the pad 390 into a position to engage the platen 350 on its return stroke, at the end of which the said cam bars 400, 400 strike the abutments 401, 401 on the frame member 3 and again disengage the lubricating pad 390 from the platen 350.

The first squeeze plunger 352 is now operated, through the action of its controlling cam 388 and valve 371, to rise within the cylinder 353, the first action being the raising of the mold keys 58, 58 out of engagement with the lugs 246, 246 on the right side traversing bars 245, 245, by the grooved blocks 359, 359 on the cross head 354. The right side traversing bars 245, 245 now return to their rear position. The rigid frame 31 of the mold structure M¹ is now slightly raised to bring the upper edges of the pattern walls 40 and the top faces of the border plungers 36 and 38, 38 (Fig. 84) into contact with the under surface of the upper platen 350. Continued upward movement of the squeeze plunger 352 causes the spring-loaded pins 361 to engage the stems 52 of the border plunger 37, moving this plunger into contact with the under surface of the platen 350 (Fig. 85). The plate 362 on the cross head 354 has engaged the stems 47 of the pattern plungers 41 and continued upward movement of the squeeze plunger 352 causes the pattern plungers 41 to move upward in their respective pattern chambers 42, thereby effecting the primary consolidation of the granular material within the chambers (Fig. 86) by compressing or squeezing the said material between the pattern plungers 41, 41 and the squeeze platen 350. The latches 64, 64 of the mold structure then move, by gravity, under the lugs 63, 63 of the pattern plunger operating frame 46, holding the plungers 41 in their partly raised positions (Fig. 87).

The squeeze plunger 352 then recedes, permitting the mold pattern walls 40 and border plungers 36, 37, 38, 38 to move out of contact with the platen 350, and again placing the mold keys 58, 58 in engagement with the lugs 246, 246 on the right side traverse bars 245, 245, the cross head 354 descending to a horizontal plane wherein the grooved blocks 359, 359 move out of engagement with the mold keys 58, 58 to permit the said traversing bars 245, 245 to move the mold structure M¹ from position F to position G, which is the second squeeze position. It will be noted that this is the second reciprocation of the right side traversing bars 245, 245 for a single revolution of the cam shaft 20, due to the peculiar shape of the controlling cam 302a, as shown in Fig. 60.

During this second reciprocation of the right side traversing bars 245, 245 the base material web z is fed forward, removing the latest deposited design unit from under the second squeeze platen 450 and bringing an uncoated portion of the base web z thereunder. At this time the indexing pawl 562 is temporarily withdrawn from the index wheel 560, by its controlling cam 569, and the feed operating pawl 530 is temporarily permitted to engage the feed ratchet wheel 529 by its control cam 552, so that, as the said right side traversing bars 245, 245 are reciprocated, the traversing bar coordinating shaft 247, and consequently the pinion 538 thereon, will be oscillated, thereby oscillating the segmental arm 526. As shown in Fig. 2, oscillation of the segmental arm 536 will oscillate the feed lever 528 which carries the feed pawl 530 and will also oscillate the take-up lever 541 which through the take-up pawl 542, ratchet wheel 543 and friction disc 545 will wind the finished linoleum around the shaft 510.

As the traversing bars 245, 245 complete the forward stroke of their second reciprocation on this third revolution of the cam shaft 20, the forward side of the pattern wall 40 adjacent the border plunger 37, contacts with the rear edge of the last set design unit of the finished linoleum, as illustrated in Fig. 88; the cam 463 acts to straighten the toggles 455—456, 455—456, of the vertical movable platform 451 under the second squeeze platen 450, the grooved blocks 464, 464 thereon engaging the mold keys 58, 58 of the mold structure M¹, thereby releasing the said keys from the lugs 246, 246 of the right side traversing bars 245, 245, permitting these bars to return to their normal rearward position.

The cam 463 continues to raise the vertical movable platform 451, causing the spring-loaded pins 467, 467 to engage the stems 52 of the border plungers 36, 38, 38, moving these plungers into firm contact with the base web z and the border plunger 37 into firm contact with that portion of the last set design unit of the finished linoleum which lies immediately adjacent the aforesaid rear edge of said unit, see Fig. 89. The upper rail of the track 24 prevents the rigid frame 31 of the mold structure from moving vertically, thus the upper edges of the pattern walls 40, lying in the plane $x$, do not contact with the base web $z$, due to these walls being rigidly secured in the rigid frame 31. The upper platen 450 then raises slightly and the border plungers 36, 37, 38 and 38 follow, thus the pattern plungers 41, 41 move vertically in their respective pattern chambers until they attain a plane coincident with the plane $x$ of the upper edges of the pattern walls 40, 40, forming therewith a smooth surface which will be hereafter referred to as the lower squeeze platen surface $y$. The pattern plungers 41, 41 moving vertically in their respective pattern chambers 42, 42 cause the partly consolidated masses of granular material in the pattern chambers 42, 42 to be moved out of the said pattern chambers resting on the upper face of the newly formed lower platen surface $y$, see Fig. 90. Here the third revolution of the cam shaft 20 ends.

The start of the fourth revolution of the cam shaft 20 finds the upper platen 450 and the lower platen surface $y$ in the positions above noted. The next part rotation of the shaft 20 causes the cam 505 to effect the lowering of the upper squeeze platen 450, effecting a squeezing of the granular material between itself and the lower platen $y$, whereby the said partly consolidated masses of granular material are pressed onto and into the base web $z$, and are spread in a manner to unite with the neighboring masses, see Fig. 91. The relation of the upper and lower platens is maintained throughout the greater part of the fourth revolution of the cam shaft 20 to permit the several finally consolidated masses of granular material to knit with each other and with the base web $z$, to form a finished design unit of the finished linoleum. The border plungers 36, 37 and 38, 38 maintain the granular material within the design area 35 of the mold structure during this final consolidation and finishing of the newly deposited design unit.

The spring-loaded pins 468 in the vertically movable platform 451 engage the fingers 67 of the latches 64 disengaging the said latches from the pattern plunger operating frame lugs 63, and when the platform 451 is again lowered the latches 64 are thereby held out of engagement with the said lugs, permitting the pattern plungers 41, 41 to resume their lowermost positions in their respective pattern chambers 42, 42.

The cam 505 next operates to cause the upper platen 450 to raise slightly (see Fig. 92) to loosen the finished linoleum design unit from the lower platen surface $y$, the cam 463 immediately following to lower the platform 451. The cooperative movement of the two cams completely severs relationship between the mold structure, the finished linoleum design unit and the base web $z$ as shown in Fig. 93.

Continued downward movement of the platform 451 causes all the elements of the mold structure to again assume their normal lowermost positions, the mold keys 58, 58 again entering between the lugs 246, 246 of the right side traversing bars 245, 245 which are subsequently reciprocated to move the mold structure $M^1$ from the position G to position H, which is within the lateral transfer carriage 27 in the front bridge member 7 at the right side of the machine.

The cam 343 now functions to effect movement of the front transfer carriage 27, with its contained empty mold structure $M^1$ from the right side of the machine to position A at the left side of the machine, wherein the short track sections 24a of the said carriage are in alignment with the tracks 24, 24 at the left side of the machine. During this lateral transfer of the mold structure, the keys 58, 58 thereof ride within the front guide track 315a.

Thus four complete cycles or revolutions of the cam shaft 20 are required to effect one complete cycle of the machine for any given mold structure therein.

If plain unicolored linoleum is to be produced, the inter or pattern walls 40 are eliminated, the outer walls 40, which lie immediately adjacent the border plungers 36, 37, 38 and 38, remaining to define the limits of a single chamber having the same dimension as the pattern area 39 of the mold structure, the pattern plungers 41, 41 being formed as one large plunger covering this entire unitary area.

Obviously the operating elements of the machine are subjected to considerable modification without departing from the essential features of the invention.

I claim:

1. A full automatic machine for making molded inlaid linoleum in a continuous strip consisting of a plurality of successively formed body units deposited on a continuous strip of base material, comprising a mold structure having a body-unit forming chamber formed therein; means for automatically lubricating the surfaces of the said body-unit forming chamber; means for automatically depositing granular material in said chamber; means for automatically introducing a portion of the continuous strip of base material to the granular material contained in said body-unit forming chamber; and means for effecting consolidation of said granular material and said base material to form a unit of the strip of finished linoleum.

2. A full automatic machine for making molded inlaid linoleum in a continuous strip consisting of a plurality of successively formed body units deposited on a continuous strip of base material, comprising a mold structure having a body-unit forming chamber formed therein; means for automatically lubricating the surfaces of the said body-unit forming chamber; means for automatically depositing granular material in said chamber; means for automatically distributing said granular material over the area of said body-unit forming chamber; means for automatically introducing a portion of the continuous strip of base material to the granular material contained in said body-unit forming chamber; and means for effecting consolidation of said granular material and said base material to form a unit of the strip of finished linoleum.

3. A full automatic machine for making molded inlaid linoleum in a continuous strip consisting of a plurality of successively formed body units deposited on a continuous strip of base material, comprising a mold structure having a body-unit forming chamber formed therein; means for automatically lubricating the surfaces of the said body-unit forming chamber; means for automatically depositing granular material in said chamber; means for partly consolidating the granular material contained in said chamber; means for introducing a portion of the continuous strip of base material to the partly consolidated granular material contained in said chamber; and means for effecting a final consolidation of said granular material and said base material to form a unit of the strip of finished linoleum.

4. A full automatic machine for making molded inlaid linoleum in a continuous strip consisting of a plurality of successively formed body units deposited on a continuous strip of base material, comprising a mold structure having a body-unit forming chamber formed therein; means for automatically lubricating the surfaces of the said body-unit forming chamber; means for automatically depositing granular material in said chamber; means for automatically distributing said granular material over the area of said body-unit forming chamber; means for partly consolidating the granular material contained in said chamber; means for introducing a portion of the continuous strip of base material to the partly consolidated granular material contained in said chamber; and means for effecting a final consolidation of said granular material and said base material to form a unit of the strip of finished linoleum.

5. A full automatic machine for making molded inlaid linoleum in a continuous strip consisting of a plurality of successively formed body units deposited on a continuous strip of base material, comprising a mold structure having a body-unit forming chamber formed therein; means for automatically depositing granular material in said chamber; means for partly consolidating the granular material contained in said chamber; means for introducing a portion of the continuous strip of base material to the partly consolidated granular material contained in said chamber; means for effecting a final consolidation of said granular material and said base material to form a unit of the strip of finished linoleum; and means for producing sharp edges on each successively deposited body unit, said edges extending substantially perpendicular to the plane of the base material.

6. A full automatic machine for making molded inlaid linoleum in a continuous strip consisting of a plurality of successively formed body units deposited on a continuous strip of base material, comprising a mold structure having a body-unit forming chamber formed therein; means for automatically depositing granular material in said chamber; means for partly consolidating the granular material contained in said chamber; means for introducing a portion of the continuous strip of base material to the partly consolidated granular material contained in said chamber; means for effecting a final consolidation of said granular material and said base material to form a unit of the strip of finished linoleum; means for moving the strip of base material relative to the final consolidating means in intermittent steps of predetermined lengths; and means for producing sharp edges on each successively deposited body unit, said edges extending substantially perpendicular to the plane of the base material.

7. A full automatic machine for making molded inlaid linoleum in a continuous strip consisting of a plurality of successively formed body units deposited on a continuous strip of base material, comprising a mold structure having a body-unit forming chamber formed therein; means for automatically depositing granular material in said chamber; means for partly consolidating the granular material contained in said chamber; means for introducing a portion of the continuous strip of base material to the partly consolidated granular material contained in said chamber; means for effecting a final consolidation of said granular material and said base material to form a unit of the strip of finished linoleum; means for moving the strip of base material relative to the final consolidating means in intermittent steps of predetermined lengths; means for producing sharp edges on each successively deposited body unit, said edges extending substantially perpendicular to the plane of the base material; and indexing means for controlling the position of said strip of base material at the end of each intermittent step thereof, to effect the registering of one edge of the last deposited body unit with a corresponding edge of the next successively deposited body unit.

8. A full automatic machine for making molded inlaid linoleum comprising a mold structure movable to a plurality of different positions within the machine; means for automatically depositing a loose mass of colored granular material in the mold at one of its various positions; means for depositing a second loose mass of differently colored granular material in the mold at another of its various positions; means for distributing the granular material over the mold structure; means for segregating the respectively different colored masses of granular materials in said mold; means for partly consolidating the segregated loose masses of granular material within the mold, at another of its various positions; means for introducing a base material to the partly consolidated masses of granular materials; means for effecting a final consolidation of the granular materials and the base material, at another of the various positions of the mold structure; and means for conveying said mold structure to and from its various positions in an endless circuitous path within the machine.

9. A full automatic machine for making molded inlaid linoleum comprising a mold structure movable to a plurality of different positions within the machine; means for automatically depositing a loose mass of colored granular material in the mold at one of its various positions; means for depositing a second loose mass of differently colored granular material in the mold at another of its various positions; means for distributing the granular material over the mold structure; means for segregating the respectively different colored masses of granular materials in said mold; means for partly consolidating the segregated loose masses of granular material within the mold, at another of its various positions; means for introducing a continuous web of base material to the partly consolidated masses of granular materials; means for effecting a final consolidation of the granular materials and the base material, at another of the various positions of the mold structure; means for conveying said mold structure to and from its various positions in an endless circuitous path within the machine; and means for feeding the said web of base material to and from the final consolidating position attained by said mold structure, simultaneously with the movement of the mold structure relative to the said final consolidating position.

10. A full automatic machine for making molded inlaid linoleum comprising a mold structure movable to a plurality of different positions within the machine; means for automatically depositing a loose mass of colored granular material in the mold at one of its various positions; means for depositing a second loose mass of differently colored granular material in the mold at another of its various positions; means for distributing the granular material over the mold structure; means for segregating the respectively different colored masses of granular materials in said mold; means for partly consolidating the segregated loose masses of granular material within the mold, at another of its various positions; means for introducing a continuous web of base material to the partly consolidated masses of granular materials; means for ejecting the partly consolidated and segregated masses of granular material from the mold structure to a position adjacent the web of base material; means for effecting a final consolidation of the granular materials and the base material, at another of the various positions of the mold structure; means for conveying said mold structure to and from its various positions in an endless circuitous path within the machine; and means for feeding the said web of base material to and from the final consolidating position attained by said mold structure, simultaneously with the movement of the mold structure relative to the said final consolidating position.

11. A full automatic machine for making molded inlaid linoleum comprising a mold structure movable to a plurality of different positions within the machine; means for automatically depositing a loose mass of colored granular material in the mold at one of its various positions; means for depositing a second loose mass of differently colored granular material in the mold at another of its various positions; means for distributing the granular material over the mold structure; means for segregating the respectively different colored masses of granular materials in said mold; means for partly consolidating the segregated loose masses of granular material within the mold, at another of its various positions; means for introducing a continuous web of base material to the partly consolidated masses of granular materials; means for ejecting the partly consolidated and segregated masses of granular material from the mold structure to a position adjacent the web of base material; means for confining the segregated and partly consolidated masses of granular materials within a definite area of and adjacent said base material; means for effecting a final consolidation of the granular materials and the base material, at another of the various positions of the mold structure;

means for conveying said mold structure to and from its various positions in an endless circuitous path within the machine; and means for feeding the said web of base material to and from the final consolidating position attained by said mold structure, simultaneously with the movement of the mold structure relative to the said final consolidating position.

12. In a machine for making molded inlaid linoleum, a mold structure comprising a rigid frame; a wall secured to said rigid frame and defining a chamber open at its top and adapted to have granular material dropped thereinto for the formation of a unit of the body portion of the linoleum; and a plunger mounted within said chamber and movable toward and from the summit of said wall, for regulating the amount of granular material to be contained within said chamber.

13. In a machine for making molded inlaid linoleum, a mold structure comprising a rigid frame having a pattern cavity formed in one face thereof; a wall within said pattern cavity and secured to said frame, defining a design area of one unit of the body portion of the linoleum; a series of interior walls within the limits of said unit defining wall, whereby said design area is sub-divided into a plurality of individual pattern forming chambers; a plunger in each pattern chamber adapted to be moved toward and away from the summit of the said pattern defining walls for the purposes set forth.

14. In a machine for making molded inlaid linoleum, a mold structure comprising a rigid frame having a pattern cavity formed in one face thereof; a wall within said pattern cavity and secured to said frame, defining a design area of one unit of the body portion of the linoleum; a series of interior walls within the limits of said unit defining wall, whereby said design area is subdivided into a plurality of individual pattern forming chambers; a plunger in each pattern chamber adapted to be moved toward and away from the summit of the said pattern defining walls for the purposes set forth; and border plungers mounted within said pattern cavity and surrounding the outer design unit defining wall, adapted to be moved with respect to said wall in a manner and for the purposes set forth.

15. In a machine for making molded inlaid linoleum, a mold structure comprising a rigid frame having a pattern cavity formed in one face thereof; a wall within said pattern cavity and secured to said frame, defining a design area of one unit of the body portion of the linoleum; a series of interior walls within the limits of said unit defining wall, whereby said design area is sub-divided into a plurality of individual pattern forming chambers; a plunger in each pattern chamber, adapted to be moved toward and away from the summit of the said pattern defining walls for the purposes set forth; and means within said rigid frame for resiliently maintaining said plungers at the bottoms of each pattern chambers.

16. In a machine for making molded inlaid linoleum, a mold structure comprising a rigid frame having a pattern cavity formed in one face thereof; a wall within said pattern cavity and secured to said frame, defining a design area of one unit of the body portion of the linoleum; a series of interior walls within the limits of said unit defining wall, whereby said design area is sub-divided into a plurality of individual pattern forming chambers; a plunger in each pattern chamber, adapted to be moved toward and away from the summit of the said pattern defining walls for the purposes set forth; a pattern plunger operating frame slidably mounted in said rigid frame; means for operatively connecting said pattern plungers and said operating frame; and means for resiliently maintaining said plungers at the bottoms of said pattern chambers.

17. In a machine for making molded inlaid linoleum, a mold structure comprising a rigid frame having a pattern cavity formed in one face thereof; a wall within said pattern cavity and secured to said frame, defining a design area of one unit of the body portion of the linoleum; a series of interior walls within the limits of said unit defining wall, whereby said design area is sub-divided into a plurality of individual pattern forming chambers; a plunger in each pattern chamber, adapted to be moved toward and away from the summit of the said pattern defining walls for the purposes set forth; a pattern plunger operating frame slidably mounted in said rigid frame; means for operatively connecting said pattern plungers and said operating frame; means intermediate said rigid mold frame and said plunger operating frame for moving said pattern plungers toward the bottoms of their respective pattern chambers; and means on said rigid mold frame adapted to engage said pattern plunger operating frame for maintaining said pattern plungers in positions intermediate the bottoms of their respective pattern chambers and the summit of the pattern walls.

18. In a machine for making molded inlaid linoleum, a mold structure comprising a rigid frame having a pattern cavity formed in one face thereof; a wall within said pattern cavity and secured to said frame, defining a design area of one unit of the body portion of the linoleum; a series of interior walls within the limits of said unit defining wall, whereby said design area is sub-divided into a plurality of individual pattern forming chambers; a plunger in each pattern chamber, adapted to be moved toward and away from the summit of the said pattern defining walls for the purposes set forth; border plungers mounted within said pattern cavity, surrounding the outer design area defining wall, adapted to be moved with respect to said wall in a manner and for the purposes set forth; means within said rigid frame for resiliently maintaining said pattern plungers at the bottoms of said pattern chambers; and means for normally and resiliently maintaining each of said border plungers in definite relationship with respect to the summit of said design area defining wall.

19. In a machine for making molded inlaid linoleum, a mold structure comprising a rigid frame having pattern chambers formed therein; key blocks slidably mounted in said rigid frame; resilient means for moving the key blocks in one direction on the frame; means for limiting the said movement of the key blocks relative to the frame; and keys on the key blocks, adapted to be engaged by a mold propelling means, a mold elevating means, and a mold guide track throughout the different stages of operation of the machine.

20. In a machine for making molded inlaid linoleum, the combination of a mold structure; a wall on said mold structure defining a chamber adapted to form a unit of the body portion of said linoleum, said chamber being open at its top; means for automatically dropping granular material into said unit forming chamber; a plunger within said chamber; and means for moving said plunger within said chamber to regulate the capacity of said chamber.

21. In a machine for making molded inlaid linoleum, the combination of a mold structure; a wall on said mold structure defining a chamber adapted to form a unit of the body portion of said linoleum; means for automatically feeding granular material to said unit forming chamber; a plunger within said chamber; means for moving said plunger within said chamber to regulate the capacity of said chamber; and means for distributing the granular material over the area defined by said wall.

22. In a machine for making molded inlaid linoleum, the combination of a mold structure, having pattern chambers formed therein, said chambers being open at their tops; pattern walls separating said chambers; means for automatically dropping granular material into said pattern chambers; and means for variably regulating the capacity of said chambers.

23. In a machine for making molded inlaid linoleum, the combination of a mold structure, having pattern chambers formed therein; pattern walls separating said chambers; means for automatically feeding granular material to said pattern chambers; and means for sealing some of said chambers while other chambers receive their supply of granular material.

24. In a machine for making molded inlaid linoleum, the combination of a mold structure, having pattern chambers formed therein; pattern walls separating said chambers; means for automatically feeding granular material to said pattern chambers; a stencil plate intermediate said mold structure and said granular material feeding means adapted to close certain of said pattern chambers and having apertures registering with certain others of said pattern chambers; and means for automatically distributing said granular material over said stencil plate.

25. In a machine for making molded inlaid linoleum, the combination of a mold structure, having pattern chambers formed therein; pattern walls separating said chambers; means for automatically feeding granular material to said pattern chambers; a stencil plate intermediate said mold structure and said granular material feeding means and having apertures registering with certain of said pattern chambers; means for automatically distributing said granular material over said stencil plate; and means for raising said mold structure to a position wherein the pattern walls engage the under side of said stencil plate, for effecting the sealing of the pattern chambers not registering with the apertures in said stencil plate.

26. In a machine for making molded inlaid linoleum, the combination of a mold structure having pattern chambers formed therein; means for feeding granular material to said mold structure pattern chambers comprising a hopper; material agitating means in said hopper; a movable bottom closure for said hopper; means for operating said material agitating means; and means for operating said movable bottom closure to permit the granular material to pass to said mold structures.

27. In a machine for making molded inlaid linoleum, the combination of a mold structure having pattern chambers formed therein; means for feeding granular material to said mold structure pattern chambers comprising a hopper; a grate in said hopper comprising a series of fixed grate bars alternating with the respective bars of a series of reciprocating grate bars; grooves formed in the opposite sides of each bar; means for moving one series of bars relative to the other series whereby the grooves of each series register with the grooves of the other series to form passageways for said granular material to pass through the grate to the mold structure; a movable bottom closure for said hopper; means for operating the reciprocating grate bars; and means for operating the movable closure to permit the granular material to pass to said mold structure.

28. In a machine for making molded inlaid linoleum, the combination of a mold structure having pattern chambers formed therein; means for feeding granular material to said mold structure pattern chambers comprising a hopper; a grate in said hopper comprising a series of fixed grate bars alternating with the respective bars of a series of reciprocating grate bars; grooves formed in the opposite sides of each bar; means for moving one series of bars relative to the other series whereby the grooves of each series register with the grooves of the other series to form passageways for said granular material to pass through the grate to the mold structure; harrow teeth on said grate bars extending into the material in said hopper for the breaking of lumps of material in the hopper; a movable bottom closure for said hopper; means for operating the reciprocating grate bars; and means for operating the movable closure to permit the granular material to pass to said mold structure.

29. In a machine for making molded inlaid linoleum, the combination of a mold structure having pattern chambers formed therein; means for feeding granular material to said mold structure pattern chambers comprising a hopper; material agitating means in said hopper; a movable bottom closure for said hopper comprising a series of trap doors movable to open and closed positions; resilient means for moving the trap doors to one position; positive acting means for moving the trap doors to the other position for controlling the flow of granular material to said mold structure; and means for operating the material agitating means in the hopper.

30. In a machine for making molded inlaid linoleum, the combination of a mold structure having pattern chambers formed therein; a hopper containing granular material located above said mold structure; a movable bottom closure for said hopper; a stencil plate intermediate said hopper and said mold structure having apertures registering with certain of said pattern chambers; means for elevating said mold structure into engagement with said stencil plate to seal the pattern chambers not registering with stencil plate apertures; means movable over said stencil plate to remove foreign matter from said registering pattern chambers; means for operating the movable bottom closure of said hopper to permit granular material to fall therefrom onto said stencil plate; means adjacent said stencil plate for distributing said granular material over said stencil plate, thereby filling said registering pattern chambers; and means for removing the surplus granular material from said stencil plate.

31. In a machine for making molded inlaid linoleum, the combination of a mold structure having pattern chambers formed therein; a hopper containing granular material located above said mold structure; a movable bottom closure for said hopper; a stencil plate intermediate said hopper and said mold structure having apertures registering with certain of said pattern chambers; means for elevating said mold structure into engagement with said stencil plate to seal the pattern chambers not registering with stencil plate apertures; means movable over said stencil plate to remove foreign matter from said registering pattern chambers; means for operating the movable bottom closure of said hopper to permit granular material to fall therefrom onto said stencil plate; means adjacent said stencil plate for distributing said granular material over said stencil plate, thereby filling said registering pattern chambers; means for removing the surplus granular material from said stencil plate; and means for raising and lowering said distributing means relative to said stencil plate, to permit the mold chamber cleansing and surplus granular material removing means to function.

32. In a machine for making molded inlaid linoleum, the combination of a mold structure having pattern chambers formed therein; a hopper containing granular material located above said mold structure; a movable bottom closure for said hopper; a stencil plate intermediate said hopper and said mold structure having apertures registering with certain of said pattern chambers; means for elevating said mold structure into engagement with said stencil plate to seal the pattern chambers not registering with stencil plate apertures; means movable over said stencil plate to remove foreign matter from said registering pattern chambers; means for operating the movable bottom closure of said hopper to permit granular material to fall therefrom onto said stencil plate; means adjacent said stencil plate for distributing said granular material over said stencil plate, thereby filling said registering pattern chambers; means for removing the surplus granular material from said stencil plate; means for raising and lowering said distributing means relative to said stencil plate, to permit the mold chamber cleansing and surplus granular material removing means to function; and means for returning the said surplus granular material to the hopper.

33. In a machine for making molded inlaid linoleum, the combination of a mold structure having suitably shaped pattern chambers formed therein, a stencil plate above said mold structure having apertures formed therein which correspond in shape to, and are adapted to register with, certain of the pattern chambers of the mold structure; and means for raising the mold structure into contact with the stencil plate to effectively seal the pattern chambers which are not in registry with the openings in the stencil plate.

34. In a machine for making molded inlaid linoleum, the combination of a mold structure having suitably shaped pattern chambers formed therein, a stencil plate above said mold structure having apertures formed therein which corresponds in shape to, and are adapted to register with, certain of the pattern chambers of the mold structure; means for raising the mold structure into contact with the stencil plate to effectively seal the pattern chambers which are not in registry with the openings in the stencil plate; a carrying plate for removably supporting said stencil plate above said mold structure; and a supporting platform for removably supporting said stencil plate carrier.

35. In a machine for making molded inlaid linoleum, the combination of a mold structure having suitably shaped pattern chambers formed therein, a stencil plate above said mold structure having apertures formed therein which correspond in shape to, and are adapted to register with, certain of the pattern chambers of the mold structure; means for raising the mold structure into contact with the stencil plate to effectively seal the pattern chambers which are not in registry with the openings in the stencil plate; a vacuum nozzle over said stencil plate to remove foreign matter from the registering pattern chambers; and means for feeding granular material to the stencil plate and the registering mold pattern chambers.

36. In a machine for making molded inlaid linoleum, the combination of a mold structure having suitably shaped pattern chambers formed therein, a stencil plate above said mold structure having apertures formed therein which correspond in shape to, and are adapted to register with, certain of the pattern chambers of the mold structure; means for raising the mold structure into contact with the stencil plate to effectively seal the pattern chambers which are not in registry with the openings in the stencil plate; a sweeper head adapted to be reciprocated over the upper surface of said stencil plate; a vacuum nozzle formed in said sweeper head; means for feeding granular material to the upper surface of the stencil plate and the pattern chambers registering with the apertures formed therein; means for reciprocating said sweeper head; means for applying suction to said vacuum nozzle on one stroke of the reciprocating movement of the sweeper head, for removing foreign material from the registering pattern chambers, before the granular material is fed thereto, said sweeper head on the other stroke of its reciprocatory movement, with no suction applied to the vacuum nozzle thereof, removing the surplus granular material remaining on the said stencil plate, after the registering pattern chambers of the mold structure have been filled.

37. In a machine for making molded inlaid linoleum, the combination of a mold structure; a stencil plate over the mold structure; means for feeding granular material to the stencil plate and the mold structure, located above the stencil plate; and a gyrating distributing grid operable adjacent the upper surface of said stencil plate.

38. In a machine for making molded inlaid linoleum, the combination of a mold structure; a stencil plate over the mold structure; means for feeding granular material to the stencil plate and the mold structure, located above the stencil plate; a gyrating distributing grid operable adjacent the upper surface of said stencil plate; a sweeper head movable over, and operable adjacent to, the upper surface of the stencil plate; and means for raising and lowering the distributing grid to permit the sweeper head to reciprocate thereunder.

39. In a machine for making molded inlaid linoleum, the combination of a mold structure; a stencil plate over the mold structure; means for feeding granular material to the stencil plate and the mold structure, located above the stencil plate; a gyrating distributing grid operable adjacent the upper surface of said stencil plate; a sweeper head movable over, and operable adjacent to, the upper surface of the stencil plate; a telescoping feed chute having one section rigidly secured to the said feeding means; means for raising and lowering the distributing grid to permit actuation of the said sweeper head; and a second movable section of the telescoping feed chute secured to the grid raising and lowering means, having one end immediately adjacent the upper surface of the distributing grid and its opposite end slidably cooperating with the rigidly secured section of said chute.

40. In a machine for making molded inlaid linoleum, the combination of a frame; a mold structure carried in said frame; a hopper containing granular material, carried by said frame above said mold structure; a movable bottom closure in said hopper; a stencil plate on said frame intermediate the mold structure and the hopper; a mold elevating platform operable in said frame for raising the mold structure into contact with the stencil plate; an operating shaft rotatably mounted in the frame; a cam on the shaft for operating the mold elevating platform; and a cam on said shaft for operating the movable bottom closure of the hopper.

41. In a machine for making molded inlaid linoleum, the combination of a frame; a mold structure carried in said frame; a hopper containing granular material, carried by said frame above said mold structure; material agitating means in said hopper; a movable bottom closure in said hopper; a stencil plate on said frame intermediate the mold structure and the hopper; a mold elevating platform operable in said frame for raising the mold structure into contact with the stencil plate; a gyrating material distributing grid operable over said stencil plate; an operating shaft rotatably mounted in the frame; a cam on the shaft for operating the mold elevating platform; and a cam on said shaft for operating the movable bottom closure of the hopper.

42. In a machine for making molded inlaid linoleum, the combination of a frame; a mold structure carried in said frame; a hopper containing granular material, carried by said frame above said mold structure; material agitating means in said hopper; a movable bottom closure in said hopper; a stencil plate on said frame intermediate the mold structure and the hopper; a mold elevating platform; and a cam on said frame for raising the mold structure into contact with the stencil plate; a gyrating material distributing grid operable over said stencil plate; a sweeper head operable over said stencil plate; an operating shaft rotatably mounted in the frame; a cam on said shaft for reciprocating said sweeper head over said stencil plate; a cam on said shaft for raising and lowering the distributing grid in time with the reciprocation of said sweeper head; a cam on the shaft for operating the mold elevating platform; a cam on said shaft for operating the movable bottom closure of the hopper; and means independent of said operating shaft, for continuously operating the material agitating means and for continuously effecting gyration of the distributing grid.

43. In a machine for making molded inlaid linoleum, the combination of a mold structure having pattern chambers formed therein; means for conveying the mold structure through the machine; means for automatically lubricating the pattern chambers of the mold structure as it passes a given point on the machine.

44. In a machine for making molded inlaid linoleum, the combination of a mold structure having pattern chambers formed therein; means for conveying the mold structure through the machine; means for automatically lubricating the pattern chambers of the mold structure as it passes a given point on the machine, comprising a lubricant reservoir secured to the frame of the machine; lubricant conveying tubes extending from the reservoir to points immediately adjacent the plane of movement of said pattern chambers; air ducts surrounding the delivery ends of the lubricant tubes and constituting lubricant spray jets; means for supplying air under pressure to said air ducts for spraying the lubricant into the pattern chamber of the mold structure; and means for controlling the supply of air to said air ducts operable by the mold structure as it passes the lubricant spray jets.

45. In a machine for making molded inlaid linoleum, the combination of a mold structure having pattern chambers formed therein; means for conveying the mold structure through the machine; means for automatically lubricating the pattern chambers of the mold structure as it passes a given point on the machine, comprising a lubricant containing reservoir, lubricant conveying tubes, each having one end located within the reservoir adjacent the lowest portion thereof, and the opposite end extending through the wall of the reservoir to a point adjacent the plane of movement of the mold structure; an air duct surrounding each lubricant duct having one end secured to the wall of the reservoir and communicating with the interior thereof, the opposite end extending beyond the outer end of the lubricant duct and having a contracted orifice therein; means for supplying air under pressure to the highest portion of the reservoir; a valve for controlling the supply of air to the reservoir; and means on the mold structure for operating the air valve as the mold structure passes the spray jets formed by the cooperating outer ends of the air and lubricant conveying ducts.

46. In a machine for making molded inlaid linoleum; the combination of a mold structure having pattern chambers formed therein; pattern plungers operable in said pattern chambers; border plungers operable around the pattern chambers; means for depositing granular materials in the said chambers; a squeeze platen rigidly mounted above a position adapted to be occupied by the mold structure; and means located below the said position adapted to be occupied by the mold structure for elevating the pattern plungers in their respective chambers, whereby the granular material is consolidated between the squeeze platen and said pattern plungers.

47. In a machine for making molded inlaid linoleum; the combination of a mold structure having pattern chambers formed therein; pattern plungers operable in said pattern chambers; border plungers operable around the pattern chambers; means for depositing granular materials in the said chambers; a squeeze platen rigidly mounted above a position adapted to be occupied by the mold structure; means located below the said position adapted to be occupied by the mold structure for elevating the pattern plungers in their respective chambers, whereby the granular material is consolidated between the squeeze platen and said pattern plungers; and means on said mold structure for maintaining the pattern plungers; and means on taining the pattern plungers in their elevated positions in their respective pattern chambers.

48. In a machine for making molded inlaid linoleum; the combination of a mold structure having pattern chambers formed therein; pattern plungers operable in said pattern chambers; border plungers operable around the pattern chambers; means for depositing granular materials in the said chambers; a squeeze platen rigidly mounted above a position adapted to be occupied by the mold structure; means located below the said position adapted to be occupied by the mold structure for elevating the pattern plungers in their respective chambers, whereby the granular material is consolidated between the squeeze platen and said pattern plungers; and means below said mold structures for elevating the border plungers into contact with the surface of the squeeze platen.

49. In a machine for making molded inlaid linoleum, the combination of a frame, a mold structure carried by said frame and having pattern chambers formed therein; pattern plungers operable in said pattern chambers; border plungers operable in said mold structure around said pattern chambers; means for depositing granular material in said mold structure pattern chambers; a squeeze platen rigidly mounted on said frame above a position adapted to be occupied by said mold structure; a cross head slidably mounted in said frame below said position adapted to be occupied by said mold structure; means on said cross head for operating the plungers in said mold structure; and means for raising and lowering said cross head.

50. In a machine for making molded inlaid linoleum, the combination of a frame; a mold structure carried in said frame and having pattern chambers formed therein; pattern plungers in said chambers; means operable in said frame for conveying the mold structure through the machine; means for depositing granular material in said chambers; a squeeze platen rigidly mounted on said frame above a position adapted to be occupied by said mold structure; a cross head slidably mounted in said frame below said position adapted to be occupied by said mold structure; means on said cross head for operating the plungers in said mold structure; means on said cross head for disengaging the mold structure from the mold conveying means; and means for raising and lowering said cross head.

51. In a machine for making molded inlaid linoleum, the combination of a frame; a mold structure carried in said frame and having pattern chambers formed therein; pattern plungers in said chambers; means operable in said frame for conveying the mold structure through the machine; means for depositing granular material in said chambers; a squeeze platen rigidly mounted on said frame above a position adapted to be occupied by said mold structure; a cross head slidably mounted in said frame below said position adapted to be occupied by said mold structure; means on said cross head for operating the plungers in said mold structure; means on said cross head for disengaging the mold structure from the mold conveying means; means for raising and lowering said cross head; an operating shaft rotatably mounted in said frame; and a cam on said shaft for controlling the operation of the cross head operating means.

52. In a machine for making molded inlaid linoleum, the combination of a frame; a mold structure carried in said frame and having pattern chambers formed therein; pattern plungers in said chambers; means operable in said frame for conveying the mold structure through the machine; means for depositing granular material in said chambers; a squeeze platen rigidly mounted on said frame above a position adapted to be occupied by said mold structure; a cross head slidably mounted in said frame below said position adapted to be occupied by said mold structure; means on said cross head for operating the plungers in said mold structure; means on said cross head for disengaging the mold structure from the mold conveying means; a cylinder secured to the frame; an operating plunger in said cylinder, operatively connected to said cross head; a valve for controlling admission and exhaust of motive fluid to and from said cylinder; an operating shaft rotatably mounted in said frame; and a cam on said shaft for controlling the operation of said valve.

53. In a machine for making molded inlaid linoleum, the combination of a frame; a mold structure carried in said frame and having pattern chambers formed therein; pattern plungers in said chambers; means operable in said frame for conveying the mold structure through the machine; means for depositing granular material in said chambers; a squeeze platen rigidly mounted on said frame above a position adapted to be occupied by said mold structure; a cross head slidably mounted in said frame below said position adapted to be occupied by said mold structure; means on said cross head for operating the plungers in said mold structure; means on said cross head for disengaging the mold structure from the mold conveying means; a cylinder secured to the frame; an operating plunger in said cylinder, operatively connected to said cross head; a valve for controlling admission and exhaust of motive fluid to and from said cylinder; an operating shaft rotatably mounted in said frame; a cam on said shaft for moving the valve from a neutral position in its casing to a plunger operating position therein; and means operatively connecting the valve and the plunger, whereby the plunger upon attaining a predetermined position in the cylinder will return the valve to its neutral position in the casing.

54. In a machine for making molded inlaid linoleum, the combination of a frame; a mold structure carried in said frame and having pattern chambers formed therein; pattern plungers in said chambers; means operable in said frame for conveying the mold structure through the machine; means for depositing granular material in said chambers; a squeeze platen rigidly mounted on said frame above a position adapted to be occupied by said mold structure; a cross head slidably mounted in said frame below said position adapted to be occupied by said mold structure; means on said cross head for operating the plungers in said mold structure; means on said cross head for disengaging the mold structure from the mold conveying means; a cylinder secured to the frame; an operating plunger in said cylinder, operatively connected to said cross head; a valve for controlling admission and exhaust of motive fluid to and from said cylinder; an operating shaft rotatably mounted in said frame; a cam on said shaft for moving the valve from a neutral position in its casing to a plunger operating position therein; and link and lever mechanism operatively connecting the valve and the plunger, whereby the plunger upon attaining a predetermined position in the cylinder will return the valve to its neutral position in the casing.

55. In a machine for making molded inlaid linoleum, the combination of a mold structure having granular material contained therein; a squeeze platen; means in said mold structure for pressing the granular material against said squeeze platen; a squeeze plunger for effecting the squeezing operation, operably mounted in a relatively fixed cylinder; a valve controlling the admission and exhaust of motive fluid to and from the cylinder, and operable in a relatively fixed valve casing; a rotatable shaft; a cam on the shaft; a lever having a fixed pivot; a roller rotatably mounted on the free end of the lever and engaging the cam; a floating lever having one end operatively connected to the valve and its opposite end operatively connected to the cam roller pivot; a link having one end connected to the floating lever intermediate the opposite ends thereof and the opposite end of said link operatively connected to the said squeeze plunger, whereby movement of the valve by the cam from a neutral position to a plunger operating position will effect operation of the plunger, which through the operation of the link and floating lever will return the valve to its neutral position when the plunger attains a predetermined position in the cylinder.

56. In a machine for making molded inlaid linoleum, the combination of a frame; a shaft rotatably mounted in said frame; a cam on the shaft; an operating plunger reciprocally mounted in a relatively fixed cylinder; a valve for controlling the flow of motive fluid to and from the cylinder, operatively mounted in a relatively fixed casing, and movable thereon from a neutral position to a plunger operating position; a double ended lever having a pivot pin at one of its ends operatively connected to the valve, a pivot pin at its opposite end under control of and adapted to be moved to various positions by the cam, and a pivot pin intermediate the two end pivots, under control of and operatively connected to the operating plunger, for movement thereby to various positions, whereby rotation of the cam will rock the double ended lever around its intermediate plunger controlled pivot to move the valve to a plunger operating position in its casing and consequent operation of the plunger will rock the double ended lever around its cam controlled pivot to return the valve to the neutral position in its casing and thereby arrest the plunger in its movement within its cylinder.

57. In a machine for making molded inlaid linoleum, the combination of a frame; a shaft rotatably mounted in the frame; mold structures movably mounted in the frame and adapted to receive granular material; operating means for effecting traversing movement of the mold structure longitudinally of the machine frame; operating means for effecting transferring movements of the mold structures laterally of the machine frame; squeeze platens cooperating with the mold structures; operating means for effecting squeezing operations of the granular materials within the mold structures, between the elements of the mold structures and the squeeze platens; each of said operating means comprising a cam on the shaft; an operating plunger reciprocally mounted in a relatively fixed cylinder; a valve for controlling the flow of motive fluid to and from the cylinder, operatively mounted in a relatively fixed casing, and movable thereon from a neutral position to a plunger operating position; a double ended lever having a pivot pin at one of its ends operatively connected to the valve, a pivot pin at its opposite end under control of and adapted to be moved to various positions by the cam, and a pivot pin intermediate the two end pivots, under control of and operatively connected to the operating plunger, for movement thereby to various positions, whereby rotation of the cam will rock the double ended lever around its intermediate plunger controlled pivot to move the valve to a plunger operating position in its casing and consequent operation of the plunger will rock the double ended lever around its cam controlled pivot to return the valve to the neutral position in its casing and thereby arrest the plunger in its movement within its cylinder.

58. In a machine for making molded inlaid linoleum, the combination of a squeeze platen; a lubricating pad adapted to engage the operating face of said squeeze platen; a carrier for said lubricating pad; a bed for supporting said carrier; means for reciprocating said bed relative to said squeeze platen; and means for raising and lowering said carrier in said bed, whereby the lubricating pad is brought into engagement with and removed from the operating face of said squeeze platen.

59. In a machine for making molded inlaid linoleum, the combination of a frame; a shaft rotatably mounted in said frame; a squeeze platen carried by said frame; a lubricating pad adapted to engage the operating face of said squeeze platen; a reciprocating bed for carrying said pad across the operating face of said platen; a carrier for said pad vertically movable in said bed; cam bars slidably mounted in said bed and engaging said carrier; abutments on said frame for engaging said cam bars, whereby said carrier is raised and lowered when the bed is reciprocated; and means on said shaft for reciprocating said bed.

60. In a machine for making molded inlaid linoleum, the combination of a frame; a mold structure carried in said frame and having a pattern chamber formed therein; a pattern wall around said chamber; a pattern plunger movably mounted in said chamber; means for depositing granular material in said chamber; an upper squeeze platen carried by the frame above a position adapted to be occupied by the mold structure; means for moving the pattern plunger in the pattern chamber to a position wherein its upper surface lies in a plane coincident with that of the summit of the pattern wall to form a lower platen surface; and means for effecting a squeezing of the granular material between the upper and lower platen surfaces.

61. In a machine for making molded inlaid linoleum, the combination of a frame; a mold structure carried in said frame and having a pattern chamber formed therein; a pattern wall around said chamber; a pattern plunger movably mounted in said chamber; means for depositing granular material in said chamber; an upper squeeze platen carried by the frame above a position adapted to be occupied by the mold structure; means for lowering the upper squeeze platen to a plane immediately adjacent that of the summit of the wall of the pattern chamber; means for moving the pattern plunger in the pattern chamber to a position wherein its upper surface lies in a plane coincident with that of the summit of the pattern wall to form a lower platen surface; means for raising the upper platen in synchronism with the upward movement of the pattern plunger; and means for effecting a squeezing of the granular material between the upper and lower platen surfaces by again lowering the upper platen as the lower platen remains quiescent.

62. In a machine for making molded inlaid linoleum, the combination of a frame; a shaft rotatably mounted in said frame; a mold structure carried in said frame and having a pattern chamber formed therein; a pattern wall around said chamber; a pattern plunger movably mounted in said chamber; means for depositing granular material in said chamber; an upper squeeze platen carried by the frame above a position adapted to be occupied by the mold structure; means for moving the pattern plunger in the pattern chamber to a position wherein its upper surface lies in a plane coincident with that of the summit of the pattern wall to form a lower platen surface, comprising a vertically movable platform, a toggle between said platform and said frame, and means on said shaft for operating said toggle; and means for lowering said upper platen to effect a squeezing of said granular material between the upper and lower platens.

63. In a machine for making molded inlaid linoleum, the combination of a frame; a mold structure carried in said frame and having a pattern chamber formed therein; a pattern wall around said chamber; a pattern plunger movably mounted in said chamber; means for depositing granular material in said chamber; an upper squeeze platen carried by the frame above a position adapted to be occupied by the mold structure; means for moving the pattern plunger in the pattern chamber to a position wherein its upper surface lies in a plane coincident with that of the summit of the pattern wall to form a lower platen surface; means for effecting a squeezing of the granular material between the upper and lower platen surfaces, comprising a cylinder; a plunger in said cylinder; means operatively connecting said plunger with said upper platen; and means for admitting motive fluid into one end of said cylinder to move said upper platen toward said lower platen.

64. In a machine for making molded inlaid linoleum, the combination of a frame; a shaft rotatably mounted in said frame; a mold structure carried in said frame and having a pattern chamber formed therein; a pattern wall around said chamber; a pattern plunger movably mounted in said chamber; means for depositing granular material in said chamber; an upper squeeze platen carried by the frame above a position adapted to be occupied by the mold structure; means for moving the pattern plunger in the pattern chamber to a position wherein its upper surface lies in a plane coincident with that of the summit of the pattern wall to form a lower platen surface; and means for effecting a squeezing of the granular material between the upper and lower platen surfaces, comprising a cylinder; a plunger in said cylinder; means operatively connecting said plunger with said upper platen; a valve for admitting motive fluid to said cylinder to move said upper platen toward lower platen; and a cam on said shaft for controlling the operation of said valve.

65. In a machine for making molded inlaid linoleum, the combination of a frame; a shaft rotatably mounted in said frame; a mold structure carried in said frame and having a pattern chamber formed therein; a pattern wall around said chamber; a pattern plunger movably mounted in said chamber; means for depositing granular material in said chamber; an upper squeeze platen carried by the frame above a position adapted to be occupied by the mold structure; means for moving the pattern plunger in the pattern chamber to a position wherein its upper surface lies in a plane coincident with that of the summit of the pattern wall to form a lower platen surface; and means for effecting a squeezing of the granular material between the upper and lower platen surfaces, comprising a cylinder; a plunger in said cylinder; a toggle intermediate said upper platen and said frame; a lever associated with said toggle for the operation thereof; a link connecting said plunger with said toggle operating lever; a valve for admitting motive fluid to said plunger cylinder; and a cam on said shaft for controlling the operation of said valve.

66. In a machine for making molded inlaid linoleum, the combination of a frame; a shaft rotatably mounted in said frame; a mold structure carried in said frame and having a pattern chamber formed therein; a pattern wall around said chamber; a pattern plunger movably mounted in said chamber; means for depositing granular material in said chamber; an upper squeeze platen carried by the frame above a position adapted to be occupied by the mold structure; means for moving the pattern plunger in the pattern chamber to a position wherein its upper surface lies in a plane coincident with that of the summit of the pattern wall to form a lower platen surface; and means for effecting a squeezing of the granular material between the upper and lower platen surfaces, comprising a cylinder; a plunger in said cylinder; a toggle intermediate said upper platen and said frame; a lever associated with said toggle for the operation thereof; a link connecting said plunger with said toggle operating lever; a valve for admitting motive fluid to said plunger cylinder; a cam on said shaft for moving said valve from a neutral position to a plunger operating position; and means connecting said plunger and said valve for returning the valve to the neutral position when the plunger attains a predetermined position in the cylinder.

67. In a machine for making molded inlaid linoleum, the combination of a frame; a mold structure carried in said frame and having a pattern chamber formed therein; a pattern wall around said pattern chamber; means for depositing granular material in said pattern chamber; a pattern plunger in said chamber; an upper squeeze platen movably mounted in said frame over a position adapted to be occupied by said mold structure; means for supporting a web of base material between said upper platen and granular material in said mold structure; means for moving the pattern plunger in said pattern chamber to a position wherein its upper surface occupies a plane coincident with that of the summit of the pattern walls, to form a lower squeeze platen surface; and means for effecting a squeezing action on the said granular material and said base material, between the said upper and lower platen surfaces.

68. In a machine for making molded inlaid linoleum, the combination of a frame; a mold structure carried in said frame and having a pattern chamber formed therein; a pattern wall around said pattern chamber; means for depositing granular material in said pattern chamber; a pattern plunger in said chamber; an upper squeeze platen movably mounted in said frame over a position adapted to be occupied by said mold structure, means for supporting a web of base material between said upper platen and granular material in said mold structure;

means for moving the pattern plunger in said pattern chamber to a position wherein its upper surface occupies a plane coincident with that of the summit of the pattern walls, to form a lower squeeze platen surface; means for effecting a squeezing action on the said granular material and said base material, between the said upper and lower platen surfaces; means for moving the mold structure from under the squeeze platen after the squeezing action has been effected; and means for moving the base material a predetermined distance simultaneously with the movement of the mold structure.

69. In a machine for making molded inlaid linoleum, the combination of a frame; a mold structure carried in said frame and having a pattern chamber formed therein; a pattern wall around said pattern chamber; means for depositing granular material in said pattern chamber; a pattern plunger in said chamber; an upper squeeze platen movably mounted in said frame over a position adapted to be occupied by said mold structure; means for supporting a web of base material between said upper platen and granular material in said mold structure; means for moving the pattern plunger in said pattern chamber to a position wherein its upper surface occupies a plane coincident with that of the summit of the pattern walls, to form a lower squeeze platen surface; means for effecting a squeezing action on the said granular material and said base material, between the said upper and lower platen surfaces; means for moving the mold structure from under the squeeze platen after the squeezing action has been effected; means for moving the base material a predetermined distance simultaneously with the movement of the mold structure; and means for returning the pattern plunger to the bottom of the pattern chamber after the squeezing action has been effected.

70. In a machine for making molded inlaid linoleum, the combination of a frame; a mold structure carried in said frame and having a pattern chamber formed therein; a pattern wall around said pattern chamber; border plungers surrounding said pattern wall; means for depositing granular material in said pattern chamber; a pattern plunger in said chamber; an upper squeeze platen movably mounted on said frame over a position adapted to be occupied by said mold structure; means for supporting a web of base material between said upper platen and granular material in said mold structure; means for moving the pattern plunger in said pattern chamber to a position wherein its upper surface occupies a plane coincident with that of the summit of the pattern walls, to form a lower squeeze platen surface; means for raising the border plungers into engagement with the base material and the last formed section of finished linoleum; means for effecting a squeezing action on the said granular material and said base material, between the said upper and lower platen surfaces; means for moving the mold structure from under the squeeze platen after the squeezing action has been effected; means for moving the base material a predetermined distance simultaneously with the movement of the mold structure; and means for returning the pattern plunger to the bottom of the pattern chamber after the squeezing action has been effected.

71. In a machine for making molded inlaid linoleum, the combination of a frame; a mold structure carried in said frame and having a pattern chamber formed therein; a pattern wall around said pattern chamber; means for depositing granular material in said pattern chamber; a pattern plunger in said chamber; an upper squeeze platen movably mounted on said frame over a position adapted to be occupied by said mold structure; means for supporting a web of base material between said upper platen and granular material in said mold structure; means for moving the pattern plunger in said pattern chamber to a position wherein its upper surface occupies a plane coincident with that of the summit of the pattern walls, to form a lower squeeze platen surface; means for effecting a squeezing action on the said granular material and said base material, between the said upper and lower platen surface; means for moving the mold structure from under the squeeze platen after the squeezing action has been effected; and means on said pattern plunger operating means for respectively disengaging and re-engaging the mold structure from and with the mold structure moving means, before and after the effecting of the squeezing operation respectively.

72. In a machine for making molded inlaid linoleum, the combination of a frame; a mold structure carried in said frame; a squeeze platen; a carrier for said squeeze platen movably mounted in said frame in a plane perpendicular to that of said mold structure; and means on said platen carrier for supporting a web of base material between said platen and said mold structure.

73. In a machine for making molded inlaid linoleum, the combination of a frame; a mold structure carried in said frame; a squeeze platen above a position adapted to be occupied by said mold structure; a carrier for said squeeze platen slidably mounted in said frame; a roll of base material rotatably mounted in the frame; a roller at each side of said platen, secured to shafts carried by brackets on said platen carrier, for supporting the web of said base material between the platen and the mold structure; a feed ratchet wheel and an index wheel secured to the shaft of one of said supporting rollers; an oscillating pawl for engaging said ratchet wheel and feeding the web of base material under the platen in intermittent steps of predetermined length; and a pawl adapted to engage the index wheel to hold said web taut across said platen.

74. In a machine for making molded inlaid linoleum, the combination of a frame; a mold structure carried in said frame; a squeeze platen above a position adapted to be occupied by said mold structure; a carrier for said squeeze platen slidably mounted in said frame; a roll of base material rotatably mounted in the frame; a roller at each side of said platen, secured to shafts carried by brackets on said platen carrier, for supporting the web of said base material between the platen and the mold structure; a feed ratchet wheel and an index wheel secured to the shaft of one of said supporting rollers; an oscillating pawl for engaging said ratchet wheel and feeding the web of base material under the platen in intermittent steps of predetermined length; a pawl adapted to engage the index wheel to hold said web taut across said platen; and means for resisting the rotation of said roll of base material as the web thereof is fed forward.

75. In a machine for making molded inlaid linoleum, the combination of a frame; a mold structure carried in said frame; a squeeze platen above a position adapted to be occupied by said mold structure; a carrier for said squeeze platen slidably mounted in said frame; a roll of base material rotatably mounted in the frame; a roller at each side of said platen, secured to shafts carried by brackets on said platen carrier, for supporting the web of said base material between the platen and the mold structure; a feed ratchet wheel and an index wheel secured to the shaft of one of said supporting rollers; an oscillating pawl for engaging said ratchet wheel and feeding the web of base material under the platen in intermittent steps of predetermined length; a pawl adapted to engage the index wheel to hold said web taut across said platen; means for resisting the rotation of said roll of base material as the web thereof is fed forward; and a take-up mechanism on the frame including an oscillating pawl and ratchet for rewinding said base material after it leaves the squeeze platen in the form of finished linoleum.

76. In a machine for making molded inlaid linoleum, the combination of a frame; a mold structure carried in said frame; a squeeze platen above a position adapted to be occupied by said mold structure; carrier for said squeeze platen slidably mounted in said frame; a roll of base material rotatably mounted in the frame; a roller at each side of said platen, secured to shafts carried by brackets on said platen carrier, for supporting the web of said base material between the platen and the mold structure; a feed ratchet wheel and an index wheel secured to the shaft of one of said supporting rollers; an oscillating pawl for engaging said ratchet wheel and feeding the web of base material under the platen in intermittent steps of predetermined length; a pawl adapted to engage the index wheel to hold said web taut across said platen; means for resisting the rotation of said roll of base material as the web thereof is fed forward; a take-up mechanism on the frame including an oscillating pawl and ratchet for rewinding said base material after it leaves the squeeze platen in the form of finished linoleum; and means for synchronously oscillating the feed pawl and the take-up pawl.

77. In a machine for making molded inlaid linoleum, the combination of a frame; a mold structure carried in said frame; mechanism for traversing the mold structure along the frame; a squeeze platen above a position adapted to be occupied by said mold structure; a carrier for said squeeze platen slidably mounted in said frame; a roll of base material rotatably mounted in the frame; a roller at each side of said platen, secured to shafts carried by brackets on said platen carrier, for supporting the web of said base material between the platen and the mold structure; a feed ratchet wheel and an index wheel secured to the shaft of one of said supporting rollers; an oscillating pawl for engaging said ratchet wheel and feeding the web of base material under the platen in intermittent steps of predetermined length; a pawl adapted to engage the index wheel to hold said web taut across said platen; means for resisting the rotation of said roll of base material as the web thereof is fed forward; a take-up mechanism on the frame including an oscillating pawl and ratchet for rewinding said base material after it leaves the squeeze platen in the form of finished linoleum; and means operable by said mold traversing mechanism for synchronously oscillating the feed pawl and the take-up pawl as the mold structure is moved from under the platen.

78. In a machine for making molded inlaid linoleum, the combination of a frame; a shaft rotatably mounted in said frame; a mold structure carried in said frame; mechanism for traversing the mold structure along the frame; a squeeze platen above a position adapted to be occupied by said mold structure; a carrier for said squeeze platen slidably mounted in said frame; a roll of base material rotatably mounted in the frame; a roller at each side of said platen, secured to shafts carried by brackets on said platen carrier, for supporting the web of said base material between the platen and the mold structure; a feed ratchet wheel and an index wheel secured to the shaft of one of said supporting rollers; an oscillating pawl for engaging said ratchet wheel and feeding the web of base material under the platen in intermittent steps of predetermined length; a pawl adapted to engage the index wheel to hold said web taut across said platen; means for resisting the rotation of said roll of base material as the web thereof is fed forward; a take-up mechanism on the frame including an oscillating pawl and ratchet for rewinding said base material after it leaves the squeeze platen in the form of finished linoleum; means operable by said mold traversing mechanism for synchronously oscillating the feed pawl and the take-up pawl as the mold structure is moved from under the platen; a cam on said shaft for controlling the engagement of the feed pawl with the feed ratchet; and a cam on the shaft for controlling the engagement of the index pawl, with the index wheel.

79. In a machine for making molded inlaid linoleum, the combination of a frame; a shaft rotatably mounted in said frame; a mold structure carried in said frame; a mechanism for traversing the mold structure along the frame; a squeeze platen above a position adapted to be occupied by said mold structure; a carrier for said squeeze platen slidably mounted in said frame; a roll of base material rotatably mounted in the frame; a roller at each side of said platen, secured to shafts carried by brackets on said platen carrier, for supporting the web of said base material between the platen and the mold structure; a feed ratchet wheel and an index wheel secured to the shaft of one of said supporting rollers; an oscillating pawl for engaging said ratchet wheel and feeding the web of base material under the platen in intermittent steps of predetermined length; a pawl adapted to engage the index wheel to hold said web taut across said platen; means for resisting the rotation of said roll of base material as the web thereof is fed forward; a take-up mechanism on the frame including an oscillating pawl and ratchet for rewinding said base material after it leaves the squeeze platen in the form of finished linoleum; means operable by said mold traversing mechanism for synchronously oscillating the feed pawl and the take-up pawl as the mold structure is moved from under the platen; a cam on said shaft for controlling the engagement of the feed pawl with the feed ratchet; a cam on the shaft for controlling the engagement of the index pawl, with the index wheel; and a cam on the shaft for controlling the operation of the mold traversing means.

80. In a machine for making molded inlaid linoleum, the combination of a frame; an upper squeeze platen movable vertically in said frame; a lower squeeze platen movable vertically in said frame; a toggle for operating the upper platen; a toggle for operating the lower platen; and means for operating the toggles in a manner to squeeze the linoleum between the platens.

81. In a machine for making molded inlaid linoleum, the combination of a frame; an upper squeeze platen movable vertically in the said frame; a lower squeeze platen movable vertically in the said frame; a toggle for operating one of said platens, operable in a plane extending longitudinally of the frame; a toggle for operating the second platen operable in a plane extending at right angles to the plane of operation of the first said toggle, whereby, when one of said toggles is straightened the platen controlled thereby forms a rigid immovable abutment for the second platen to operate against, to squeeze the linoleum; and means for operating said toggles.

82. In a machine for making molded inlaid linoleum, the combination of a frame; a shaft rotatably mounted in said frame; a platen movable vertically in said frame; a second platen movable vertically in said frame in alignment with said first platen; a toggle for operating the first said platen; a toggle for operating the second said platen; a plunger and cylinder mechanism for operating one of said toggles; a valve for controlling the flow of motive fluid to and from said cylinder; a cam on the shaft for operating said motive fluid control valve; and a cam on the shaft for operating the other of said toggles, to squeeze the linoleum between said platens.

83. In a machine for making molded inlaid linoleum, the combination of a frame; tracks formed in said frame; a plurality of mold structures mounted in and adapted to be moved along said tracks; traversing bars extending parallel to said tracks; keys on said mold structures adapted to be engaged by said traversing bars; and means for moving said traversing bars.

84. In a machine for making molded inlaid linoleum, the combination of a frame; tracks formed in said frame; a plurality of mold structures mounted in and adapted to be moved along said tracks; traversing bars extending parallel to said tracks; keys on said mold structures adapted to be engaged by said traversing bars; means for raising and lowering said keys out of and into engagement with said traversing bars; and means for reciprocating said traversing bars.

85. In a machine for making molded inlaid linoleum, the combination of a frame; a plurality of mold structures carried in the frame; rollers journaled in each end of each mold structure; tracks formed in the frame, to receive said rollers and thereby support said mold structures; a mold structure traversing bar adjacent to and extending parallel to each track; a key in each end of each mold structure adapted to engage the respective traversing bar; means for moving the keys into and out of engagement with the traversing bars; means for reciprocating the traversing bars; and means for coordinating the movements of said bars.

86. In a machine for making molded inlaid linoleum, the combination of a frame; a plurality of mold structures mounted in the frame and adapted to be moved in a circuitous path around said frame; means for traversing the mold structures longitudinally of the frame; and means for transferring the mold structures transversely of the frame.

87. In a machine for making molded inlaid linoleum, the combination of a frame; tracks extending longitudinally along the opposite and respective sides of said frame; tracks extending transversely along the opposite and respective ends of the frame; mold structures movably mounted in said longitudinally extending tracks; mold structure transfer carriages movably mounted in the transversely extending tracks; means for traversing said mold structures along said longitudinally extending tracks and successively into said transfer carriages in the transversely extending tracks; means for operating the longitudinal traversing means; and means for operating the transversely movable transfer carriages.

88. In a machine for making molded inlaid linoleum, the combination of a frame; a shaft rotatably mounted in said frame; tracks extending longitudinally along the opposite and respective sides of said frame; tracks extending transversely along the opposite and respective ends of the frame; mold structures movably mounted in said longitudinally extending tracks; mold structure transfer carriages movably mounted in the transversely extending tracks; means for traversing said mold structures along said longitudinally extending tracks and successively into said transfer carriages in the transversely extending tracks; means for operating the longitudinal traversing means; means for operating the transversely movable transfer carriages; and cams on the shaft for controlling the operation of said longitudinally operating traversing bars and said transversely operating transfer carriages in time one with the other.

89. In a machine for making molded inlaid linoleum, the combination of a frame; a shaft rotatably mounted in said frame; a cam on the shaft; an operating plunger reciprocably mounted in a relatively fixed cylinder; a valve for controlling the flow of motive fluid to and from the cylinder, operatively mounted in a relatively fixed casing, and movable therein from a neutral position to a plunger operating position; a double-ended lever having a pivot pin at one of its ends operatively connected to the valve, a pivot pin at its opposite end under control of and adapted to be moved to various positions by the cam, and a pivot pin intermediate the two end pivots, under control of and operatively connected to the operating plunger, for movement thereby to various positions, whereby rotation of the cam will rock the double-ended lever around its intermediate plunger-controlled pivot to move the valve to a plunger operating position in its casing and subsequent operation of the plunger will rock the double-ended lever around its cam-controlled pivot to return the valve to the neutral position in the casing and thereby arrest the plunger in its movement within its cylinder, and means for changing the position of the intermediate pivot spindle within the double-ended lever relative to the pivot spindles at the opposite ends of the double-ended lever.

GILBERT V. ANDERSON.